US012750874B2

(12) United States Patent
Nakazawa et al.

(10) Patent No.: US 12,750,874 B2
(45) Date of Patent: Sep. 29, 2026

(54) RADIO COMMUNICATION SYSTEM, BASE STATION AND COMMUNICATION TERMINAL FOR RADIO COMMUNICATION BETWEEN COMMUNICATION TERMINAL AND BASE STATION USING SUBCARRIERS

(71) Applicant: Mitsubishi Electric Corporation, Tokyo (JP)

(72) Inventors: Masayuki Nakazawa, Tokyo (JP); Kuniyuki Suzuki, Tokyo (JP); Mitsuru Mochizuki, Tokyo (JP); Koji Ono, Tokyo (JP); Takayuki Nonami, Tokyo (JP); Naohito Tomoe, Tokyo (JP); Fumiki Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/095,597

(22) Filed: Jan. 11, 2023

(65) Prior Publication Data

US 2023/0142356 A1 May 11, 2023

Related U.S. Application Data

(63) Continuation of application No. 17/224,757, filed on Apr. 7, 2021, now abandoned, which is a continuation
(Continued)

(30) Foreign Application Priority Data

Oct. 31, 2014 (JP) ................................ 2014-223406

(51) Int. Cl.
*H04W 72/51* (2023.01)
*H04J 11/00* (2006.01)
(Continued)

(52) U.S. Cl.
CPC ............ *H04W 72/51* (2023.01); *H04J 11/00* (2013.01); *H04L 5/0007* (2013.01); *H04L 27/26* (2013.01);
(Continued)

(58) Field of Classification Search
CPC .. H04W 28/06; H04W 72/048; H04B 7/0626; H04B 7/024; H04J 11/00; H04L 5/0007;
(Continued)

(56) References Cited

U.S. PATENT DOCUMENTS

2003/0081538 A1 5/2003 Walton et al.
2004/0037215 A1 2/2004 Hwang et al.
(Continued)

FOREIGN PATENT DOCUMENTS

CN 101150564 A 3/2008
CN 101370192 A 2/2009
(Continued)

OTHER PUBLICATIONS

Office Action issued Aug. 8, 2023, in corresponding Japanese Patent Application No. 2022-104340 (with English Translation), citing document 15 therein, 6 pages.
(Continued)

*Primary Examiner* — Wei Zhao
(74) *Attorney, Agent, or Firm* — PROCOPIO, CORY, HARGREAVES & SAVITCH LLP

(57) ABSTRACT

A base station device is configured to set, for each communication terminal device, a radio format for signals transmitted to and received from the communication terminal device. The radio format is set for each communication terminal device in accordance with, for example, a type of use including a moving speed of the communication terminal device. The base station device may be configured to change the radio format for the communication terminal
(Continued)

device based on the information about a change in the environment of a radio communication between the communication terminal device and the base station device and a change including the communication terminal device's location. The signals transmitted and received between the base station device and the communication terminal device include radio formats in which at least one of a length of a symbol of the signal and a length of a cyclic prefix in an OFDM scheme differs.

9 Claims, 50 Drawing Sheets

Related U.S. Application Data of application No. 16/849,287, filed on Apr. 15, 2020, now Pat. No. 11,006,427, which is a continuation of application No. 15/518,536, filed as application No. PCT/JP2015/080097 on Oct. 26, 2015, now Pat. No. 10,674,514.

(51) Int. Cl.

| | |
|---|---|
| ***H04L 5/00*** | (2006.01) |
| ***H04L 27/26*** | (2006.01) |
| ***H04W 28/06*** | (2009.01) |
| ***H04W 72/04*** | (2023.01) |
| *H04W 88/06* | (2009.01) |

(52) U.S. Cl.

CPC ........... *H04W 28/06* (2013.01); *H04W 72/04* (2013.01); *H04L 5/0069* (2013.01); *H04W 88/06* (2013.01)

(58) Field of Classification Search

CPC ..... H04L 5/0048; H04L 5/0057; H04L 27/26; H04L 25/0224

See application file for complete search history.

(56) References Cited

U.S. PATENT DOCUMENTS

| | | | | |
|---|---|---|---|---|
| 2005/0180313 | A1 | 8/2005 | Kim et al. | |
| 2007/0297323 | A1* | 12/2007 | Seki | H04L 27/2602 370/208 |
| 2008/0181320 | A1 | 7/2008 | Asanuma et al. | |
| 2009/0034438 | A1 | 2/2009 | Soulie et al. | |
| 2010/0054184 | A1 | 3/2010 | Kishiyama et al. | |
| 2012/0014257 | A1 | 1/2012 | Ahluwalia et al. | |
| 2012/0021794 | A1* | 1/2012 | Shen | H04W 36/0085 455/515 |
| 2012/0034920 | A1* | 2/2012 | Inumaru | H04W 36/08 455/437 |
| 2013/0159021 | A1 | 6/2013 | Felsher | |
| 2013/0170435 | A1* | 7/2013 | Dinan | H04W 40/02 370/328 |
| 2013/0329659 | A1 | 12/2013 | Kim et al. | |
| 2014/0112253 | A1 | 4/2014 | Nagata et al. | |
| 2014/0198747 | A1* | 7/2014 | Ouchi | H04J 11/0053 370/329 |
| 2014/0286280 | A1 | 9/2014 | Seo et al. | |
| 2015/0031409 | A1 | 1/2015 | Ahn et al. | |
| 2015/0195077 | A1 | 7/2015 | Kim et al. | |
| 2015/0358801 | A1 | 12/2015 | Seo et al. | |
| 2015/0358983 | A1 | 12/2015 | Frenger et al. | |
| 2016/0205677 | A1 | 7/2016 | Kim et al. | |
| 2017/0013577 | A1 | 1/2017 | Berggren | |
| 2017/0079026 | A1 | 3/2017 | Li et al. | |
| 2017/0332383 | A1 | 11/2017 | Frenger et al. | |

FOREIGN PATENT DOCUMENTS

| | | | |
|---|---|---|---|
| CN | 101574009 | A | 11/2009 |
| CN | 102869096 | A | 1/2013 |
| CN | 101588337 | | 4/2013 |
| CN | 103503543 | A | 1/2014 |
| JP | 11-313357 | | 11/1999 |
| JP | 2004-64793 | A | 2/2004 |
| JP | 2007-158834 | A | 6/2007 |
| JP | 2007-159066 | A | 6/2007 |
| RU | 2365041 | C1 | 8/2009 |
| WO | 2007/015494 | A1 | 2/2007 |
| WO | WO 2010/136864 | A1 | 12/2010 |
| WO | 2014/025157 | A1 | 2/2014 |
| WO | WO 2014/051322 | A1 | 4/2014 |
| WO | 2014/088195 | A1 | 6/2014 |
| WO | WO 2014/112907 | A1 | 7/2014 |
| WO | 2014/119880 | A1 | 8/2014 |
| WO | WO 2014/141920 | A1 | 9/2014 |

OTHER PUBLICATIONS

Chinese Office Action issued on Sep. 1, 2020, in Chinese Patent Application No. 201580059270.2 (with computer generated English translation), 10 pages.

European Office Action issued on Sep. 10, 2020 in Patent Application No. 15854122.7, citing document 12 therein, 4 pages.

International Search Report issued Jan. 12, 2016 in PCT/JP2015/080097 filed Oct. 26, 2015.

"3rd Generation Partnership Projects; Technical Specification Group Radio Access Network; Evolved Universal Terrestrial Radio Access (E-UTRA) and Evolved Universal Terrestrial Radio Access Network (E-UTRAN); Overall description; Stage 2," 3GPP TS 36.300 V11.7.0. Sep. 2013, pp. 1-209.

"3rd Generation Partnership Project; Technical Specification Group Radio Access Network; Evolved Universal Terrestrial Radio Access (E-UTRA); User Equipment (UE) procedures in idle mode," 3GPP TS 36.304 V11.2.0, Dec. 2012, pp. 1-33.

"LS on HNB/HeNB Open Access Mode," 3GPP, SA WG1, 3GPP TSG-SA1 #42, S1-083461, Oct. 2008, 2 pages.

"LS on CSG cell identification," RAN 2, 3GPP TSG-RAN WG 2 meeting #62, R2-082899, May 2008, pp. 1-2.

"3rd Generation Partnership Project; Technical Specification Group Radio Access Network; Evolved Universal Terrestrial Radio Access (E-UTRA); Further advancements for E-UTRA physical layer aspects," 3GPP TR 36.814 V9.0.0, Mar. 2010, pp. 1-107.

"3rd Generation Partnership Project; Technical Specification Group Radio Access Network; Feasibility study for Further Advancements for E-UTRA (LTE-Advanced)," 3GPP TR 36.912 V10.0.0, Mar. 2011, 218 pages.

"3rd Generation Partnership Project; Technical Specification Group Radio Access Network; Coordinated multi-point operation for LTE physical layer aspects," 3GPP TR 36.819 V11.1.0, Dec. 2011, pp. 1-69.

"3rd Generation Partnership Project; Technical Specification Group Radio Access Network; Evolved Universal Terrestrial Radio Access (E-UTRA); Base Station (BS) conformance testing," 3GPP TS 36.141 V11.1.0, Jun. 2012, pp. 1-224.

"Views on Small Cell On/Off with Small Cell Discovery," NTT DOCOMO, 3GPP TSG RAN WG1 Meeting #74bis, R1-134496, pp. 1-5.

"Analysis and design considerations of cell on/off in small cell," LG Electronics, 3GPP TSG RAN WG1 Meeting #73, R1-132236, May 2013, 6 pages.

"3rd Generation Partnership Project; Technical Specification Group Radio Access Network; Evolved Universal Terrestrial Radio Access (E-UTRA); Study on Small Cell Enhancements for E-UTRA and E-UTRAN-High layer aspects," 3GPP TR 36.842 V0.2.0, May 2013, pp. 1-38.

Popovski, Petar et al., "Scenarios, requirements and KPIs for 5G mobile and wireless system," Metis, V. 1, Apr. 2013, 83 pages.

Chinese Office Action dated Dec. 27, 2019 in Chinese Patent Application No. 2015/0059270.2 with computer generated translation.

(56) References Cited

OTHER PUBLICATIONS

Japanese Office Action issued on Sep. 10, 2019, in Patent Application No. 2016-556558, 4 pages (with unedited computer generated English translation).
Japanese Office Action issued on Jun. 25, 2019 in Patent Application No. 2016-556558 (with English translation), 6 pages.
Extended European Search Report issued May 15, 2018 in Patent Application No. 15854122.7, citing references 2-5 and 20-22 therein, 7 pages.
International Preliminary Report on Patentability and Written Opinion issued May 11, 2017 in PCT/JP2015/080097 (with English translation).
Japanese Office Action issued Nov. 17, 2020 in Japanese Application No. 2019-221770 (with Computer Generated English Translation).
Indian Office Action issued Feb. 4, 2021 in Indian Patent Application No. 201747013245.
Japanese Office Action issued Feb. 16, 2021 in Japanese Patent Application No. 2019-221770 (with Computer Generated English Translation).
Chinese Office Action issued Feb. 2, 2021 in Chinese Patent Application No. 201580059270.2 (with Computer Generated English Translation).
Summons to attend oral proceedings issued Jun. 4, 2021 in European Patent Application No. 15854122.7, 5 pages.
Combined Chinese Office Action and Search Report issued Jun. 3, 2021 in Patent Application No. 201580059270.2 (with English language translation), citing document 24 therein, 9 pages.
European Office Action issued Dec. 14, 2021 in European Patent Application No. 15 854 122.7, citing document 14 therein, 13 pages.
Extended European Search Report Issued Jul. 4, 2022 in European Application No. 22157707.5.
Office Action issued Jun. 20, 2022 in Indian Application No. 202148050275 (references 15 and 25-26 cited therein).
Office Action issued Jun. 21, 2022 in Indian Application No. 202148050283 (references 16 and 27 cited therein).
Office Action issued Jun. 27, 2022 in Indian Application No. 202148050291 (references 28-29 cited therein).
Japanese Office Action issued on May 23, 2023 in Japanese Patent Application No. 2022-104340 (with English translation), citing reference 15 therein, 8 pages.
Chinese Patent Office, Office Action, Application No. 202210207825.5, dated Apr. 25, 2024, in 14 pages.
Chinese Patent Office, Office Action, Application No. 202210207394.2, dated Aug. 26, 2024, in 17 pages.
Chinese Patent Office, Office Action, Application No. 202210207825.5, dated Aug. 28, 2024, in 9 pages.
Japanese Patent Office, Office Action, Application No. 2023-210736, dated Oct. 8, 2024, in 6 pages.
Chinese Patent Office, Office Action, Application No. CN202210207500.7, dated Jun. 20, 2024, in 18 pages.
Chinese Decision of Rejection for Chinese Application No. 202210207825.5 dated Oct. 28, 2024 and a computer generated English translation, in 9 pages.
Chinese Decision of Rejection, Application No. 202210207394.2, dated Apr. 25, 2025 and a computer generated English translation, in 11 pages.

* cited by examiner

| No | SL | CPL | TL |
|---|---|---|---|
| 1 | 4.18 μs (SCI:240kHz) | 5.15 μs | 9.33 μs |
| 2 | 8.33 μs (SCI:120kHz) | 1.00 μs | 9.33 μs |

| No | SL | CPL | TL | Ra |
|---|---|---|---|---|
| 1 | 4.17 μs (SCI: 240kHz) | 1.00 μs | 5.17 μs | 1 |
| 2 | 8.33 μs (SCI: 120kHz) | 2.01 μs | 10.34 μs | 2 |
| 3 | 12.5 μs (SCI: 80kHz) | 3.01 μs | 15.51 μs | 3 |

(a)

(b)

RADIO COMMUNICATION SYSTEM, BASE STATION AND COMMUNICATION TERMINAL FOR RADIO COMMUNICATION BETWEEN COMMUNICATION TERMINAL AND BASE STATION USING SUBCARRIERS

CROSS-REFERENCE TO RELATED APPLICATIONS

This application is a continuation of U.S. application Ser. No. 17/224,757 filed Apr. 7, 2021, which is a continuation of U.S. application Ser. No. 16/849,287 filed Apr. 15, 2020, now U.S. Pat. No. 11,006,427 issued May 11, 2021, which is a continuation of U.S. application Ser. No. 15/518,536 filed Apr. 12, 2017, now U.S. Pat. No. 10,674,514 issued Jun. 2, 2020, which is a National Phase of PCT/JP2015/080097 filed on Oct. 26, 2015, and claims priority to Japanese Patent Application No. 2014-223406 filed Oct. 31, 2014. The entire contents of each of which are incorporated herein by reference.

TECHNICAL FIELD

The present invention relates to a communication system in which radio communication is performed between a communication terminal device, such as a user equipment device, and a base station device.

BACKGROUND ART

The 3rd generation partnership project (3GPP), a standard organization regarding the mobile communication system, is studying new communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 12). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication scheme is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter also merely referred to as a "base station") to a communication terminal device (hereinafter also merely referred to as a "communication terminal") such as a user equipment device (hereinafter also merely referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) that is one of the transport channels described below, resource allocation information for a paging channel (PCH) that is one of the transport channels described below, and hybrid automatic repeat request (HARQ) information related to DL-SCH. The PDCCH carries an uplink scheduling grant. The PDCCH carries acknowledgement/negative acknowledgement (Ack/Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a communication terminal to a user equipment. The PHICH carries Ack/Nack that is a response signal to uplink transmission. A physical random access channel (PRACH) is a channel for uplink transmission from a communication terminal to a base station. The PRACH carries a random access preamble.

A downlink reference signal (RS) is a known symbol in the LTE communication system. The following five types of downlink reference signals are defined: cell-specific reference signals (CRSs), MBSFN reference signals, data demodulation reference signals (DM-RSs) that are UE-specific reference signals, positioning reference signals (PRSs), and channel-state information reference signals (CSI-RSs). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of a communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is a technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if no CRC error occurs (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter also referred to as a "cell for specific subscribers"). The specified subscribers are allowed to access one or more cells of a public land mobile network (PLMN). One or more cells to which the specified subscribers are allowed access are referred to as "CSG cell(s)". Note that access is restricted in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked on the basis of an area composed of one or more cells. The locations are tracked for enabling tracking the locations of communication terminals and calling communication terminals, in other words, incoming calling to communication terminals, even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are also allowed access at the same time. In other words, a cell in the hybrid access mode (also referred to as a hybrid cell) is the cell that supports both the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to communication terminals being served thereby. Being served by a base station means taking the base station as a serving cell.

Non-Patent Document 4 discloses the basic operation of a communication terminal using PCI split. The communication terminal that does not have the PCI split information needs to perform cell search using all PCIs, for example, using all 504 codes. On the other hand, the communication terminal that has the PCI split information can perform cell search using the PCI split information.

Further, 3GPP is pursuing specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA) is studied for the LTE-A system, in which two or more component carriers (CCs) are aggregated (also referred to as being subjected to "aggregation") to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

Example of the new techniques in the LTE-A include a technique of supporting wider bands (wider bandwidth extension) and a coordinated multiple point transmission and reception (CoMP) technique. The CoMP studied for LTE-A in 3GPP is described in Non-Patent Document 7.

The traffic flow of a mobile network is on the rise, and the communication rate is also increasing. It is expected that the communication rate and the traffic flow will be further increased when the operations of the LTE and the LTE-A are fully initiated.

Widespread use of smartphones and tablet terminals explosively increases traffic in cellular radio communications, causing a fear of insufficient radio resources all over the world.

To deal with the problem of increased traffic, 3GPP is developing specifications of Release 12. In the specifications of Release 12, the use of small eNBs is studied to satisfy a tremendous volume of traffic in the future. In an example technique under study, a large number of small eNBs are installed to configure a large number of small cells, thus increasing spectral efficiency for increased communication capacity.

In Release 12, dual connectivity is discussed as the technique of connecting a communication terminal to both a macro cell and a small cell when the macro cell and the small cell overlap each other (see Non-Patent Document 11). Non-Patent Document 11 discloses dual connectivity as a technique for connecting a communication terminal to a macro cell as well as a small cell when the macro cell and the small cell overlap each other.

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 12).

Among the requirements in the 5G radio access system are a system capacity 1000 times as high as, a data transmission rate 100 times as high as, a data latency one tenth (1/10) as low as, and simultaneously connected communication terminals 100 times as many as those in the LTE system, to further reduce the power consumption and device cost.

To satisfy the requirements above, studies have been made on increasing data transmission capacity by using a frequency in a wider band and on employing a technique, for example, an antenna beamforming technique in which spectral efficiency is increased to increase data transmission capacity for enabling spatial multiplexing. Also, to achieve a wider band frequency, the use of a high frequency such as a microwave (super high frequency: SHF) band of 3 to 30 GHz has been studied as a frequency to be used in radio access.

When a high frequency is used, a wavelength decreases and a radio wave attenuation accordingly increases, causing a problem in which a radio propagation distance becomes smaller than that of a traditional communication system. Moreover, due to an increased influence of a Doppler shift, the moving speed of a communication terminal may greatly affect communication capability.

The 5G radio access system accommodates various communication terminals, and accordingly, as a radio access scheme, the same system needs to handle communication terminals varying from communication terminals that support high-speed data transmission of, for example, 4K digital televisions to communication terminals that support only ultra-low data transmission of, for example, sensors.

It is therefore difficult to satisfy the requirements for 5G in a conventional LTE communication scheme, and thus, a new scheme is studied as a 5G radio access scheme.

PRIOR ART DOCUMENTS

Non-Patent Documents

Non-Patent Document 1: 3GPP TS 36.300 V11.7.0
Non-Patent Document 2: 3GPP TS 36.304 V11.2.0
Non-Patent Document 3: 3GPP S1-083461

Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.1.0
Non-Patent Document 8: 3GPP TS 36.141 V11.1.0
Non-Patent Document 9: 3GPP R1-134496
Non-Patent Document 10: 3GPP R1-132236
Non-Patent Document 11: 3GPP TR 36.842 V0.2.0
Non-Patent Document 12: "Scenarios, requirements and KPIs for 5G mobile and wireless system", [online] ICT-317669-METIS/D1.1, published online Apr. 30, 2013, https://www.metis2020.com/documents/deliverables/ (accessed Apr. 10, 2014)

SUMMARY OF INVENTION

Problem to be Solved by the Invention

When the conditions required for the 5G radio access system described above are to be satisfied by a radio access scheme used in LTE, some of them cannot be satisfied.

For example, when a high frequency is used, at 15 kHz that is an LTE-specific OFDM subcarrier interval, a Doppler shift has a large influence during high-speed moving, resulting in a significantly degraded communication capability. When a wide frequency band is processed, a fast Fourier transform (FFT) size for OFDM modulation and demodulation increases, causing a problem in implementation, such as a circuit size or a software load. Herein, the FFT size refers to the number of pieces of sampling data in a time domain used when the FFT is performed.

Since data is processed on a subframe (1 ms) basis in LTE specifications, a radio frame needs to be made smaller in order to satisfy the requirement, a data latency 1/10-times as low as that in LTE.

Therefore, a conventional LTE radio access scheme cannot be applied to a 5G radio access system without any contrivance.

The present invention has an object to provide a communication system capable of transmitting data at a relatively high speed with a relatively low delay and also accommodating various communication terminal devices.

Means to Solve the Problem

A communication system according to the present invention includes a plurality of communication terminal devices and a base station device configuring a cell in which the base station device is capable of radio communication with the communication terminal devices. The base station device is configured to set, for each of the communication terminal devices, a radio format for signals transmitted to and received from the communication terminal device.

Effects of the Invention

According to the communication system of the present invention, the communication system includes a plurality of communication terminal devices and a base station device configuring a cell in which the base station device is capable of radio communication with the communication terminal devices. The base station device is configured to set, for each communication terminal device, a radio format for signals transmitted to and received from the communication terminal device. The radio format is set for each communication terminal device in accordance with, for example, a type of use including a moving speed of the communication terminal device. Therefore, a communication system capable of transmitting data at a relatively high speed with a relatively short delay and accommodating various communication terminal devices can be obtained.

These and other objects, features, aspects and advantages of the present invention will become more apparent from the following detailed description of the present invention when taken in conjunction with the accompanying drawings.

DESCRIPTION OF EMBODIMENTS

First Embodiment

Figure 1:
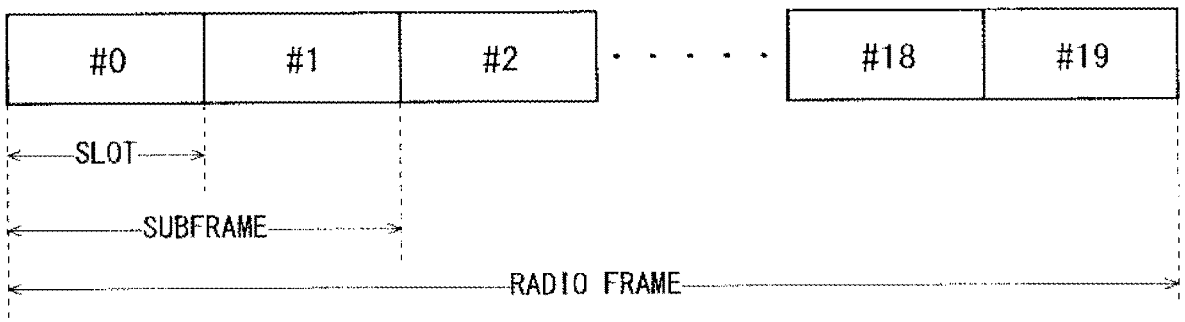
FIG. 1 is a diagram illustrating a configuration of a radio frame used in an LTE communication system.
Figure 2:
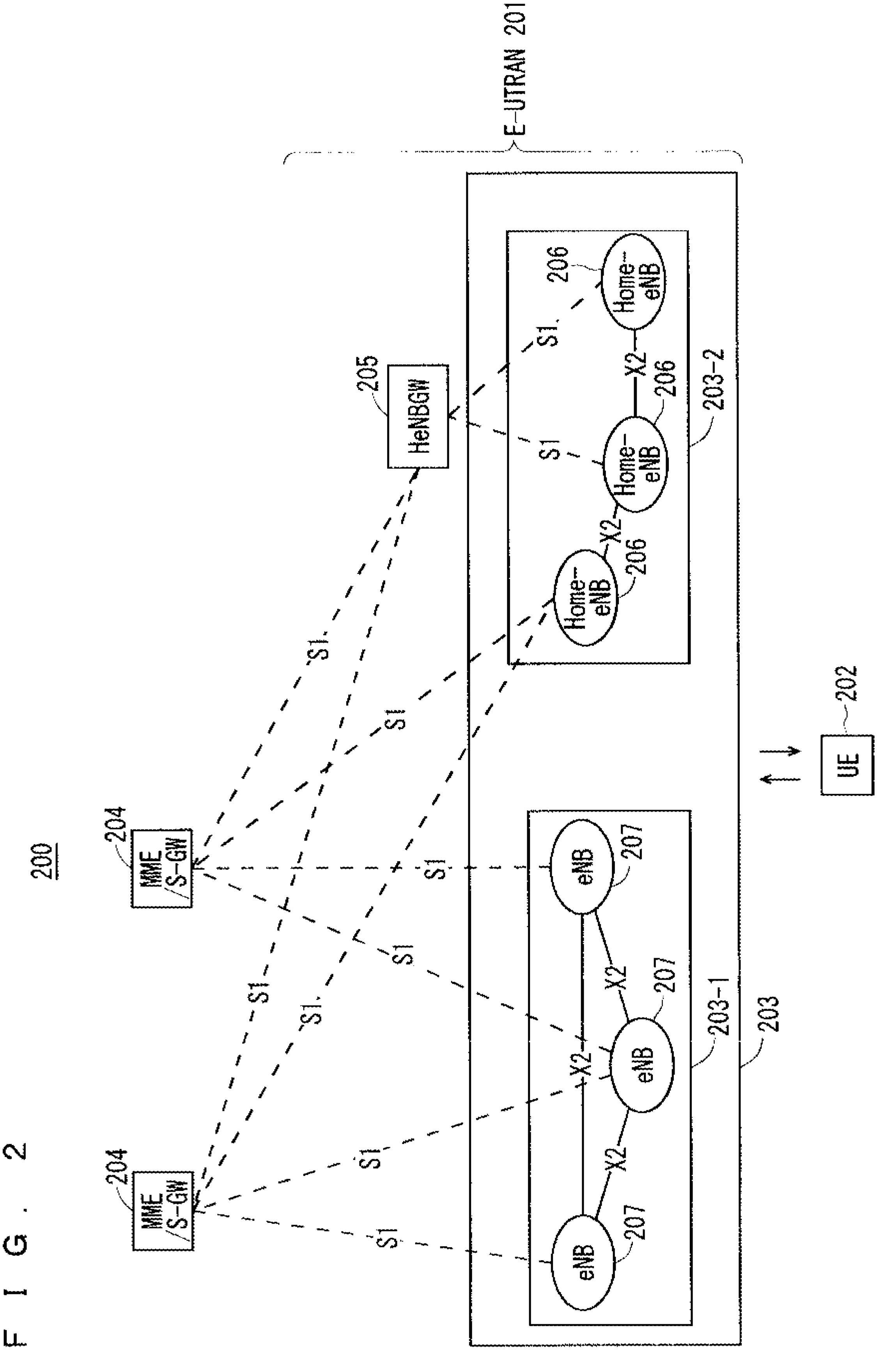
FIG. 2 is a block diagram showing an overall configuration of an LTE communication system 200 under discussion of 3GPP.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter referred to as a "user equipment (UE)") 202 that is a communication terminal device is capable of radio communication with a base station device (hereinafter referred to as a "base station (E-UTRAN Node B: eNB)") 203 and transmits and receives signals through radio communication.

Herein, the "communication terminal devices" include not only user equipment devices such as movable mobile phone terminal devices, but also devices that do not move such as sensors. In the description below, the "communication terminal device" may be merely referred to as a "communication terminal".

The E-UTRAN is composed of one or a plurality of base stations 203, provided that a control protocol for a user equipment 202 such as a radio resource control (RRC), and user planes such as a packet data convergence protocol (PDCP), radio link control (RLC), medium access control (MAC), or physical layer (PHY) are terminated in the base station 203.

The control protocol RRC (radio resource control) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, handover (HO), measurement of a neighbor cell, and the like are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) that is a core network and an E-UTRAN 201 that is a radio access network, is referred to as an evolved packet system (EPS). The EPC that is a core network and the E-UTRAN 201 that is a radio access network may be collectively referred to as a "network".

The eNB 207 is connected to an MME/S-GW unit (hereinafter also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 that are base stations. The MME units 204 configure an EPC that is a core network. The base station 203 and the HeNBGW 205 configure an E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station 203 may configure a single cell or a plurality of cells. Each cell has a range predetermined as a coverage in which the cell can communicate with a communication terminal device 202 and performs radio communication with the communication terminal device 202 within the coverage. In the case where one base station 203 configures a plurality of cells, every cell is configured so as to communicate with the user equipment 202.

Figure 3:
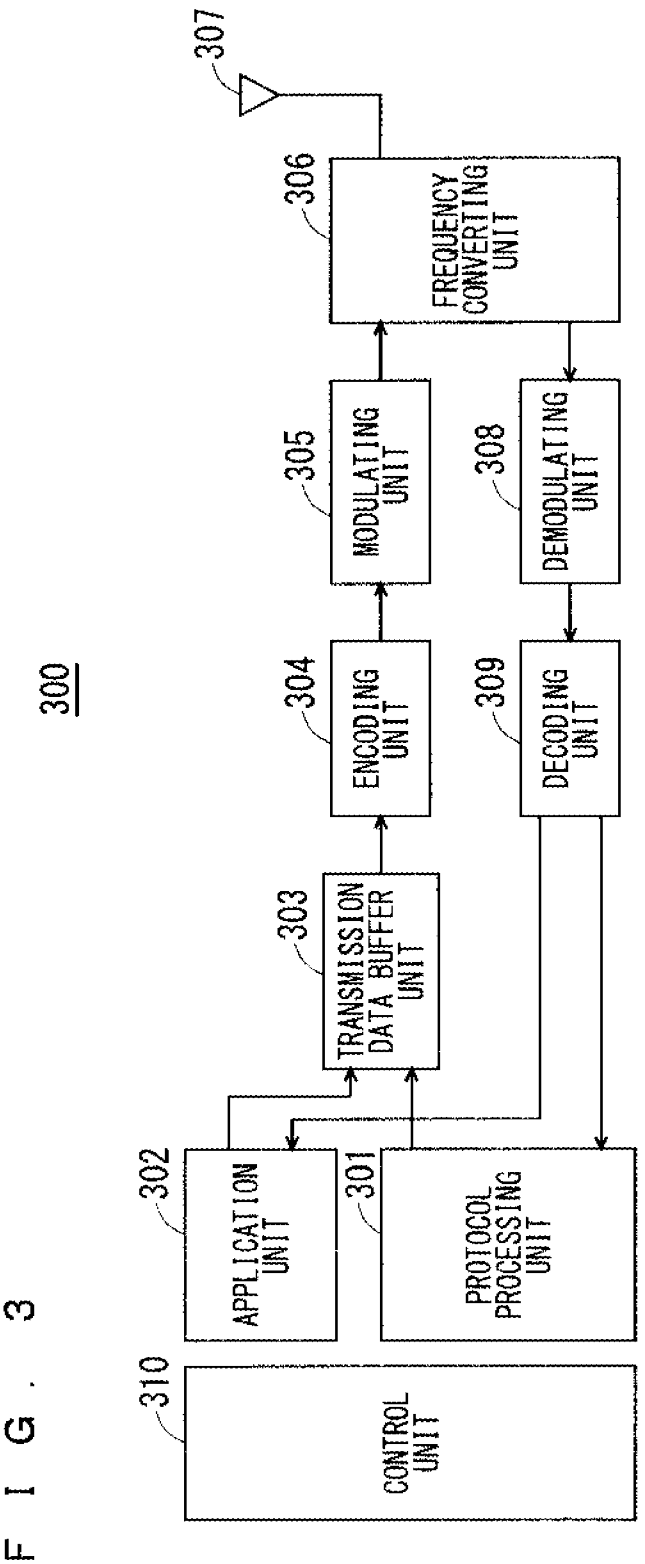
FIG. 3 is a block diagram showing a configuration of a user equipment 202 shown in FIG. 2, which is a communication terminal according to the present invention.

FIG. 3 is a block diagram showing a configuration of the user equipment 202 of FIG. 2, which is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Of the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
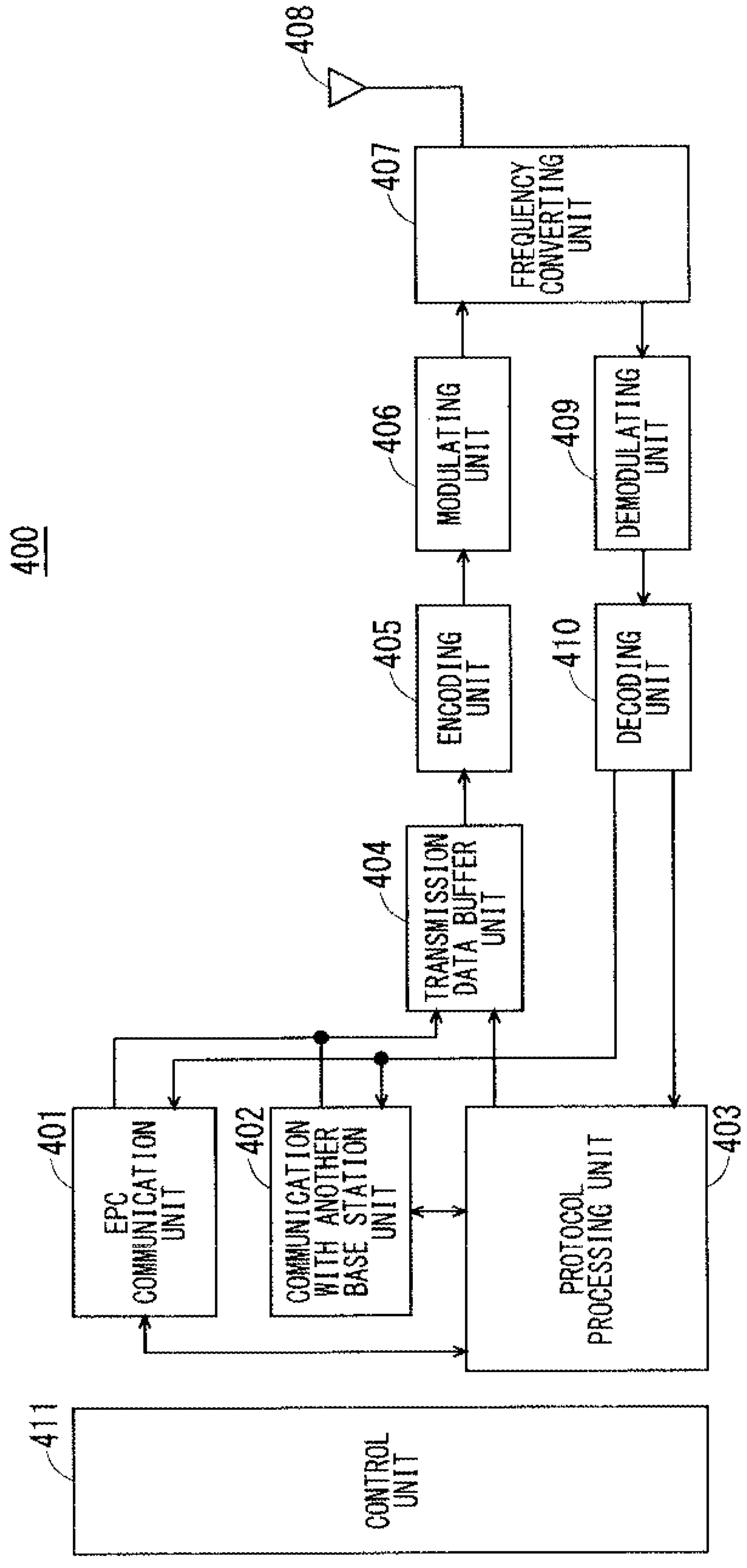
FIG. 4 is a block diagram showing a configuration of a base station 203 shown in FIG. 2, which is a base station according to the present invention.

FIG. 4 is a block diagram showing a configuration of the base station 203 of FIG. 2, which is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Of the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
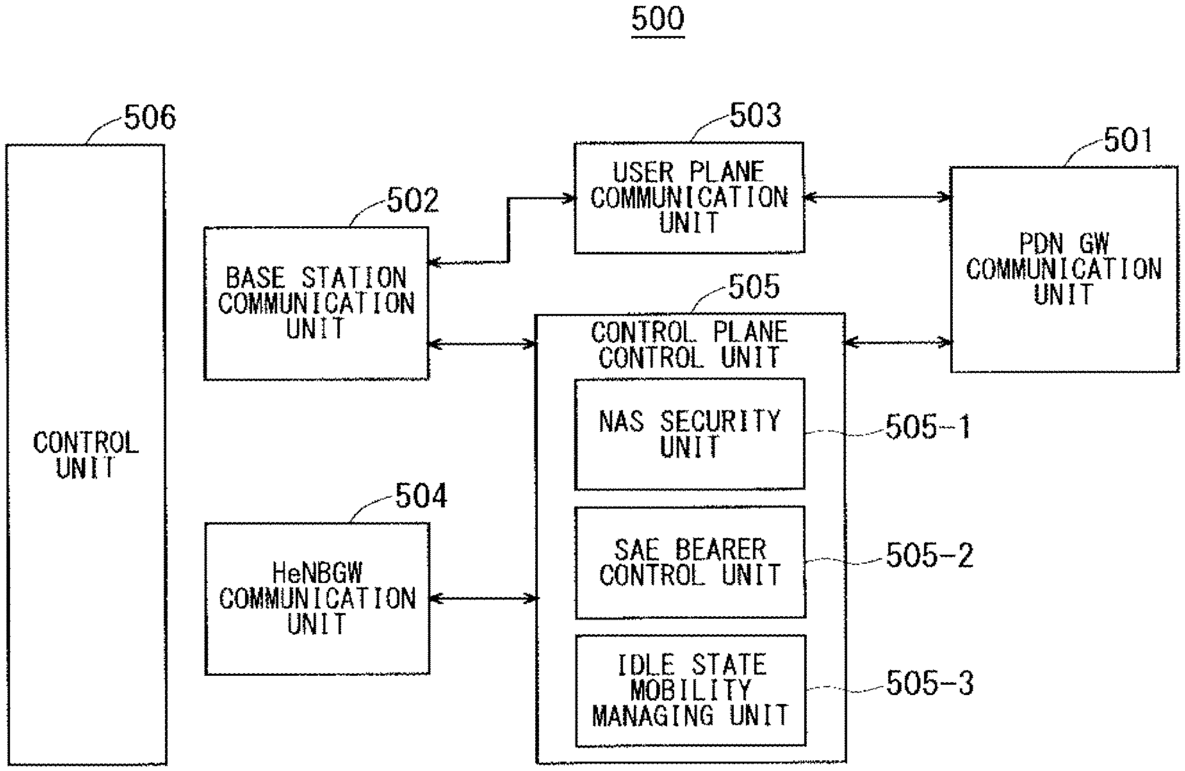
FIG. 5 is a block diagram showing a configuration of an MME according to the present invention.

FIG. 5 is a block diagram showing a configuration of the MME according to the present invention. FIG. 5 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204*a* and the HeNBGW 205 by means of an interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, an idle state mobility managing unit 505-3, and the like, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204*a* distributes a paging signal to one or a plurality of base stations 203. In addition, the MME 204*a* performs mobility control of an idle state. When the user equipment is in the idle state and active state, the MME 204*a* manages a tracking area list. The MME 204*a* begins a paging protocol by transmitting a paging message to the cell belonging to a tracking area in which the UE is registered. The idle state mobility managing unit 505-3 may manage the CSG of the Home-eNBs 206 to be connected to the MME 204*a*, CSG IDs, and a whitelist.

Figure 6:
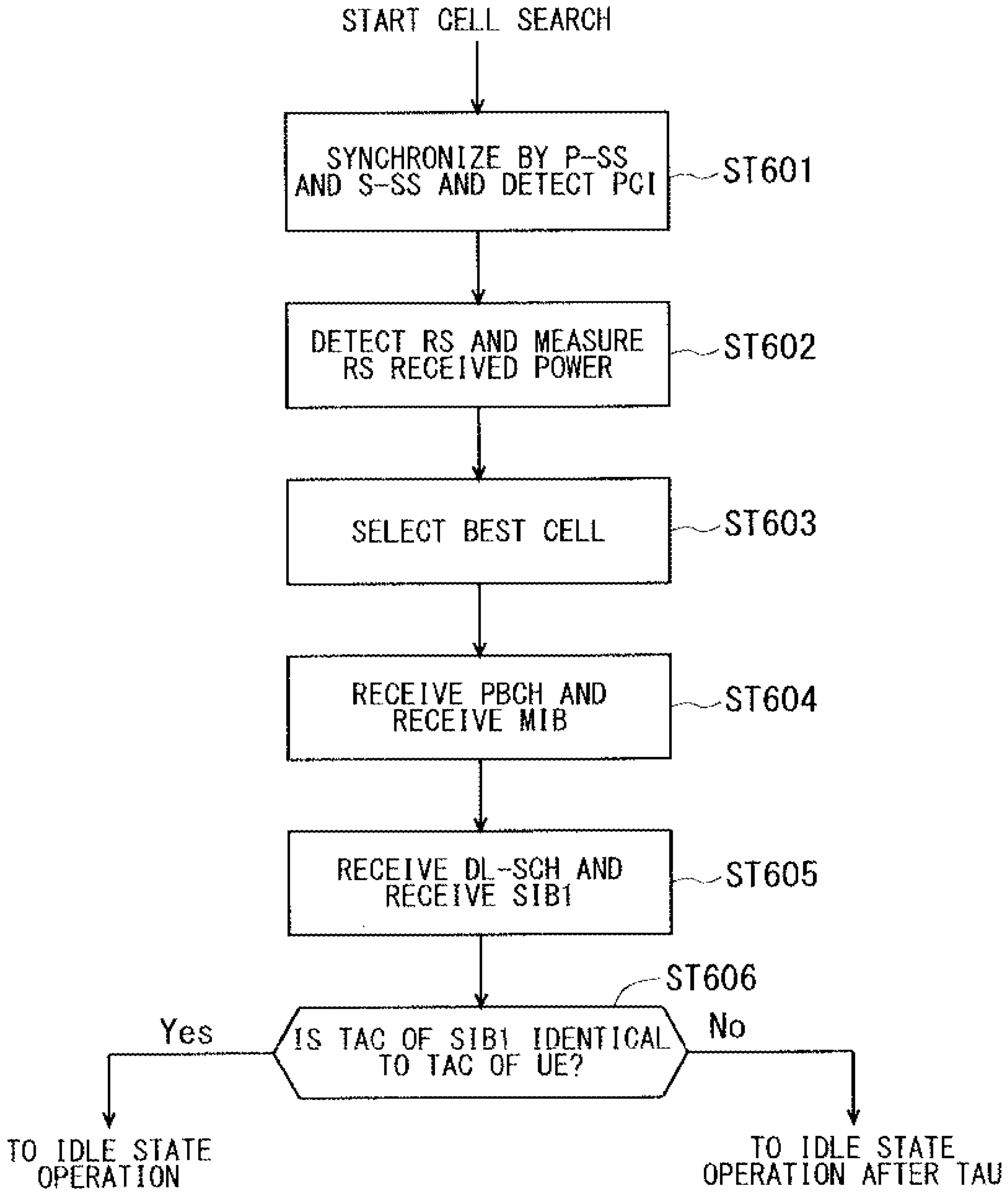
FIG. 6 is a flowchart showing an outline from a cell search to an idle state operation performed by a communication terminal (UE) in the LTE communication system.

An example of a cell search method in a communication system will be described next. FIG. 6 is a flowchart showing an outline from a cell search to an idle state operation performed by a communication terminal (UE) in the LTE communication system. When starting a cell search, in step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as synchronization signals (SSs). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In step ST602, the user equipment then detects a cell-specific reference signal (CRS) that is a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in step ST601, so that the RS can be detected and the RS received power can be measured.

In step ST603, the user equipment then selects a cell having the best RS received quality, for example, a cell having the highest RS received power, that is, the best cell, from one or more cells that have been detected up to step ST602.

In step ST604, the user equipment then receives the PBCH of the best cell and obtains the BCCH that is the broadcast information. A master information block (MIB) containing the cell configuration information is mapped to the BCCH over the PBCH. The MIB is accordingly obtained by obtaining the BCCH through receipt of the PBCH. Examples of the MIB information include the downlink system bandwidth (abbreviated as dl-bandwidth), the number of transmission antennas, and a system frame number (SFN). The downlink system bandwidth is also referred to as a transmission bandwidth configuration.

In step ST605, the user equipment then receives the DL-SCH of the cell on the basis of the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In step ST606, the communication terminal then compares the TAC of the SIB1 received in step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of step ST606 shows that the TAC received in step ST605 is identical to the TAC included in the tracking area list, the communication terminal enters an idle state operation in the cell. If the comparison shows that the TAC received in step ST605 is not included in the tracking area list, the communication terminal requires a core network (EPC) including MME and the like to change a tracking area through the cell for performing tracking area update (TAU).

The device configuring a core network (hereinafter also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal on the basis of the received tracking area list. After that, the communication terminal enters the idle state operation in the cell.

Widespread use of smartphones and tablet terminals explosively increases traffic in cellular radio communications, causing a fear of insufficient radio resources all over the world. To increase spectral efficiency, thus, it is studied to downsize cells for further spatial separation.

In the conventional configuration of cells, a cell configured by an eNB has a relatively-wide-range coverage. Conventionally, cells are configured such that relatively-wide-range coverages of a plurality of cells configured by a plurality of eNBs cover a certain area.

When cells are downsized, a cell configured by an eNB has a narrower-range coverage than the coverage of a cell configured by a conventional eNB. In order to cover a certain area as in the conventional case, accordingly, a larger number of downsized eNBs than the conventional eNBs are required.

In the description below, a "macro cell" refers to a cell whose coverage is relatively large, such as a cell configured by a conventional eNB, and a "macro eNB" refers to an eNB configuring a macro cell. A "small cell" refers to a cell whose coverage is relatively small, such as a downsized cell, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

Figure 7:
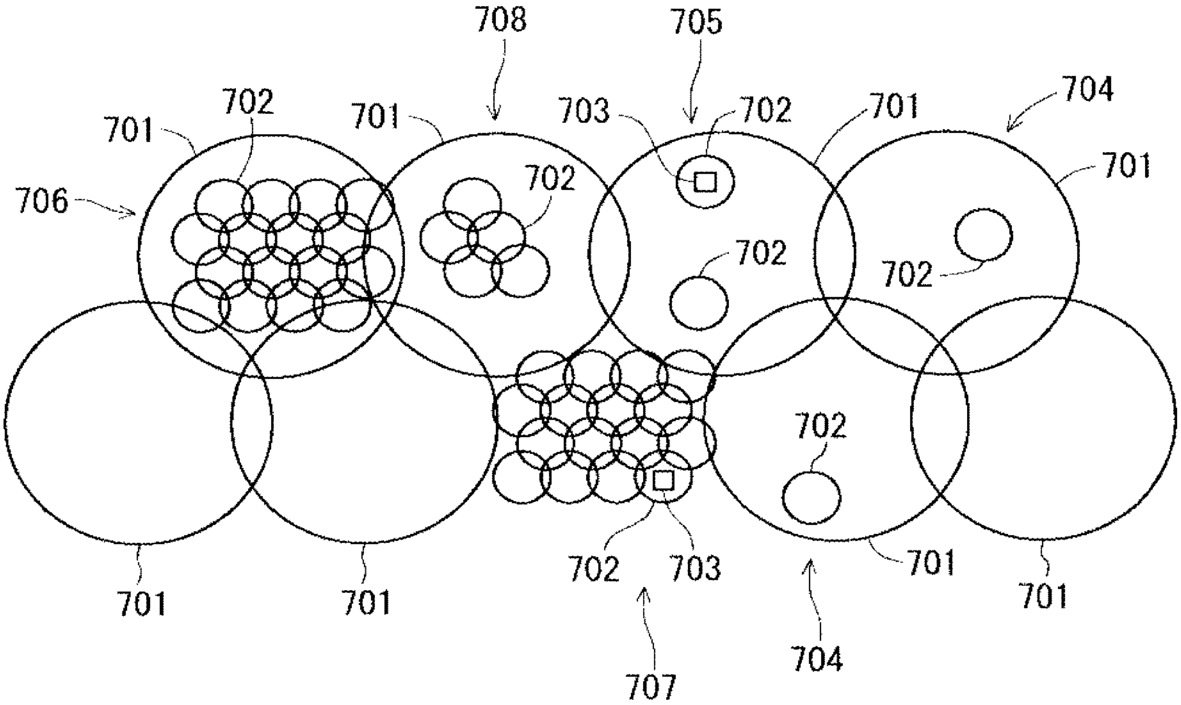
FIG. 7 shows the concept of a cell configuration when macro eNBs and small eNBs coexist.

FIG. 7 shows the concept of a cell configuration in which macro eNBs and small eNBs coexist. A macro cell configured by a macro eNB has a relatively-wide-range coverage 701. A small cell configured by a small eNB has a coverage 702 whose range is smaller than that of the coverage 701 of the macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by a reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

As the fifth-generation radio access scheme aimed to be commercialized for 2018 to 2020, a scheme of accommodating various communication terminals is considered as disclosed in Non-Patent Document 12.

For example, according to the dense urban scenario (TC2) described in ICT-317669-METIS/D6.11 (Chapter 9.2) and Non-Patent Document 12 (Chapter 8), 300 Mbps and 60 Mbps are required respectively in downlink and uplink per communication terminal, a communication capacity of 700 Gbps/km$^2$ is required per unit area in consideration of the number of communication terminals, a moving speed of almost 0 km/h is required in indoor use, a moving speed of 3 to 50 km/h is required in outdoor use during moving, a tolerable delay time of 0.5 seconds (s) is required per web page in web browsing, and 2 to 5 ms is required to start augmented reality.

In the scenario (TC8) of a high-speed user equipment described in Non-Patent Document 12 (Chapter 14), 100 Mbps and 20 Mbps are required respectively in downlink and uplink per communication terminal, a communication capacity of 60 Gbps/km$^2$ is required per unit area in consideration of the number of communication terminals, a moving speed of 350 km/h is required, and a tolerable delay time of 10 ms is required.

Since the requirements differ depending on the type of use as described above, an optimum radio format suitable for each type of communication is required to increase spectral efficiency. In the current LTE/LTE-A radio format, however, the intervals of the OFDM subcarriers to be simultaneously transmitted are constant, and spectral efficiency may decrease depending on the type of use.

To solve the problem above, the present embodiment will disclose a technique in which when newly starting communication with a communication terminal, a base station is notified of the moving speed of the communication terminal to set an OFDM subcarrier interval corresponding to the moving speed. This technique can be used to improve spectral efficiency.

The base station herein may be an evolved NodeB (eNB) of 3GPP or a master eNB (MeNB) or secondary eNB (SeNB) during dual connectivity. It may be one referred to as a relay node (RN), remote radio head (RRH), or a concentrator. Alternatively, it may be a component carrier (CC) during carrier aggregation.

It is known that a carrier offset occurs in accordance with moving speed in Doppler phasing specific to mobile objects. The carrier offset can be expressed by the following expression "v×f/c", where the moving speed of a mobile object is v, a carrier frequency is f, and a speed of light is c. In other words, carrier offset becomes larger as a mobile object moves faster.

Figure 8:
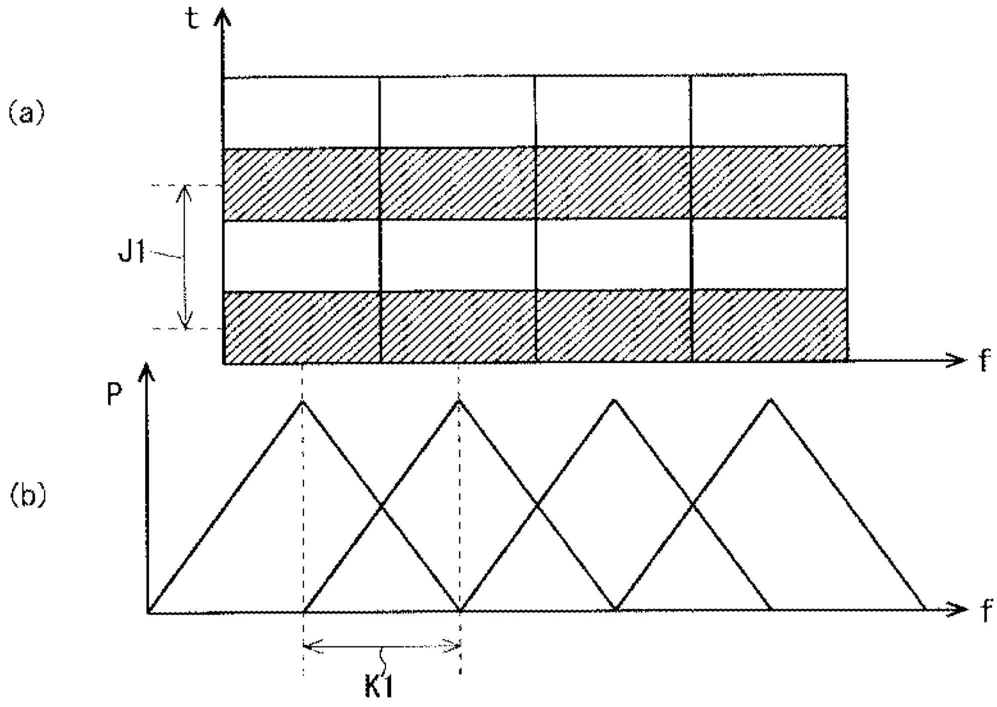
FIG. 8 shows an example of signals used in a first embodiment of the present invention.
Figure 9:
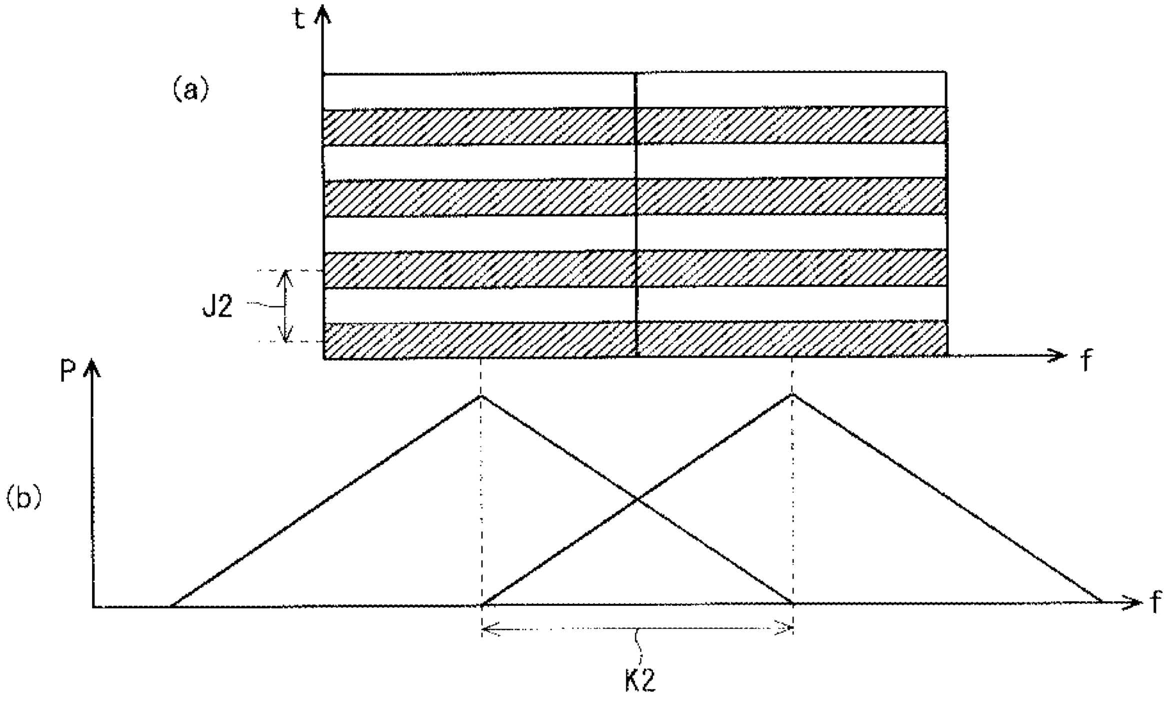
FIG. 9 shows another example of signals used in the first embodiment of the present invention.

FIG. 8 shows an example of signals used in the first embodiment of the present invention. FIG. 9 shows another example of signals used in the first embodiment of the present invention. FIG. 8 shows, for example, signals when the OFDM subcarrier interval is K1 (Hz). FIG. 9 shows, for comparison, signals when the OFDM subcarrier interval is K2 (Hz) that is twice K1. In FIGS. 8 and 9, training sequence signals are hatched.

In part (a) of FIG. 8 and part (a) of FIG. 9, the horizontal and vertical axes respectively represent a frequency f and a time t. In part (b) of FIG. 8 and part (b) of FIG. 9, the horizontal and vertical axes respectively represent a frequency f and a power P. In both cases of FIGS. 8 and 9, training sequence signals, for example, reference signals for an amount that achieves the same energy, that is, the same area in the figure are transmitted to be used in synchronous detection. At this time, the training sequence signal interval is J1 at an OFDM subcarrier interval of K1 (Hz), while the training sequence signal interval is J2, which is a half of J1 (J½), at an OFDM subcarrier interval of K2 (Hz) that is twice K1.

It can be revealed from the above that as OFDM subcarrier intervals become larger, training sequence signal intervals become smaller and time variations in carrier offset can be detected more easily, and thus, there is a tolerance to high-speed moving, that is, the receiver can perform demodulation also while moving fast.

Such properties are utilized to make OFDM subcarrier intervals smaller for communication terminals moving at lower speed, for example, indoors, and make OFDM subcarrier intervals larger for communication terminals moving at higher speed in, for example, bullet trains.

When OFDM subcarrier intervals are made smaller for communication terminals of approximately 125 bytes/5 minutes (see Chapter 4.11 of ICT-317669-METIS/D6.1), such as sensors, the band for transmission amplifiers of communication terminals can be narrowed, thus reducing power consumption.

Figure 10:
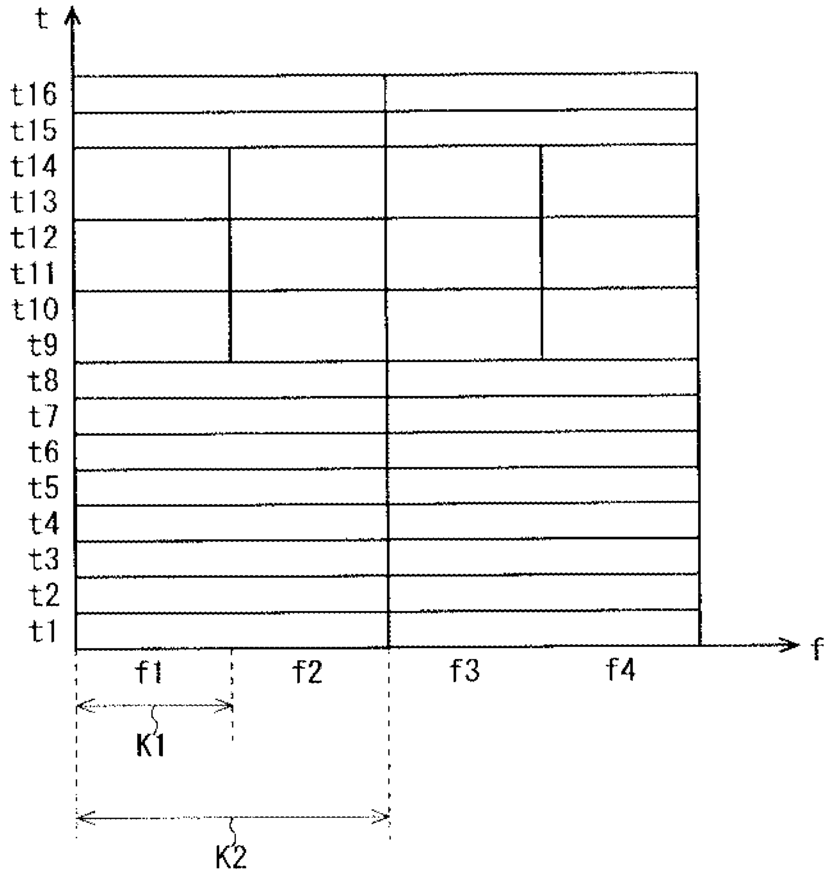
FIG. 10 shows an example of signals when signals having different OFDM subcarrier intervals coexist on a time basis.

In the present embodiment, signals having various OFDM subcarrier intervals can coexist as described above. FIG. 10 shows an example of signals when signals having different OFDM subcarrier intervals coexist on a time basis. The horizontal and vertical axes of FIG. 10 respectively represent a frequency f and a time t. An OFDM subcarrier interval is K1 (Hz) within the range from a time t9 to a time t14, and an OFDM subcarrier interval is K2 (Hz), which is twice K1, within the other time range.

Causing signals having different OFDM subcarrier intervals to coexist on a time basis as shown in FIG. 10 enables modulation and demodulation of OFDM signals in a single FFT size in time. As a result, the hardware sizes or loads of a communication terminal and a base station can be reduced.

Figure 11:
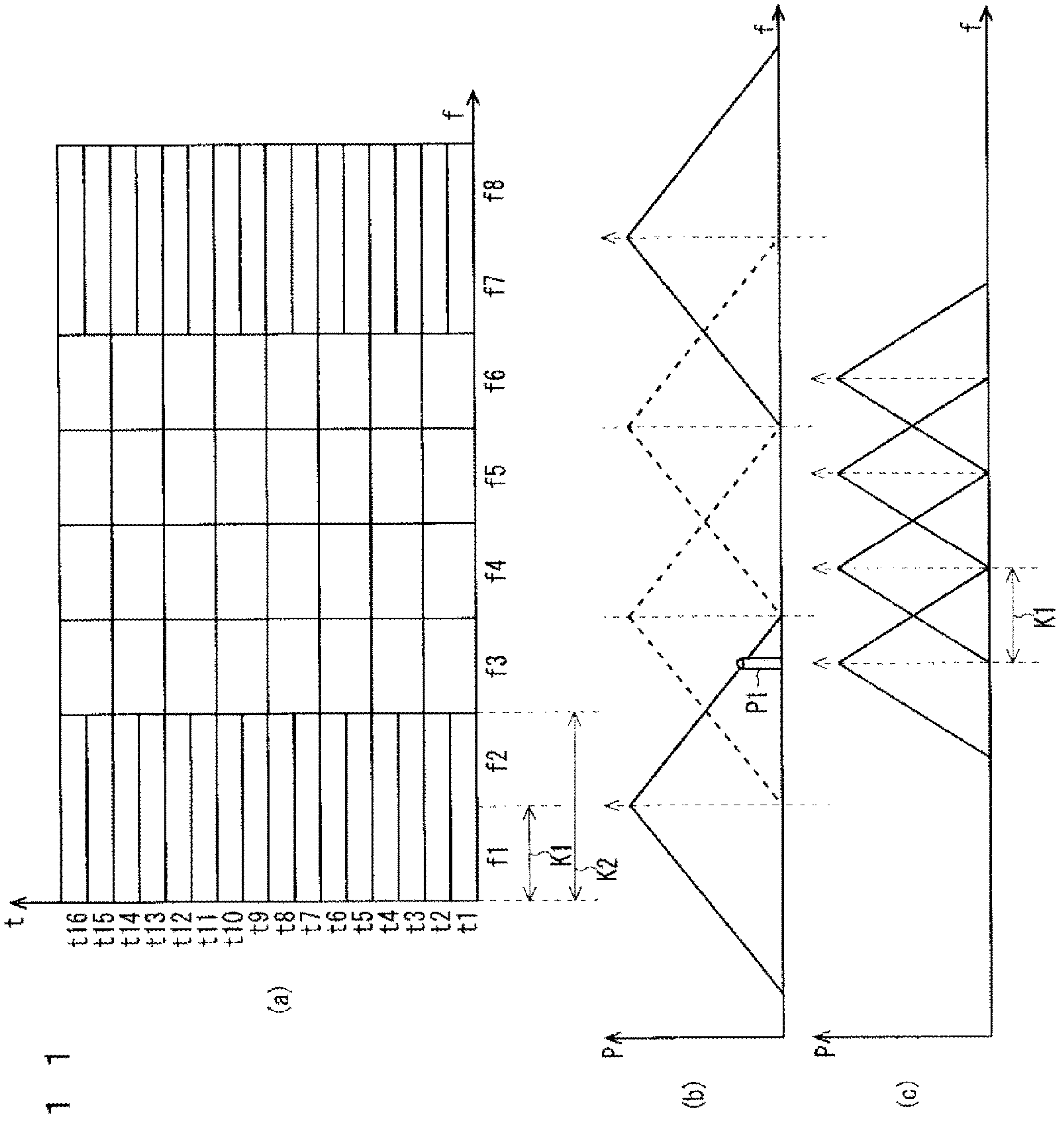
FIG. 11 shows an example of signals when signals having different OFDM subcarrier intervals coexist on a frequency basis.

FIG. 11 shows an example of signals when signals having different OFDM subcarrier intervals coexist on a frequency basis. The horizontal and vertical axes of part (a) FIG. 11 respectively represent a frequency f and a time t. In parts (b) and (c) of FIG. 11, the horizontal and vertical axes respectively represent a frequency f and a power P. An OFDM subcarrier interval is K1 (Hz) within the range from a frequency f3 to a frequency f6, and an OFDM subcarrier interval is K2 (Hz), which is twice K1, within the other frequency range.

Causing signals having different OFDM subcarrier intervals to coexist on a frequency basis as shown in FIG. 11 enables modulation and demodulation in the same process per frequency. At this time, if the intervals of the coexisting OFDM subcarriers are set at n times and one n-th (1/n) each other, the OFDM subcarriers arranged at frequencies apart from each other can be processed by the same inverse fast Fourier transform (IFFT) or fast Fourier transform (FFT). This reduces a hardware size or load.

A transmission can be performed with IFFT in which the portions of dashed lines of FIG. 11 are also used and without allocation of powers of f3+f4 and f5+f6. Similarly, in a reception process, FFT in which the portions of dashed lines of FIG. 11 are also used can be performed, and the data about f3+f4 and f5+f6 can be discarded.

In an effective method, data allocation is not performed at a frequency at which an inter-symbol interference occurs at a boundary between adjacent, different OFDM subcarrier intervals. A signal of f1+f2 and a signal of f3 interfere with each other. That is to say, the power of the signal of f1+f2 is not zero at a peak of f3, which is indicated by an arrow in FIG. 11, and turns into an interference power P1 to f3. It is thus also effective to avoid the use of f3 or the use of f1+f2. To reduce unusable frequency bands, it is more desirable to avoid the use of f3 with a short OFDM subcarrier interval.

Even when an interference occurs at a boundary between adjacent, different OFDM subcarrier intervals, it is also effective to simplify the process by transmitting the same data as that of the case where OFDM subcarrier intervals are not adjacent to each other. This is effective when the signal power of f3 is higher than interference power or when the receiver has an interference removing function.

Figure 12:
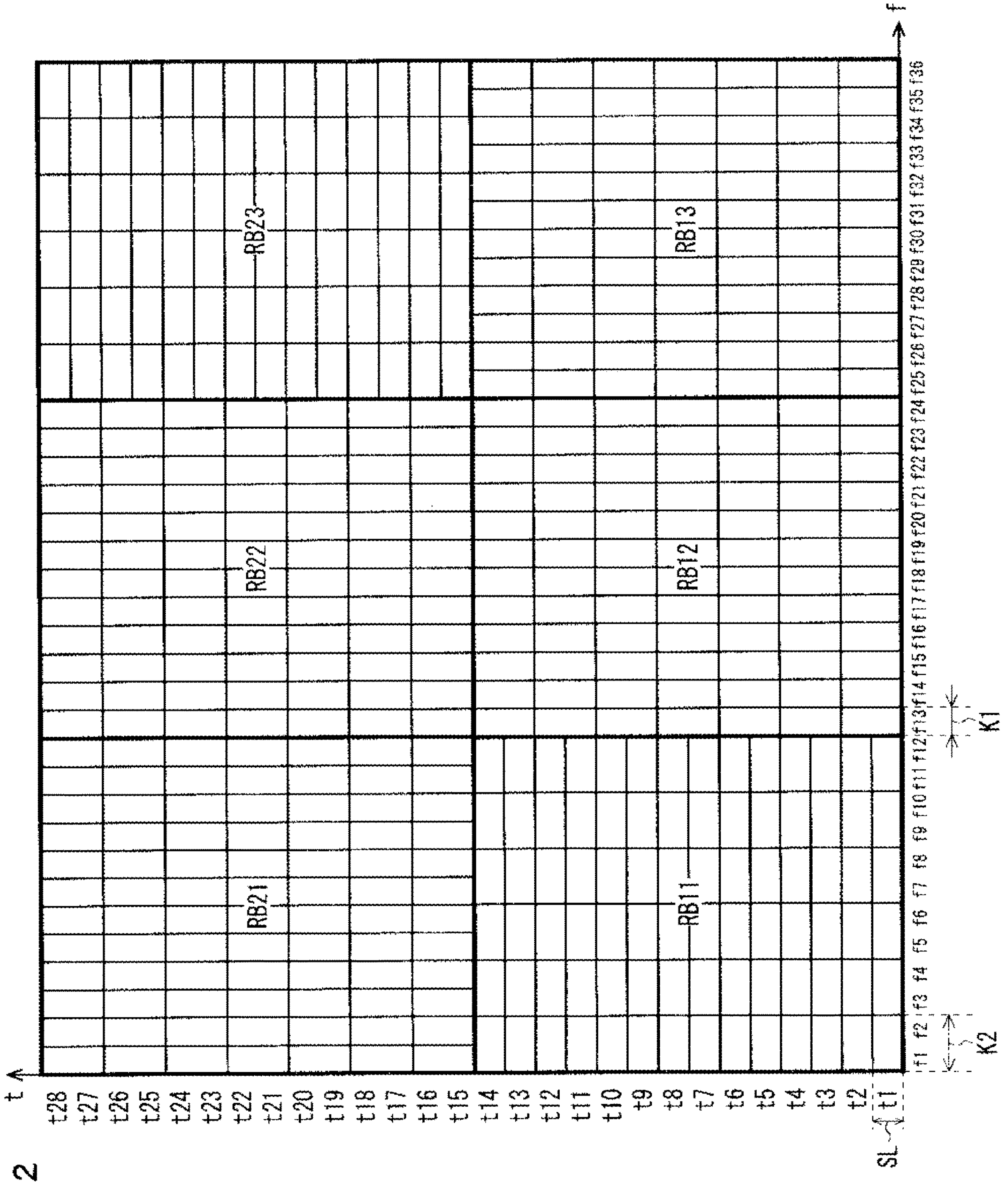
FIG. 12 shows an example of signals when signals having different OFDM subcarrier intervals coexist on a time basis and on a frequency basis.

FIG. 12 shows an example of signals when signals having different OFDM subcarrier intervals coexist on a time basis and on a frequency basis. The horizontal and vertical axes of FIG. 12 respectively represent a frequency f and a time t. FIG. 12 shows an example in which signals having different OFDM subcarrier intervals from one communication terminal to another coexist in the arrangement of a time basis and a frequency basis.

In resource blocks (hereinafter also referred to as "RBs") 11 and 23, the OFDM subcarrier interval is K2 (Hz) that is twice K1, and "6 subcarriers×14 OFDM symbols" is regarded as one resource block. In the other resource blocks, the OFDM subcarrier interval is K1 (Hz), and "12 subcarriers×7 OFDM symbols" is regarded as one resource block. Although two types of resource blocks coexist in the example shown in FIG. 12, three or more types of resource blocks may coexist.

Herein, the "resource block" is the smallest unit for a communication terminal to perform communication, in which no information about a plurality of communication terminals is contained. The resource block is thus the smallest unit of data containing training sequence signals for the receiver to estimate a propagation path. The resource block may be the smallest unit for transmitting data to be subjected to error correction coding. The resource block may be the smallest unit for confirming the delivery of, for example, an automatic repeat request (ARQ) or hybrid ARQ (HARM), on the basis of whether cyclic redundancy check (CRC) is good.

Figure 13:
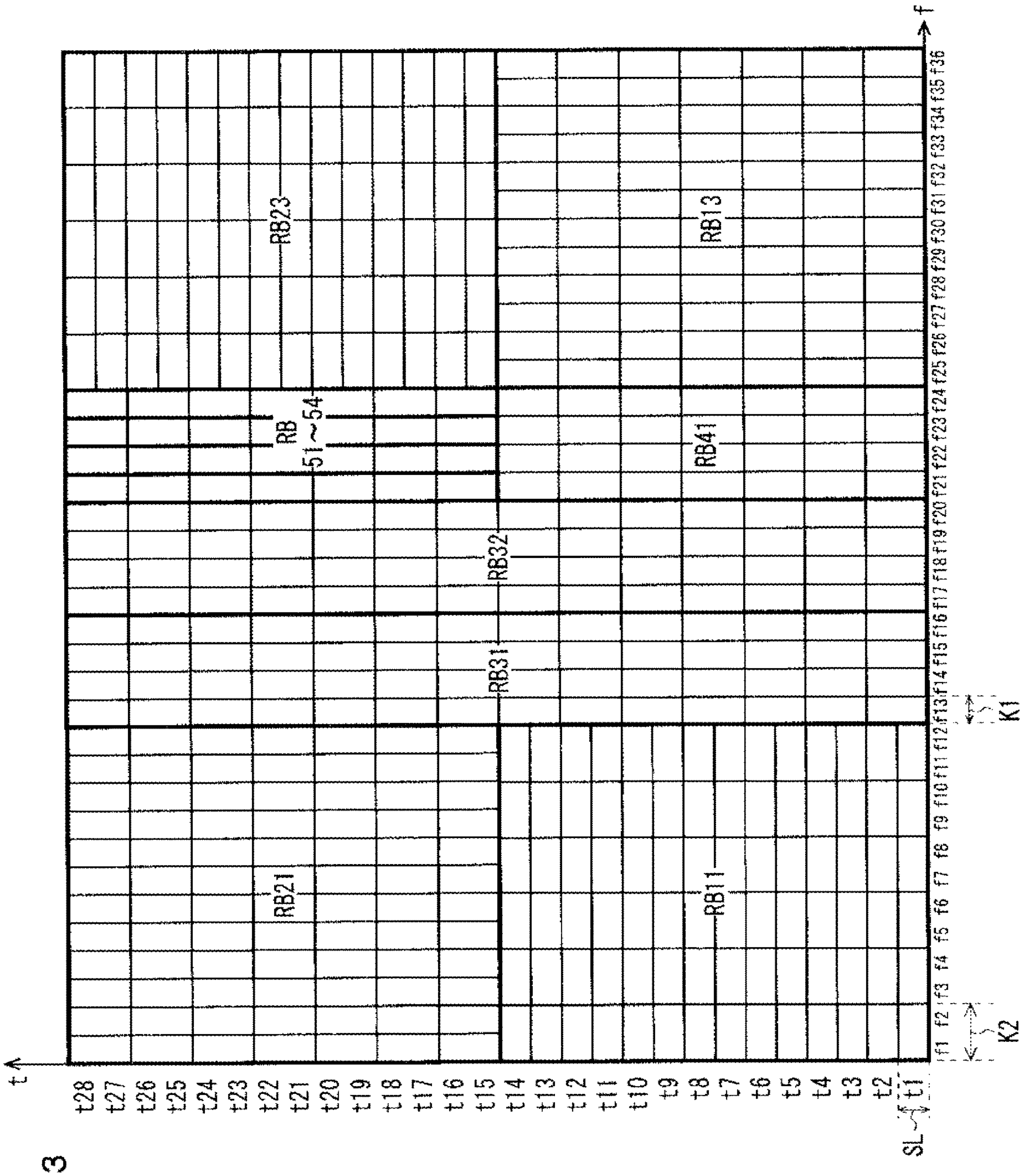
FIG. 13 shows another example of signals when signals having OFDM subcarrier intervals coexist on a time basis and on a frequency basis.

FIG. 13 shows another example of signals when signals having different OFDM subcarrier intervals coexist on a time basis and on a frequency basis. The horizontal and vertical axes of FIG. 13 respectively represent a frequency f and a time t. Although FIG. 12 shows the example in which each resource block has the same sum of spectral widths K1 or K2 and the same sum of OFDM symbol lengths (SLs), as shown in FIG. 13, a resource block may be defined according to an amount of data that occurs per event.

A non-limiting example of the amount of data that occurs per event is 125 bytes in the form of a cluster of data transmitted by the sensor. Examples of a resource block corresponding to such an amount of data include 4 subcarriers×14 OFDM symbols and 1 subcarrier×7 OFDM symbols.

An OFDM subcarrier interval is appropriately allocated in accordance with a change in the moving speed of a communication terminal such as a user equipment for each resource block defined as described above, so that flexible support can be provided according to times and frequencies, thus improving spectral efficiency.

For the purpose above, in the present embodiment, a communication terminal such as a user equipment measures its moving speed using a global positioning system (GPS), and a base station determines an OFDM subcarrier interval using the measurement result received from the communication terminal through RRC or the like. The moving speed may be determined by a communication terminal, such as a user equipment, notifying a base station of only the location information from a GPS and the base station calculating a difference from the last location information. The moving speed may be determined by a base station measuring a round-trip time, for example, a round-trip time with the use of a random access signal, or angular information about an incoming wave and calculating from a change amount thereof.

In another effective method, a communication terminal measures a Doppler frequency from the phase rotation amount of a training sequence and reports the measured Doppler frequency to a base station. The base station uses the measurement result received from the communication terminal through RRC or the like to determine an OFDM subcarrier interval. In another effective method, the communication terminal reports, to the base station, the phase rotation amount per se of a training sequence within a specified time such as one slot or one subframe, or an average thereof.

Alternatively, whether high-speed moving can be supported is provided as a communication terminal capability (hereinafter also referred to as a "UE capability"). The base station sets a large OFDM subcarrier interval to a communication terminal if the communication terminal has a UE capability that allows high-speed moving even though it is not actually moving at high speed. Similarly, the base station sets a small OFDM subcarrier interval to a communication terminal if the communication terminal has a UE capability that allows low-speed moving or the communication terminal cannot move.

The moving speed, the Doppler frequency, the training sequence phase rotation amount in a specified time, or the moving speed (UE capability) that can be supported, described above, is preferably reported through classification into several stages. This reduces an amount of information. For example, the classification into three levels, high speed [bullet trains/trains/cars], low speed [pedestrians], and fixed, is effective. Alternatively, classification into two levels, moving and fixed, is effective.

An OFDM subcarrier interval to be used in communication is determined in accordance with the reported value. The OFDM subcarrier interval may be set to an OFDM subcarrier interval proportional to an actual moving speed or the inverse of a supported moving speed, or a value close thereto.

For a signal to be used in monitoring and common control of neighboring cells for a communication terminal, such as a cell-specific reference signal (CRS), a fixed OFDM subcarrier interval is set irrespective of the moving speed of the communication terminal. As a result, the communication terminal and the base station can effectively perform transmission and reception without exchanging control information.

Similarly to the signals to be used in monitoring and common control of neighbor cells for a communication terminal, it is also effective to allow a common channel to use a fixed OFDM subcarrier interval with a long subcarrier interval irrespective of moving speed and allow a dedicated channel to change an OFDM subcarrier interval in accordance with moving speed.

Also in a dedicated channel, it is effective to allow a common channel (PDCCH in LTE) associated with the dedicated channel to use a fixed OFDM subcarrier interval with a long subcarrier interval irrespective of moving speed and allow a channel of a data portion (PDSCH in LTE) to change per communication terminal.

It is also effective to allow a broadcast channel (PMCH in LTE) to use a fixed OFDM subcarrier interval with a long subcarrier interval irrespective of moving speed.

OFDM subcarrier intervals to be fixed for monitoring and common control of neighbor cells for a communication terminal are provided for relatively increasing OFDM subcarrier intervals and, for example, are set to OFDM subcarrier intervals supporting high-speed moving for ensuring communication quality. This is effective because transmission and reception are enabled irrespective of moving speed.

OFDM subcarrier intervals supporting low-speed moving are provided for relatively reducing OFDM subcarrier intervals, which may be set as follows. Transmission power is increased; a modulation scheme with little degree of modulation, such as binary phase shift keying (BPSK), is used; error correction coding with high error correction capability is used, for example, a coding rate is reduced; or the communication quality for a communication terminal moving at high speed is compensated by a coding gain such as Hadamard code or Zadoff-chu. This reduces OFDM subcarrier intervals, thus reducing the power consumption of a communication terminal.

Described next is a method in which a communication terminal, for example, a user equipment notifies a base station of at least one of its location, the moving speed, the Doppler frequency, and the training sequence phase rotation amount in a specified time, which have been described above.

An example during random access will be described below. In initial connection or when starting communication with a base station that is a moving destination through handover, a communication terminal transmits a signal for synchronization, for example, a random access preamble in Chapters 10.1.5.1 and 10.1.5.2 of Non-Patent Document 1 (3GPP TS36.300).

When receiving the signal for synchronization transmitted from the communication terminal, the base station transmits a signal for notifying the receipt of the signal for synchronization as a random access response and corrects a transmission timing of the communication terminal, thereby making an adjustment to enable the transmission by the communication terminal at a timing at which the base station is during stand-by.

The communication terminal that has received the signal transmitted from the base station transmits a radio resource control (RRC) connection request as the control information for enabling communication dedicated to a communication terminal. The RRC connection request may include, for example, the moving speed of a communication terminal, the Doppler frequency, and the training sequence phase rotation amount in a specified time, which have been described above.

The base station that has received the RRC connection request takes into account the status of the radio resource of the base station used for another communication terminal, for example, whether there is an empty resource, and then, transmits an instruction to change a radio format corresponding to the moving speed, for example, an instruction to change an OFDM subcarrier interval. After transmitting the change instruction and then receiving, from the communication terminal, a response indicating that the change instruction has been accepted, the base station starts transmission and reception in a new radio format.

In some cases, the communication terminal simultaneously is in communication with another base station such as in CoMP, and accordingly, cannot change a radio format for transmitting the same signal. The communication terminal accordingly returns a response indicating acceptance or rejection of the change instruction to the base station in consideration of the communication status.

The procedure above enables a reliable change of a radio format but increases exchanges between the base station and the communication terminal. To avoid such a situation, upon transmitting a radio format change instruction to the communication terminal, the base station may start transmission and reception in the radio format whose change has been instructed. In this case, it is unclear whether the communication terminal has successfully received the change instruction from the base station, and a change may not be accepted depending on the communication status of the communication terminal though it has been received.

It is therefore effective to provide a timer and, if communication cannot be established after the change in a radio format, return a radio format to an original radio format to perform transmission and reception. It is effective to provide a timer that, specifically, measures a time from the transmission of a radio format change instruction to a communication terminal by a base station to the receipt of a change acceptance message (RRC) after the radio format has been changed by the base station, which is transmitted using a new radio format from the communication terminal to the base station.

In another example, which is the same as the example described above up to the receipt of a random access response, a change in a radio format calculated by the communication terminal from a moving speed, a Doppler frequency, a training sequence phase rotation amount in a specified time, or the like may be included in an RRC connection request after the receipt of the random access response.

Although the method of notifying at least one of the location of a communication terminal, a moving speed, a Doppler frequency, and a training sequence phase rotation amount in a specified time through an exchange with a communication terminal has been described in the example of random access described above, the following method may be used. For example, when a base station that is a moving source transmits a handover request to a base station that is a moving destination via an X2 interface, the base station may notify at least one of the location of a communication terminal, a moving speed, a Doppler frequency, and a training sequence phase rotation amount in a specified time, or a radio format determined from the above, for example, an OFDM symbol interval.

Notification may be made via an S1 interface, that is, through handover required via an MME, in place of the X2 interface. Alternatively, notification may be made through a handover request via an Xn interface during dual connectivity.

When setting a radio channel as a random access response to a signal for synchronization that has been transmitted to the base station that is a moving destination from the communication terminal, the base station that is a moving destination may notify a radio format instructed through a handover request or handover required from the base station that is a moving source, for example, an OFDM symbol interval, as a setup value of each physical channel, specifically, a setup value of a physical configuration. At this time, the base station that is a moving destination takes into account the status of the radio resource of the base station used for another communication terminal, for example, whether there is an empty resource and, if there is an empty resource, notifies the instructed radio format.

An example of the measurement configuration will be described next. In one effective method, while a base station and a communication terminal are in communication, the base station transmits a measurement configuration (RRC), and the communication terminal transmits a measurement report (RRC) in accordance with this configuration.

The communication terminal reports, in a measurement report, at least one of its location, its moving speed, a Doppler frequency, and a training sequence phase rotation amount in a specified time. The base station that has received this takes into account the status of the radio resource of the base station used for another communication terminal, for example, whether there is an empty resource, and then, transmits a radio format change instruction corresponding to the moving speed, for example, a reconfiguration.

After receiving the change instruction, the communication terminal takes into account the communication status with another base station, for example, whether CoMP is being performed and, if it is not in communication with another base station or uses the same radio format, transmits a change instruction acceptance response and starts transmission and reception in a new radio format. The base station receives the change instruction acceptance response and then starts transmission and reception in a new radio format.

After transmitting the change instruction, the base station starts transmission and reception in a new radio format after receiving the change instruction acceptance response from the communication terminal. After transmitting the change instruction acceptance response, the communication terminal starts transmission and reception in a new radio format.

Described next is an example in which a communication terminal transmits a request to change a radio format. Separately from random access and measurement configuration, the communication terminal may detect a moving speed from its location, its moving speed, a Doppler frequency, a training sequence phase rotation amount in a specified time, or the like and transmit a request to change a radio format, for example, an OFDM symbol interval.

After receiving the change request, the base station takes into account the status of a radio resource of a base station used for another communication terminal, for example, whether there is an empty resource and, if there is an empty resource, transmits a change acceptance response and starts transmission and reception in a new radio format. After receiving the change acceptance response, the communication terminal starts transmission and reception in a new radio format.

Although the example in which a change in a radio format, for example, an OFDM subcarrier interval is instructed through RRC has been described above, for higher-speed switching, it is also effective to transmit and receive the type of a radio format through MAC.

It is also effective to notify the type of a radio format by a physical signal, concomitantly with the transmission data.

Although the example in which a radio format, for example, an OFDM subcarrier interval is set per communication terminal has been described above, it is also effective to set a radio format per communication terminal group.

Classification into three types, high-speed, low-speed, and fixed, is also effective as grouping of communication terminals, as described above. For example, in an effective method, three types of radio formats are notified in setting of the respective physical channels notified in channel establishment, a communication terminal uses the radio formats while switching among them in accordance with its moving speed, and a base station blindly decodes a radio format from the three types to use the radio format in which CRC is OK.

In another effective method, three types of radio formats are notified in setting of the respective physical channels notified in channel establishment, a communication terminal attaches the number of the radio format being used with data by a physical signal when switching among the radio formats in accordance with its moving speed. At this time, it is effective to set the radio format of a physical signal fixed.

According to the present embodiment as described above, the base station device is configured to set, for each communication terminal device, a radio format for signals transmitted to and received from the communication terminal device. The radio format is set for each communication terminal device in accordance with, for example, the type of use including the moving speed of the communication terminal device. Therefore, a communication system capable of transmitting data at a relatively high speed with a relatively low delay and accommodating various communication terminal devices can be obtained.

In the present embodiment, a radio format is set per communication terminal device on the basis of the type of use including the moving speed of a communication terminal device.

As a result, an appropriate radio format corresponding to the type of use of each communication terminal device can be set. A communication system capable of transmitting data at a higher speed with a lower delay can therefore be obtained.

In the present embodiment, a base station device and a communication terminal device perform radio communication in accordance with orthogonal frequency division multiplexing (OFDM). A signal transmitted and received between the base station device and the communication terminal device has a plurality of radio formats in which at least one of an OFDM symbol length (SL) that is the length of a symbol of a signal and a CP length (CPL) that is the length of cyclic prefix (CP) in OFDM differs. Consequently, a communication system capable of transmitting data at a relatively high speed with a relatively low delay and accommodating various communication terminal devices can be achieved with a simple configuration as described above.

Second Embodiment

A CP length (CPL) in the OFDM access scheme can be reduced when the distance between a communication terminal and a base station is small. The CP length can also be reduced when the spread of the delay dispersion in the channel between a communication terminal and a base station is small.

The fifth-generation radio access scheme whose commercialization is aimed for 2018 to 2020 requires a microwave (SHF) band to a millimeter wave (extra high frequency: EHF) band of a supposedly unused frequency in order to expand the bandwidth, leading to a higher frequency, which increases a propagation loss. In addition to a propagation loss merely increasing, a smaller service area of a base station is required to increase a communication capability per unit area. In the use of an OFDM in the fifth generation, thus, a CP length can be reduced in view of the above situation.

It is however expected that rural areas with a relatively small population, such as farming villages, will need a base station with a large capacity and a large cell radius, and a technique of enabling transmission as farthest possible with, for example, a multi-element antenna is also studied.

As the frequency of a carrier wave becomes higher, an OFDM subcarrier interval needs to be made larger than that of LTE/LTE-A for providing a tolerance to a Doppler frequency. In other words, the OFDM symbol length is the inversion of an OFDM subcarrier interval, so the OFDM symbol length needs to be reduced. Thus, the overhead of a CP length greatly affects spectral efficiency.

An excessively small CP length causes problems as follows: (1) interference occurs between symbols, which may degrade communication quality, and (2) when a communication terminal operates in a low power consumption mode such as discontinuous reception, communication quality may degrade due to insufficient synchronization accuracy.

Various types of use are conceivable as described above, where the CP length of downlink PDSCHs to be simultaneously transmitted is fixed in one cell in the current radio format of LTE/LTE-A. In this case, for example, a communication terminal uses a secondary synchronization signal S-SS transmitted from a base station to blindly detect a CP length. When a downlink CP length is fixed in one cell as described above, communication quality or spectral efficiency may deteriorate significantly.

As a technique of preventing such deterioration, the present embodiment discloses a technique of using, per communication terminal, a signal having a different CP length in accordance with the type of use in an OFDM access scheme. This technique can be used to improve spectral efficiency.

Figure 14:
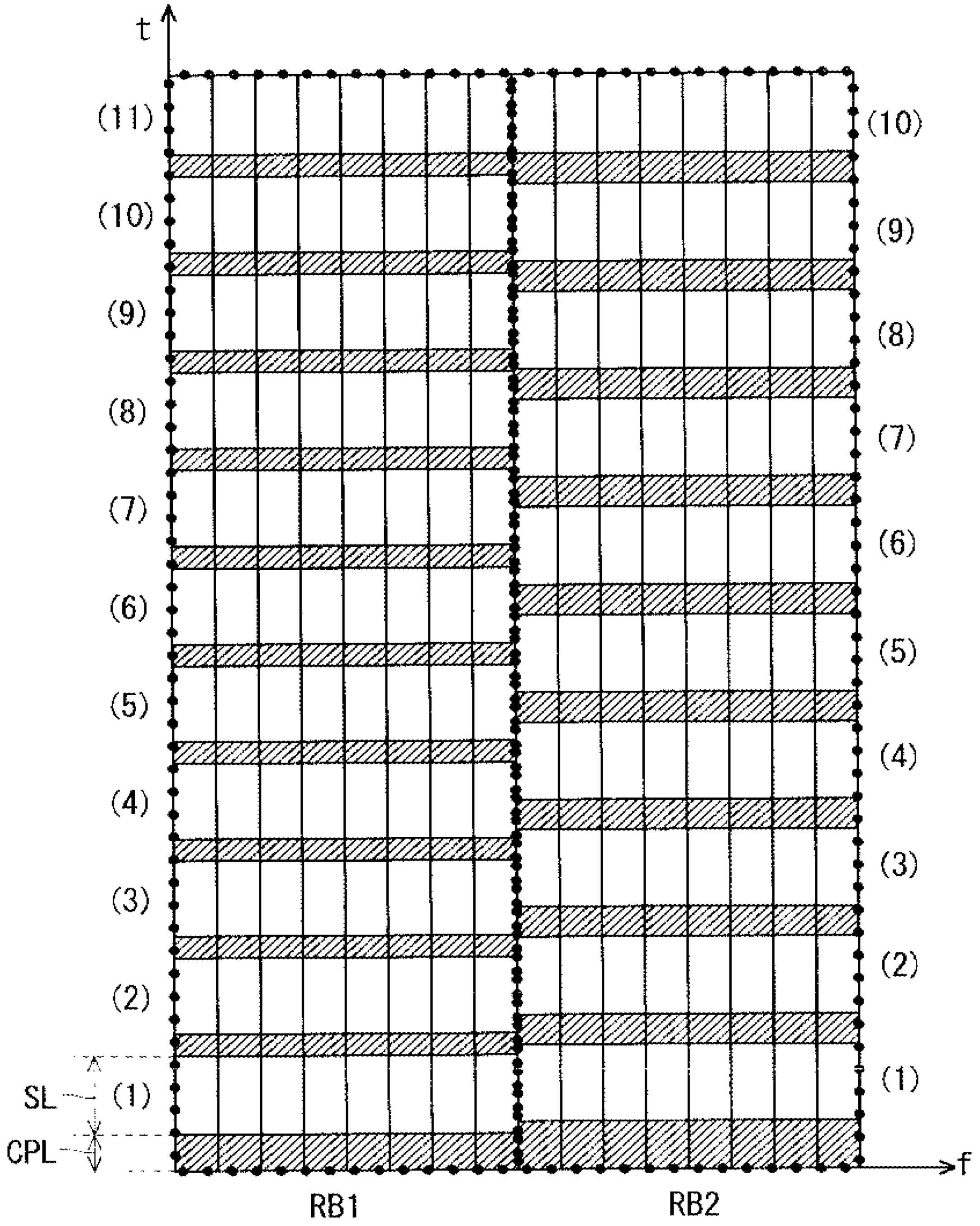
FIG. 14 shows an example of formats used in a second embodiment of the present invention.
Figure 15:
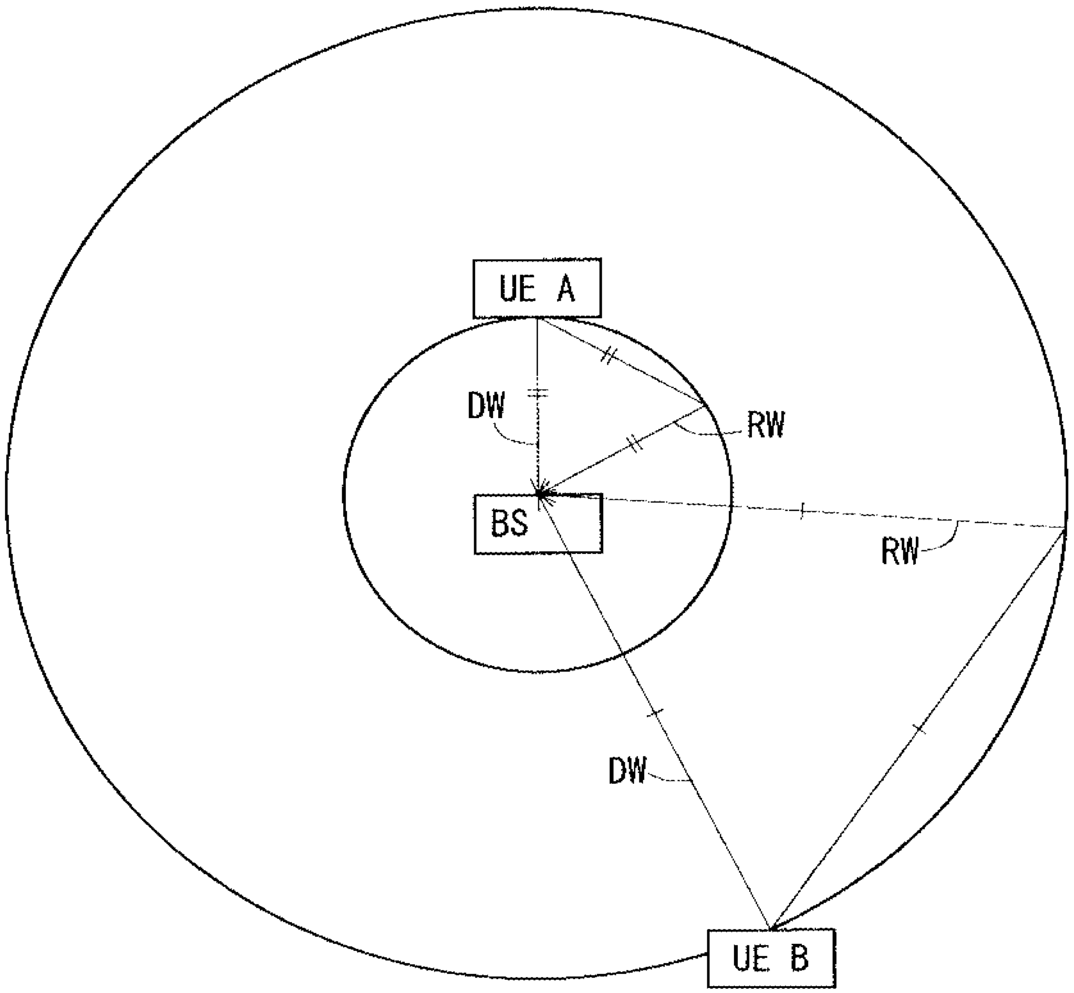
FIG. 15 shows an example of a speed-of-light propagation distance in delay dispersion due to a direct wave and a reflected wave of a communication terminal.

FIG. 14 shows an example of formats used in a second embodiment of the present invention. The horizontal and vertical axes of FIG. 14 respectively represent a frequency f and a time t. FIG. 14 shows an example in which a communication terminal uses resource blocks with different CP lengths depending on the distance from a base station. FIG. 15 shows an example of a speed-of-light propagation distance in delay dispersion due to a direct wave (DW) and a reflected wave (RW) of a communication terminal.

As shown in FIG. 14, a resource block (RB) 1 is configured of 8 subcarriers×11 OFDM symbols=88 OFDM symbols. When an OFDM subcarrier interval is set to 120 kHz where a clock period Ts that is the inverse of a clock frequency is 1/245.76 MHz, for example, an OFDM symbol length (SL) is 2048 Ts (=245.76 MHz/120 kHz), the head CP length (CPL) of the resource block is 768 Ts, the other CP lengths (CPLs) are 128 Ts, and the sum in the resource block is 24576 Ts=0.1 ms.

The spread of the delay dispersion that can be supported becomes equal to a minimum CP length, and thus, this is a format that can be used up to 128 Ts=0.52 μs, that is, approximately 150 m at speed of light. The speed-of-light propagation distance in delay dispersion due to a direct wave (DW) and a reflected wave (RW) of a communication terminal A (UE A) shown in FIG. 15 is the distance between the communication terminal A (UE A) and a base station (BS), and thus, an indication of a cell radius that can be supported is regarded as 150 m. The resource block (RB) 1 shown in FIG. 14 is for communication terminals located within distances smaller than 150 m.

A resource block (RB) 2 is configured of 8 subcarriers×10 OFDM symbols=80 OFDM symbols, in which an OFDM symbol length (SL) is 2048 Ts, the head CP length (CPL) of the resource block is 512 Ts, the other CP lengths (CPLs) are 384 Ts, and the sum in the resource block is 24576 Ts=0.1 ms.

The spread of delay dispersion that can be supported is equal to a minimum CP length, and thus, this is a format that can be used up to 384 Ts=1.56 μs, that is, approximately 450 m at speed of light. The speed-of-light propagation distance in delay dispersion due to a direct wave (DW) and a reflected wave (RW) of a communication terminal B (UE B) shown in FIG. 15 is the distance between the communication terminal B (UE B) and the base station (BS), and thus, an indication of a cell radius that can be supported is regarded as 450 m. The resource block (RB) 2 shown in FIG. 14 is for communication terminals located within distances smaller than 450 m.

Configuring appropriate resource blocks in accordance with the distance of a communication terminal from a base station increases the amount of transmittable data by 10% in the resource block (RB) 1 compared with the case where only the resource block (RB) 2 is used uniformly, even with the same resource block size.

Although the resource blocks having two types of CP lengths are transmitted while changing frequencies in the present embodiment as described above, three or more types of CP lengths may be provided. Alternatively, a resource block whose CP length varies per time may be used.

In the example of the formats of FIG. 14, the CP length (CPL) and the OFDM symbol length (SL) are each an integral multiple of 128 Ts. This corresponds to 245.76 MHz/1.92 MHz=128 and means that they are each an integral multiple of 1.92 MHz that is a sampling clock (hereinafter also referred to as a "reference clock") of a communication terminal having a 1.4-MHz bandwidth in LTE. This also means that they are integral multiples of 7.68 MHz of a sampling clock having a 5-MHz bandwidth, 15.36 MHz of a sampling clock having a 10-MHz bandwidth, and 30.72 MHz of a sampling clock having a 20-MHz bandwidth.

It is revealed from the above that a communication terminal in an LTE/LTE-A dual mode can be formed of a single clock source with the use of the formats shown in FIG. 14, reducing the cost of a communication terminal.

The distance between a base station and a communication terminal is effectively determined by the following method.

For example, a communication terminal notifies a base station of the location information of a GPS mounted in the communication terminal. The base station calculates a distance between the base station and the communication terminal from a difference between the location information thereof that has been written in the memory of the base station or a device that monitors the maintenance of the base station in the installation of the base station and the location information of the GPS that has been notified by the communication terminal. Alternatively, the base station calculates a distance between the base station and the communication terminal from a difference between the location information of the GPS included in the base station and the location information of the GPS notified by the communication terminal.

In one effective method, a signal transmitted from a communication terminal is used to convert a shift from a specified time into a distance. In this case, as in timing advanced control in LTE/LTE-A, the base station may receive a random access signal to convert a shift from a specified time into a distance.

In another example method, irrespective of an actual distance between a communication terminal and a base station, the communication terminal may report, to a base station, the result obtained by measuring the delay dispersion of a downlink signal. In this case, as long as the communication terminal is in line of sight with the base station and experiences a relatively small number of reflected waves though it is relatively remote from the base station, a CP length can be set small, resulting in an improved spectral efficiency.

In the format for an uplink signal, a base station may measure delay dispersion and determine a CP length of an uplink signal in accordance with a result of the measurement, and then, the base station may instruct a communication terminal of the CP length. This increases spectral efficiency. Alternatively, when the frequency is the same in uplink and downlink as in time division duplex (TDD), a base station may measure the delay dispersion of an uplink signal from a communication terminal and set a CP length of a downlink signal corresponding thereto.

Irrespective of an actual distance between a communication terminal and a base station, for example, a CP length may be determined per beam by a multi-element antenna in the same base station or the same cell. In this case, a CP length is reduced if, for example, the directivity of a beam at an elevation angle is controlled and narrowed down to a point relatively close to the base station. Contrastingly, a CP length is increased if a beam arrives at a point relatively remote from the base station.

For example, delay dispersion decreases when a beam is considerably narrow with the use of a large number of element antennas, so that a base station can determine whether a CP length can be reduced even if a communication terminal is remote from the base station using the delay dispersion report value from the communication terminal and control the CP length.

Next, a method of setting a CP length will be described. The present embodiment discloses the following first to third methods as the method of setting a CP length.

Figure 16:
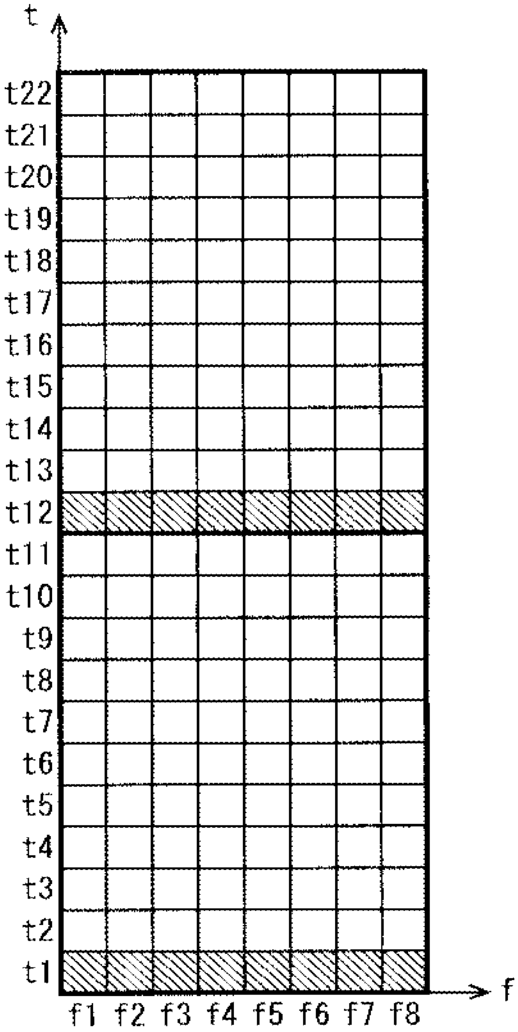
FIG. 16 shows an example of resource blocks in which training sequences are inserted.
Figure 17:
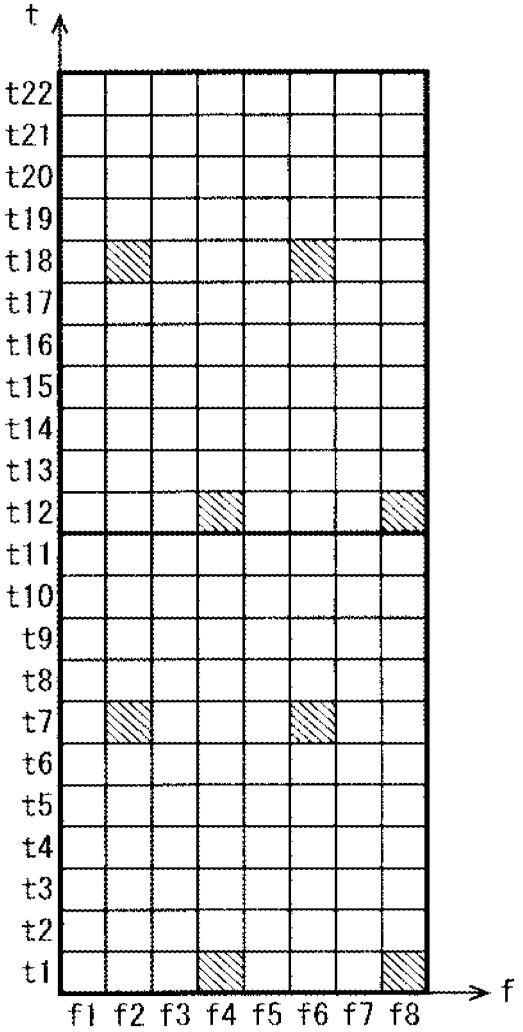
FIG. 17 shows an example of resource blocks in which training sequences are inserted.

In the first method, a receiver detects a CP length without notification of a message. FIGS. 16 and 17 each show an example of resource blocks in which training sequences are inserted. In FIGS. 16 and 17, the horizontal and vertical axes respectively represent a frequency f and a time t. FIGS. 16 and 17 each show the case in which training sequences are inserted in a resource block of 8 subcarriers×11 OFDM symbols.

In the example shown in FIG. 16, all the OFDM subcarriers in the head t1 and t12 of the two respective resource blocks are training sequences. In this case, the receiver device can calculate a CP length upon receipt of the first symbol of the resource block. This can also vary a CP length on a resource block basis.

In the example shown in FIG. 17, training sequences are transmitted intermittently at only t1 of a frequency f4 and t1 of a frequency f8, and thus, the receiver detects a CP length from this signal. This increases transmission data, thus increasing spectral efficiency.

In the second method, the CP length of a resource for notification of a message containing CP length control information is set to a fixed or relatively long CP length, and the CP length of a resource for data transmission and reception is set to a CP length corresponding to the CP length control information. The CP length control information includes information on the CP length of to-be-transmitted data and the CP length used by the communication terminal.

A resource for notification of a message containing CP length control information is allocated periodically, for example, every 10 ms to resource blocks including frequencies around the center of a to-be-transmitted OFDM subcarrier. This enables exchange of control information at the same frequency even in a narrow-band communication terminal that uses only frequencies around the center of an OFDM subcarrier.

In particular, in setting of a CP length per beam, CP length control information may be notified, with the CP length of a common channel per beam, such as a broadcast channel, set to a fixed or relatively long CP length. Consequently, the communication terminal that uses this beam receives the common channel to obtain a CP length to be used in data exchange. The CP length can therefore be set in accordance with a beam setting status such as pointing the beam directivity to a position close to the base station, thus improving spectral efficiency.

Figure 18:
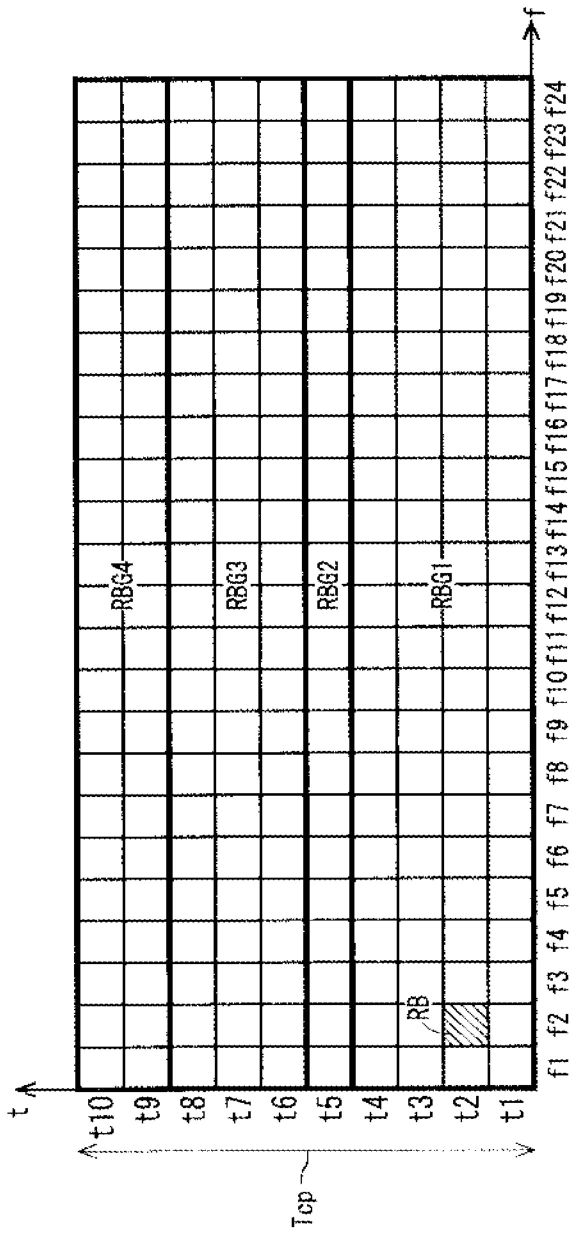
FIG. 18 is a diagram for explaining a modification of a second approach.

FIG. 18 is a diagram for explaining a modification of the second method. The horizontal and vertical axes of FIG. 18 respectively represent a frequency f and a time t. FIG. 18 shows, as the modification of the second method, the case in which a CP length is designated in advance in accordance with the arrangement of time resources to be used in communications. In the example shown in FIG. 18, there are 24 resource blocks in the frequency f direction, and the same setting is provided repeatedly every 10 resource blocks in the time t direction. In FIG. 18, the repetition period for setting a CP length is represented by Tcp.

For example, resource block groups (RBGs) 1 and 3 have a CP length of 128 Ts, and resource block groups (RGBs) 2 and 4 have a CP length of 384 Ts. The resource arrangement information and the repetition period for setting are notified to the communication terminal over a broadcast channel.

For a communication terminal adjacent to a base station, a resource is selected from the resource block groups (RBGs) 1 and 3 when a resource is allocated to the communication terminal by a MAC scheduler. For example, the use of f2 and t2 is designated.

The communication terminal to which the resource has been allocated can specify a CP length from the broadcast information and the location information on the resource allocated by the scheduler. If the communication terminal moves greatly and the CP length needs to be increased in the next allocation by the scheduler, a resource is selected from the resource block groups (RBGs) 2 and 4.

As described above, merely designating a resource arrangement can set a CP length, thus eliminating the need for exchanging control information for CP length setting in every time. Although the description has been given using the time resources with reference to FIG. 18, the method of designating a CP length on a frequency resource basis or a resource block basis is also effective.

Although the example of two types of CP lengths has been described above, an example of three or more types of CP lengths is also effective.

The CP length setting repetition period described above is desirably an integral submultiple of the broadcast information repetition period.

During carrier aggregation, setting may differ per carrier component.

In the third method, a radio format having an increased CP length is used, and after the type of use and conditions for use are satisfied, a CP length is changed.

For example, at an initial stage of communication, during a DRX operation period (active time), or immediately after DRX is complete, a communication terminal notifies, with the use of a radio format having an increased CP length, that it has sufficiently achieved time synchronization with a base station, and thereafter, the base station changes the CP length. Conversely, the base station increases the CP length in response to a DRX start instruction.

As described above, in the present embodiment, a base station device is configured to change a radio format for a communication terminal device in accordance with the information on a change in the environment of radio communication with the communication terminal device and a change including the location of the communication terminal device. As a result, a more appropriate radio format can be set for each communication terminal device. Therefore, a communication system capable of transmitting data at a higher speed with a lower delay can be achieved.

In the message of the current 3GPP, a CP length in uplink can be changed through RRC connection reconfiguration or the like, but a CP length in downlink cannot be changed. Contrastingly, the present embodiment enables, even for a downlink signal, (1) changing a CP length in accordance with a distance between the base station and the communication terminal, and (2) changing an OFDM symbol length in accordance with the moving speed of a communication terminal. Therefore, a good communication environment can be maintained correspondingly to a change in the communication status due to an increase in frequency and a decrease in symbol length, which occurs in a 5G radio access system.

Description will be given of a procedure for changing a radio format (CP length) of the second embodiment as in the first embodiment.

Described below is a method in which a communication terminal notifies a base station of at least one of its location, a distance from the base station, and a delay dispersion measured value.

An example during random access will be described. In initial connection or when starting communication with a base station that is a moving destination through handover, a communication terminal transmits a signal for synchronization, for example, a random access preamble in Chapters 10.1.5.1 and 10.1.5.2 of Non-Patent Document 1 (3GPP TS36.300) to the base station.

When receiving the signal for synchronization transmitted from the communication terminal, the base station transmits a signal for notifying the receipt of the signal for synchronization as a random access response and corrects a transmission timing of the communication terminal, thereby making an adjustment to enable the transmission by the communication terminal at a timing at which the base station is during standby.

The communication terminal that has received the signal transmitted from the base station transmits a radio resource control (RRC) connection request as the control information for enabling communication dedicated to a communication terminal. The RRC connection request may include at least one of the location of the communication terminal, the distance from the base station, and the delay dispersion measured value described above.

The base station that has received this request takes into account the status of the radio resource of the base station used for another communication terminal, for example, whether there is an empty resource, and then, transmits an instruction to change a radio format corresponding to the moving speed, for example, an instruction to change an OFDM subcarrier interval. After transmitting the change instruction and then receiving, from the communication terminal, a response indicating that the change instruction has been accepted, the base station starts transmission and reception in a new radio format.

In some cases, the communication terminal simultaneously is in communication with another base station such as in CoMP, and accordingly, cannot change a radio format for transmitting the same signal. The communication terminal accordingly returns a response indicating acceptance or rejection of the change instruction to the base station in consideration of a communication status.

The procedure above enables a reliable change of a radio format but increases exchanges between the base station and the communication terminal. To avoid such a situation, upon transmitting a radio format change instruction to the communication terminal, the base station may start transmission and reception in the radio format whose change has been instructed. In this case, it is unclear whether the communication terminal has successfully received the change instruction from the base station, and a change may not be accepted depending on the communication status of the communication terminal, though it has been received.

It is thus effective to provide a timer and, if communication cannot be established after the change in a radio format, return the radio format to an original radio format to perform transmission and reception. It is effective to provide a timer that, specifically, measures a time from the transmission of a radio format change instruction to a communication terminal by a base station to the receipt of a change acceptance message (RRC) after the radio format has been changed by the base station, which is transmitted using a new radio format from the communication terminal to the base station.

In another example, which is the same up to the receipt of a random access response, a change in a radio format calculated from at least one of the location of the communication terminal, the distance from the base station, and the delay dispersion measured value, for example, a change in a CP length may be included in an RRC connection request after the receipt of the random access response.

Although the example of random access has described the method of notifying at least one of the location of the communication terminal, the distance from the base station, and the delay dispersion measured value in an exchange with the communication terminal, the method may be as follows. For example, when a base station that is a moving source transmits a handover request to a base station that is a moving destination via an X2 interface, the base station may notify at least one of the location of the communication terminal, the distance from the base station, and the delay dispersion measured value, or a radio format determined from the above, for example, a CP length.

Notification may be made via an S1 interface, that is, through handover required via an MME, in place of an X2 interface. Alternatively, notification may be made through a handover request via an Xn interface during dual connectivity.

The base station that is a moving destination may notify a setup value of each physical channel when setting a radio channel as a random access response to a signal for synchronization that has been transmitted to the base station that is a moving destination from the communication terminal. Specifically, a radio format instructed through a handover request or handover required from the base station that is a moving source, for example, a CP length may be notified as a setup value of a physical configuration. At this time, the base station that is a moving destination takes into account the status of a radio resource of a base station used for another communication terminal, for example, whether there is an empty resource, and if there is an empty resource, notifies the instructed radio format.

An example of the measurement configuration will be described next. In one effective method, while a base station and a communication terminal are in communication, the base station transmits a measurement configuration (RRC), and the communication terminal transmits a measurement report (RRC) in accordance with this configuration.

The communication terminal reports, in a measurement report, at least one of its location, the distance from the base station, and the delay dispersion measured value. The base station that has received this takes into account the status of the radio resource of the base station used for another communication terminal, for example, whether there is an empty resource, and then, transmits a radio format change instruction corresponding to the moving speed, for example, a reconfiguration.

After receiving the change instruction, the communication terminal takes into account the communication status with another base station, for example, whether CoMP is being performed, and if it is not in communication with the other base station or uses the same radio format, transmits a change acceptance response and starts transmission and reception in a new radio format. The base station receives the change acceptance response and then starts transmission and reception in a new radio format.

After transmitting the change instruction, the base station starts transmission and reception in a new radio format after receiving a change instruction acceptance response from the communication terminal. After transmitting the change instruction acceptance response, the communication terminal starts transmission and reception in a new radio format.

Described next is an example in which a communication terminal transmits a request to change a radio format. Separately from random access and measurement configuration, the communication terminal may transmit a request to change a radio format, for example, a CP length derived from at least one of its location, a distance from the base station, and a delay dispersion measured value.

After receiving the change request, the base station takes into account the status of a radio resource of a base station used for another communication terminal, for example, whether there is an empty resource, and if there is an empty resource, transmits a change acceptance response and starts transmission and reception in a new radio format. After receiving the change acceptance response, the communication terminal starts transmission and reception in a new radio format.

Although the example in which a radio format, for example, a CP length is instructed through RRC has been described above, for higher-speed switching, it is also effective to transmit and receive the type of a radio format through MAC. It is also effective to notify the type of a radio format by a physical signal, concomitantly with the transmitted data.

Although the example in which a radio format, for example, a CP length is set per communication terminal has been described above, it is also effective to set a radio format per communication terminal group.

Classification into three types, large, middle, and small in delay dispersion, is also effective as grouping of communication terminals. For example, in an effective method, three types of radio formats are notified in setting of the respective physical channels notified in channel establishment, a communication terminal uses the radio formats while switching among them in accordance with its moving speed, and a base station blindly decodes a radio format from the three types to use the radio format in which CRC is OK.

In another effective method, three types of radio formats are notified in setting of the respective physical channels notified in channel establishment, a communication terminal attaches the number of the radio format being used to data by a physical signal when switching among the radio formats in accordance with its moving speed. At this time, it is effective to set the radio format of a physical signal fixed.

Third Embodiment

A non-limiting example of the technique of controlling interference between neighbor cells using the same frequency is enhanced inter-cell interference coordination (eICIC) under discussion of 3GPP. To apply this technique, the units of the time and frequency for data control between cells need to be matched. In the LTE system, a 1-ms subframe is defined as a minimum time unit. Herein, the time for data control is a minimum data transmission and reception unit and, for example, is a resource block (RB) in LTE of 3GPP.

When a time shift occurs between cells, a signal of the shift portion becomes interference for the signals of the respective cells, degrading the communication capability such as data throughput.

It is assumed that various communication terminals are connected to a base station in a 5G radio system or the like. In that case, a different radio format is assumably set for each communication terminal. The radio format is, for example, a parameter related to an OFDM symbol, and examples of which include an OFDM symbol length, a frequency interval of an OFDM subcarrier, and a cyclic prefix (CP) length. If radio formats coexist, the units of the time and frequency for data control may not be matched, and inter-cell interference control or the like may not be performed with high performance.

Figures 19, 20:
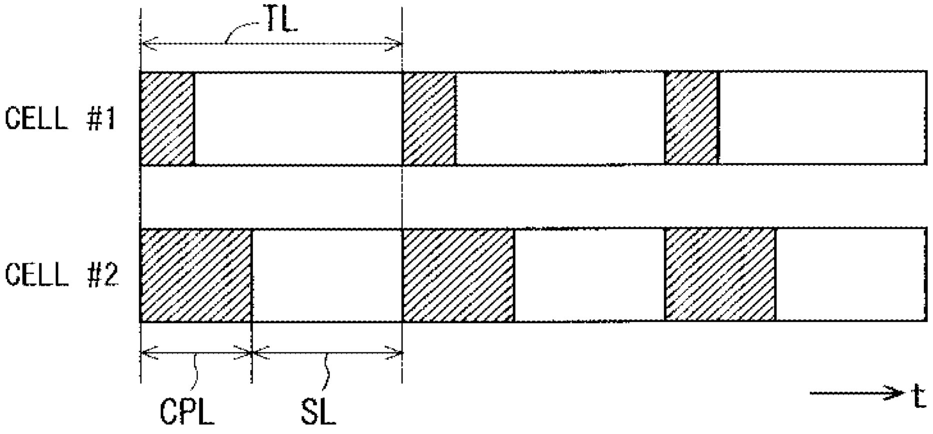
FIG. 19 shows an example of radio formats of a cell #1 and a cell #2.
FIG. 20 shows an example of parameters of the radio formats of the cell #1 and the cell #2.

As a measure against the problem as described above, data symbol lengths defined in the respective radio formats are made the same if radio formats coexist in the present embodiment. Herein, the data symbol length is a time obtained by adding up an OFDM symbol length and a CP length. FIG. 19 shows an example of radio formats of a cell #1 and a cell #2. The horizontal axis of FIG. 19 represents a time t. FIG. 20 shows an example of parameters of the radio formats of the cell #1 and the cell #2. FIGS. 19 and 20 show the case in which data symbol lengths (TLs) of the cell #1 and the cell #2 are matched to each other.

For example, as shown in FIG. 20, when two radio formats coexist, in the first radio format indicated by No. 1, an OFDM symbol length SL is set to 4.18 microseconds (μs), a CP length (CPL) is set to 5.15 μs, and a total data symbol length (TL) is set to 9.33 μs. In the second radio format indicated by No. 2, an OFDM symbol length SL is set to 8.33 μs, a CP length (CPL) is set to 1.00 μs, and a total data symbol length (TL) is set to 9.33 μs. As a result, interference control or the like can be performed per data symbol length (TL), enabling communication resistant to inter-cell interference. For example, as shown in FIG. 19, the radio format No. 1 is used in the cell #2, and the radio format No. 2 is used in the cell #1.

In one method, a data symbol length is set to an integral multiple of a reference data symbol length in coexisting radio formats. In that case, interference control is performed in units of time of a least common multiple of data symbol lengths used in the coexisting radio formats, thus enabling communication without degrading an interference removal capability.

Further, setting a data symbol length to an integral multiple of a reference data symbol length makes a time unit of the least common multiple smaller than that in the case where a symbol length is determined freely per radio format, resulting in an effect that an interference control unit time can be reduced.

Figure 21:
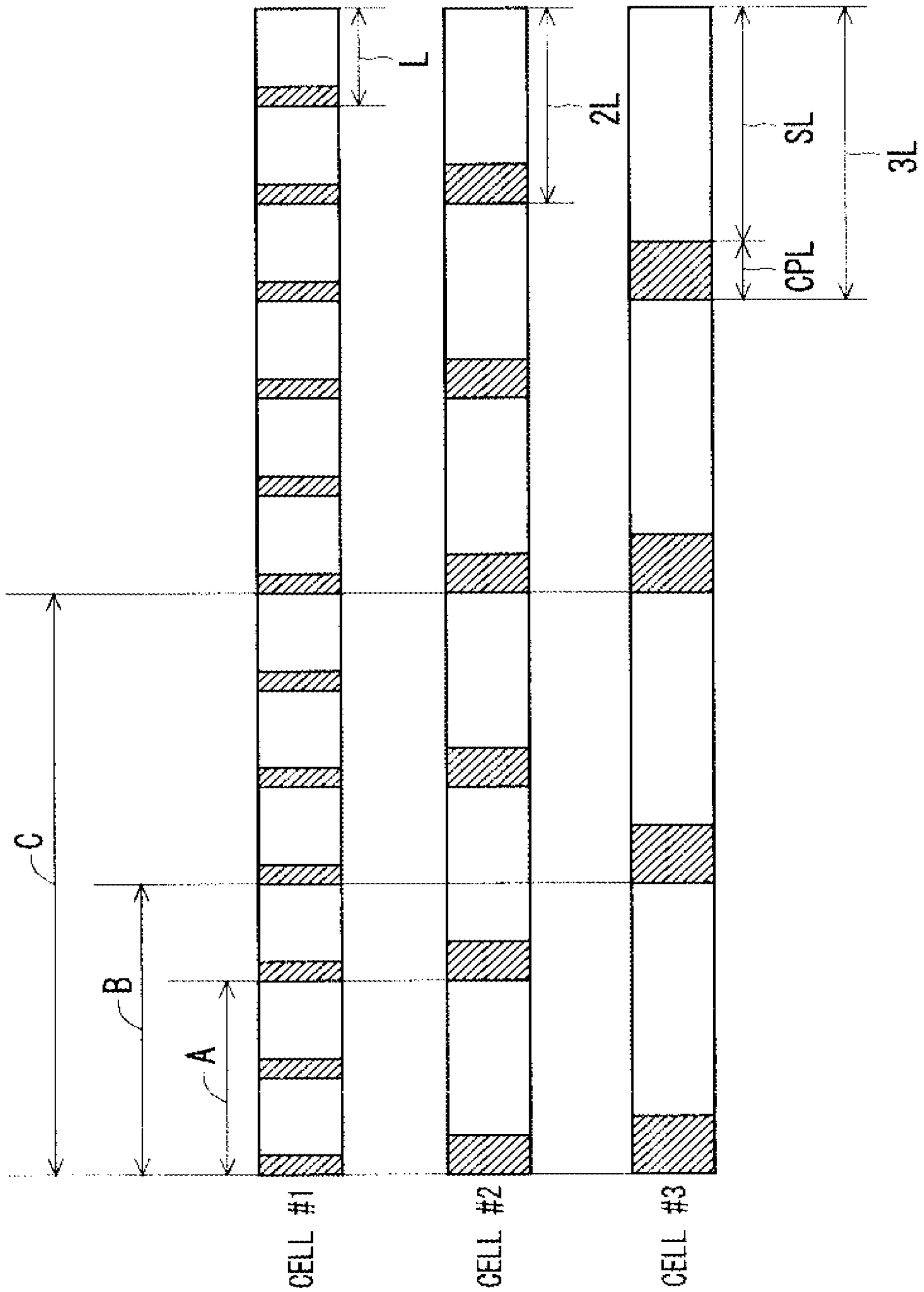
FIG. 21 shows an example of radio formats of a cell #1 to a cell #3.
Figures 22, 23:
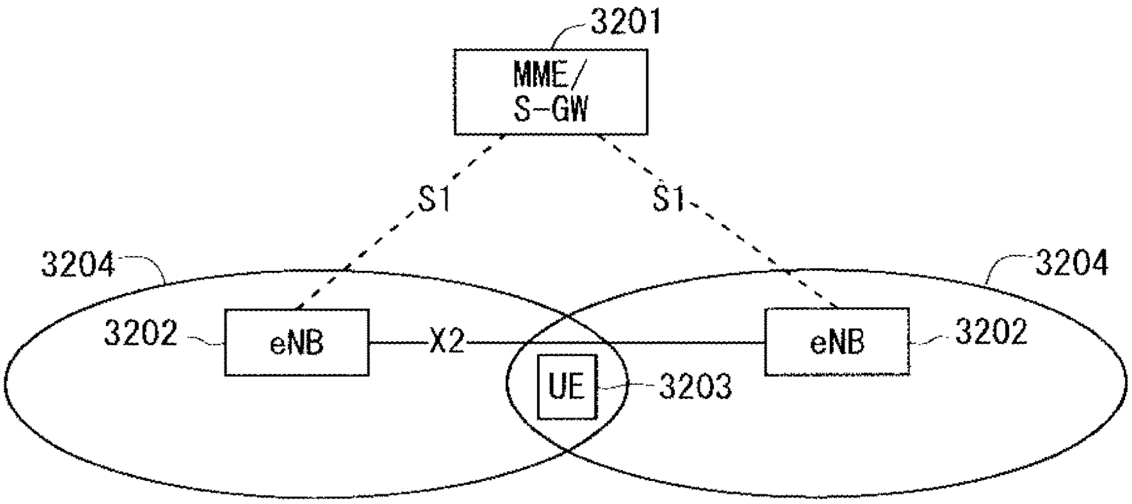
FIG. 22 shows an example of parameters of the radio formats of the cell #1 to the cell #3.
FIG. 23 shows a system in which cells of different independent base stations are adjacent to each other.

FIG. 21 shows an example of radio formats of a cell #1 to a cell #3. FIG. 22 shows an example of parameters of the radio formats of the cell #1 to the cell #3. FIGS. 21 and 22 show the case in which the data symbol of each radio format is set to an integral multiple of a reference data symbol length.

In FIG. 21, A represents a time of a minimum control unit in which interference control is performed between the cell #1 and the cell #2, B represents a time of a minimum control unit in which interference control is performed between the cell #1 and the cell #3, and C represents a time of a minimum control unit in which interference control is performed between the cell #2 and the cell #3. Ra in FIG. 22 represents a ratio of a data symbol length, where a data symbol length L of the cell #1 is a reference (=1).

As shown in FIGS. 21 and 22, the data symbol length of the radio format used in the cell #2 is 2L that is twice the data symbol length L of the radio format used in the cell #1. The data symbol length of the radio format used in the cell #3 is 3L that is three times the data symbol length L of the radio format used in the cell #1.

Examples of the way of determining a unit time at which interference control is performed when cells have different data symbol lengths, described above, include a method of sharing the information on data symbol length between neighbor cells, between which interference control is performed, and a method of using a fixed value. When a data symbol length is shared, a unit time at which interference control is performed can be set to a minimum time in accordance with the state of neighbor cells, enabling efficient data transmission and reception scheduling, which enhances spectral efficiency. When a fixed value is used, the information on data symbol length does not need to be transmitted over a control message between neighbor cells, which simplifies control. A non-limiting example of the way of determining a fixed value is a method of determining a fixed value statically in advance in specifications.

Figure 24:
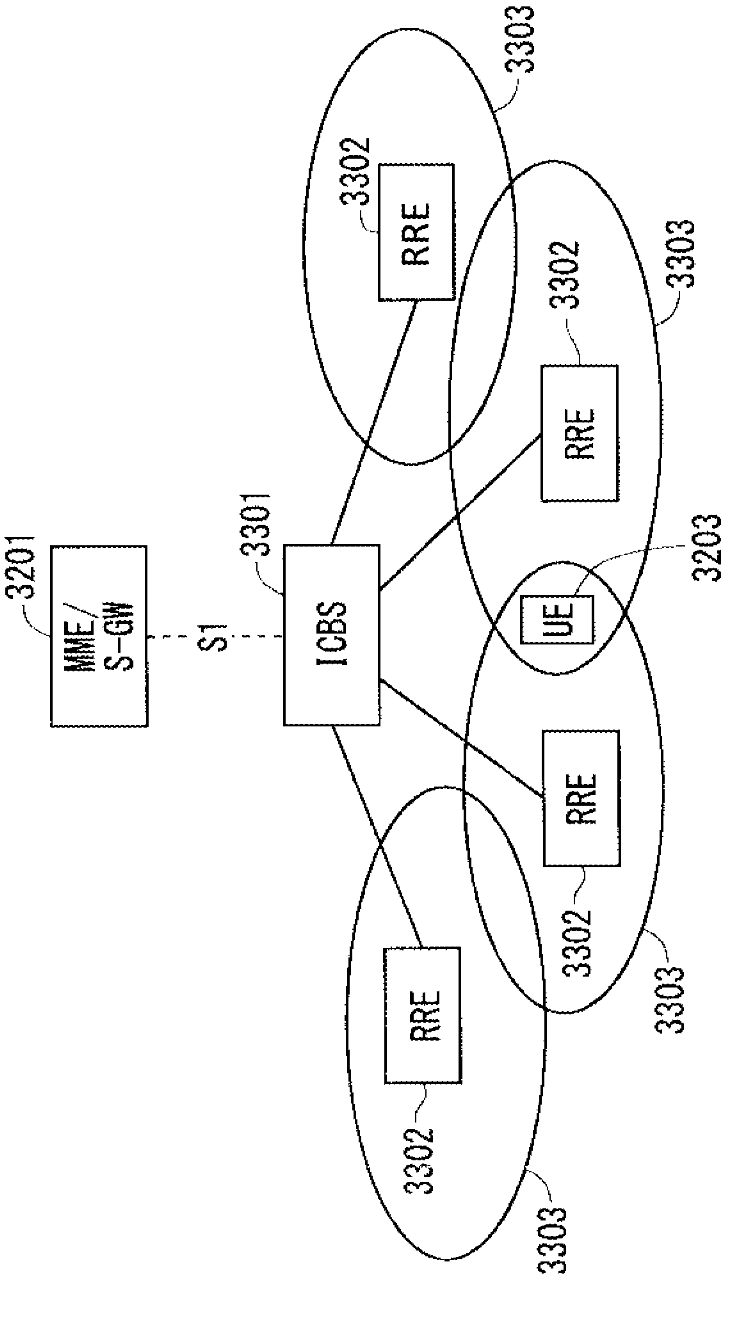
FIG. 24 shows a system in which one base station manages a plurality of cells in an integrated manner.
Figure 25:
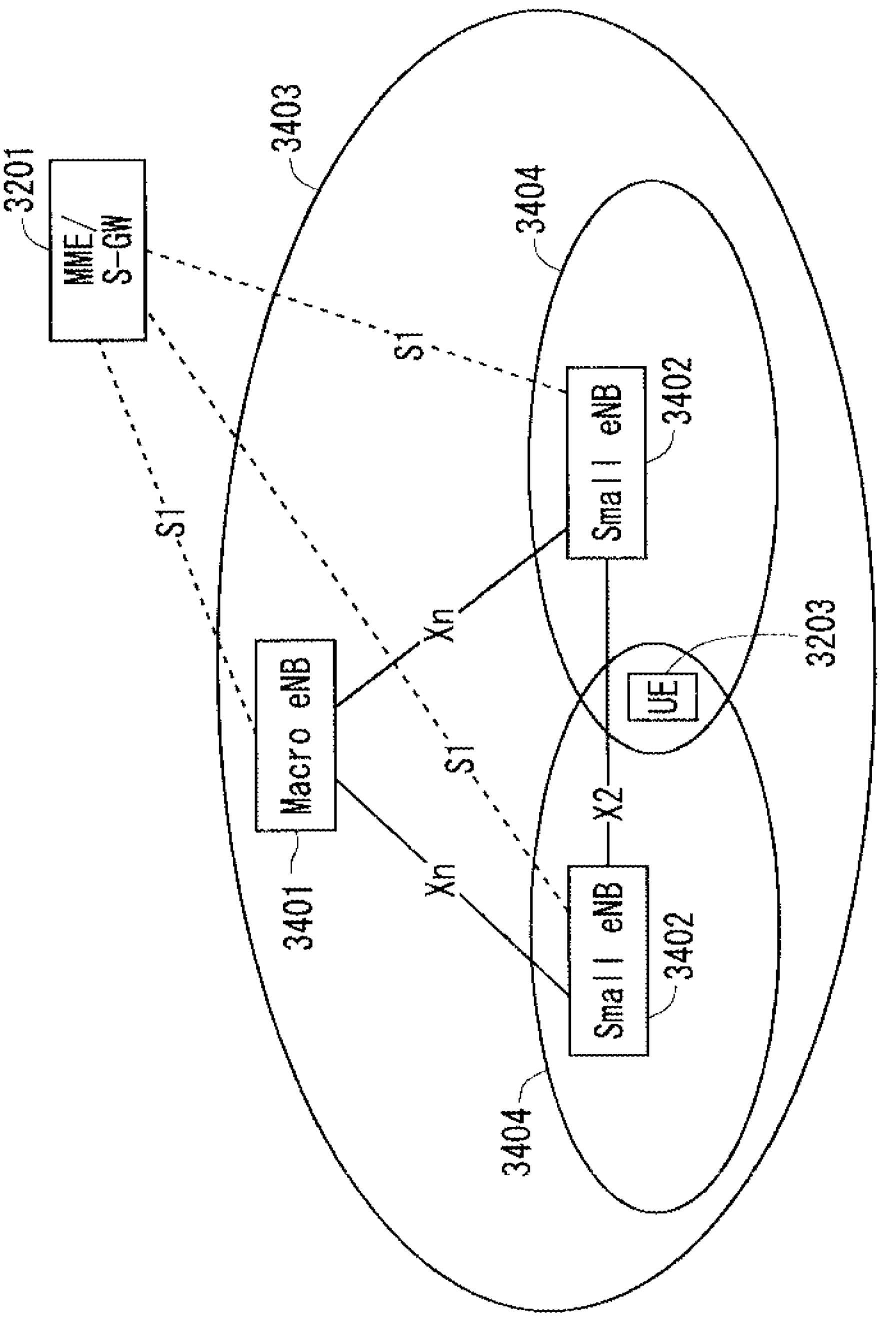
FIG. 25 shows a system in which small cells are overlaid on a macro cell.

The method of sharing a data symbol length between cells differs depending on a cell configuration. Three examples are described as examples of the cell configuration in which interference control or the like is performed between cells. FIG. 23 shows a communication system in which cells of different independent base stations are adjacent to each other. FIG. 24 shows a communication system in which one base station manages a plurality of cells in an integrated manner. FIG. 25 shows a communication system in which small cells are overlaid on a macro cell.

The communication system in which cells of different, independent base stations are adjacent to each other, shown in FIG. 23, will be described. The communication system shown in FIG. 23 includes an MME/S-GW unit (hereinafter also referred to as an "MME unit") 3201, base stations (E-UTRAN NodeBs: eNBs) 3202, and a user equipment (UE) 3203 that is a communication terminal device. In the example shown in FIG. 23, the communication system includes a plurality of, specifically, two eNBs 3202. The MME unit 3201 includes a mobility management entity (MME), a serving gateway (S-GW), or an MME and an S-GW.

The UE 3203 is capable of radio communication with the eNBs 3202, and transmits and receives signals thereto and therefrom through radio communication. The eNB 3202 is connected to the MME unit 3201 by an S1 interface, so that control information is communicated between the eNB 3202 and the MME unit 3202. A plurality of MME units 3201 may be connected to one eNB 3202.

The eNBs 3202 are connected to each other by an X2 interface, so that control information is communicated between the eNBs 3202. The eNB 3202 configures a cell 3204. In the example shown in FIG. 23, the cells 3204 of the two eNBs 3202, which are different, independent base stations, are adjacent to each other.

When interference control or the like is performed in a communication system in which the cells of different, independent base stations are adjacent to each other, signaling on an interface provided between the base stations is used for the base stations to transmit a data symbol length to each other. Signaling on an interface provided between the base stations is performed as follows: in one case, an S1 interface is used to perform signaling via an MME unit, and in the other case, an X2 interface is used to directly perform signaling. There are three methods below to achieve coordination between cells.

In the first method, each base station changes a data symbol length at an appropriate timing. After the change in the data symbol length, the base station notifies the data symbol length through signaling on an interface provided between base stations, and after the notification completes, performs interference control in new time units. With this configuration, the change of data symbol length with a communication terminal can be performed at highest speed, and thus a data symbol length can be changed in accordance with the radio environment and the status of the communication terminal. The radio quality can thus be kept high.

In the second method, when notifying a neighbor base station of a data symbol length in advance, a base station also notifies a timing at which a data symbol length is changed, so that both the base stations change unit times for interference control starting from the timing at which a data symbol length is changed. In this case, interference control is performed in accordance with a timing at which a data symbol length is changed, thus reducing the degradation in an interference removing capability immediately after the data symbol length has been switched.

In the third method, a common timing at which a data symbol length can be changed is determined in advance as a system or between neighbor base stations, and the data symbol length is changed in accordance with the timing. Upon receipt of a notification indicating a change in a data symbol length of another cell, it is recognized that a change starts from a timing at which a data symbol length can be changed immediately after the receipt. It is recognized that a change starts from a first interference control time after the timing at which a data symbol length can be changed. In this case, it is required to notify only the execution of a change in a data symbol length, resulting in an effect that the information size of signaling between base stations can be reduced.

A communication system in which one base station manages a plurality of cells in an integrated manner shown in FIG. 24 will be described. The communication system shown in FIG. 24 includes, as base stations, one integrated control base station (hereinafter also referred to as an "ICBS") 3301 and a plurality of remote radio equipments (RREs) 3302.

The integrated control base station 3301 processes baseband signals of the plurality of remote radio equipments 3302 and controls moving thereof. The remote radio equipment 3302 performs a radio control process. The integrated control base station 3301 and the remote radio equipment 3302 are connected through, for example, an optical fiber or the like. A baseband signal processing unit may be mounted in the remote radio equipment 3302. The user equipment 3203 communicates with the remote radio equipments 3302. Each remote radio equipment 3302 configures a cell 3303 having a relatively small coverage.

In this configuration, since the integrated control base station 3301 has data symbol information on all the cells 3303, the information on a data symbol length is always shared. If a data symbol length changes, accordingly, the change can be reflected on interference control at high speed. A minimum time unit for interference control can be calculated in real time, which can be reflected on control. Further, a timing at which a data symbol length is changed in each cell may be a break of a minimum time for the last interference control.

A communication system in which small cells are overlaid on a macro cell, shown in FIG. 25, will be described. The communication system shown in FIG. 25 includes an MME unit 3201, a UE 3203, a macro eNB 3401 that is a macro base station, and small eNBs 3402 that are small base stations. In the example shown in FIG. 25, the communication system includes a plurality of, specifically, two small eNBs 3402.

The macro eNB 3401 configures a macro cell 3403 having a relatively large coverage. The small eNB 3402 configures a small cell 3404 having a relatively small coverage. The communication system shown in FIG. 25 has a configuration in which the small cells 3404 that are cells of the small eNBs 3402 are overlaid on the macro cell 3403 that is a cell of the macro eNB 3401.

The macro eNB 3401 and the small eNB 3402 may use different carrier frequencies or may use the same carrier frequency. In some cases, the macro eNB 3401 and the UE 3203 communicate control information therebetween, and the small eNB 3402 and the UE 3203 communicate user data therebetween. Interference control in this configuration is mainly performed between neighbor small eNBs 3402.

When interference control is performed to the UE 3203, the information on the data symbol length may be shared between the small eNBs 3402 by an X2 interface between the small eNB s 3402 or by an Xn interface via the macro eNB 3401.

A data symbol length can be dynamically changed depending on the situation of a communication terminal. A timing at which a data symbol length is changed is obtained as follows: a minimum control time when interference control is performed between neighbor cells is determined individually before change and after change, and a least common multiple thereof is set as a timing. A target minimum control time may be calculated for all neighbor cells or cells in which interference control is being performed.

Figure 26:
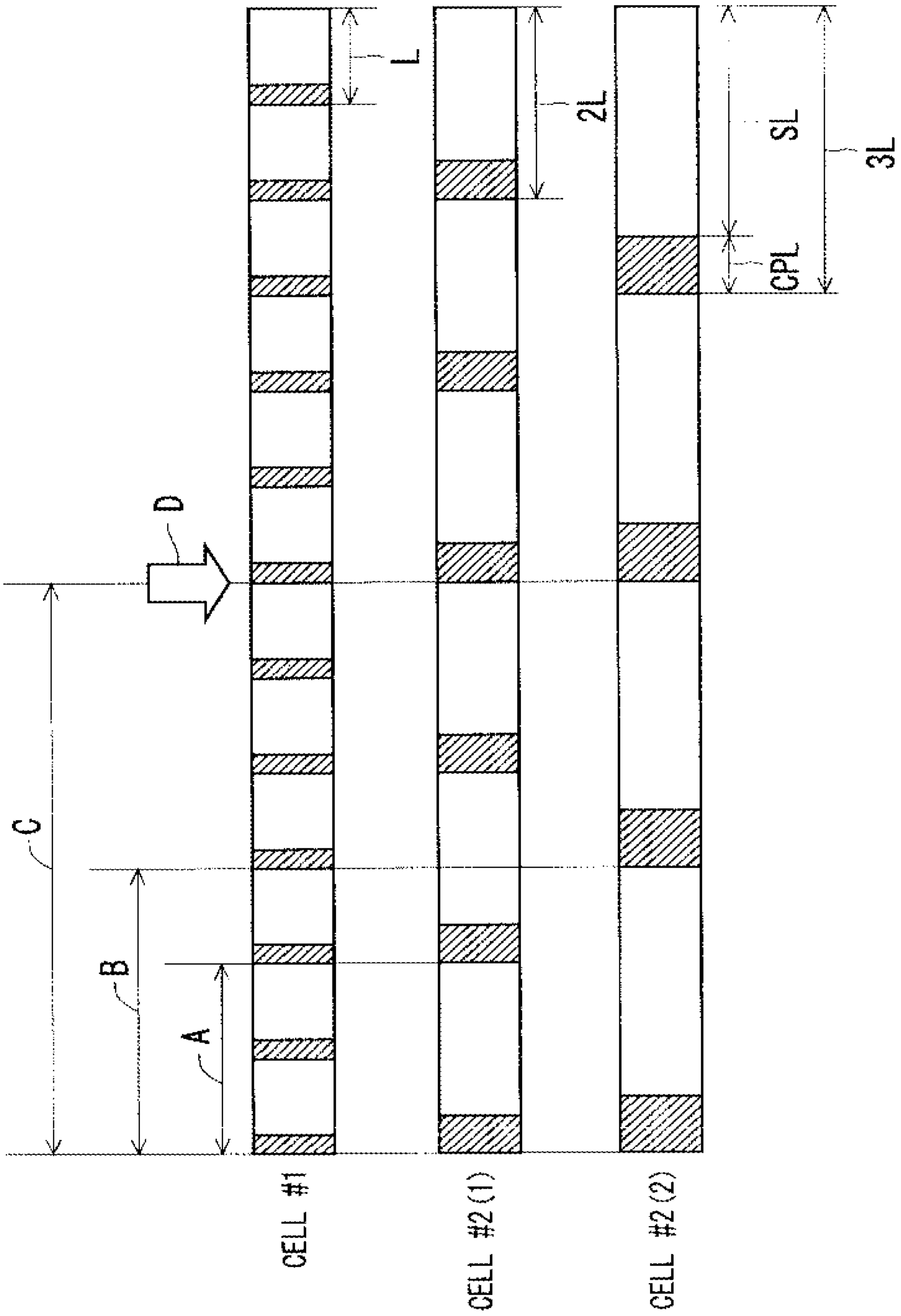
FIG. 26 is a diagram for explaining a timing at which a data symbol length is changed.

FIG. 26 is a diagram for explaining a timing at which a data symbol length is changed. Described here is an example in which the data symbol length of a cell #2 is changed from an original configuration, cell #2 (1), to a new configuration, cell #2 (2). This is an example in which a data symbol length as a sum of a CP length (CPL) and an OFDM symbol length (SL) is L for the cell #1, 2L for the cell #2 (1), and 3L for the cell #2 (2).

In FIG. 26, A represents a minimum control time when interference control is performed between the cell #1 and the cell #2 (1), which is a time equivalent to 2L; B represents a minimum control time when interference control is performed between the cell #1 and the cell #2 (2), which is a time equivalent to 3L; and C is a time that is a least common multiple of A and B, which is a time equivalent to 6L. When a data symbol is to be changed, a data symbol length can be changed in a time period C, for example, a timing indicated by an arrow D to seamlessly perform interference control between cells.

Alternatively, for example, a data symbol length may be determined per beam by a multi-element antenna. The present invention is also applicable when interference control is performed between beams in the same cell and when interference control is performed between a beam in the cell and beams in other cells.

Described below is an example of a method of generating information that allows identification of timings of data symbol lengths between base stations. Each base station obtains a time of a GPS and generates a subframe timing synchronized with the GPS. The subframe counter of each base station is preset in a broadcast information transmission period. As a result, all the base stations generate a subframe counter synchronized with the GPS, and synchronization is achieved between the base stations. A timing at which a to-be-notified data symbol length is changed is a value obtained by adding a latency and a margin to a current subframe counter value. This enables timings at which a data symbol length is changed to be matched between base stations.

In the configuration as shown in FIG. 24, the GPS may be located in the integrated control base station 3301 or each remote radio equipment 3302. Alternatively, in the configuration as shown in FIG. 25, the GPS may be located in the macro eNB 3401 or the small eNB 3402.

Although the method for synchronization with a GPS has been described above as the method of generating a subframe counter that achieves synchronization between base stations, not a GPS but a network time protocol (NTP) server, a communication terminal, an IEEE 1588, or the like may be used to achieve synchronization between times.

The following three methods are examples of the method of changing a data symbol length by a communication terminal.

In the first method, a base station during communication notifies a communication terminal of a timing at which the base station changes a data symbol length, for example, a subframe number, and both the base station and the communication terminal change a data symbol length from the notified timing. In this case, an appropriate change timing can be designated, and information can be individually transmitted to and received from communication terminals to be configured, thus transmitting data symbol length change information at high speed, which enables rapid interference control according to a change in radio environment.

Examples of the method of notifying information between a base station and a communication terminal include a method of adding, to an RRC message, the information that allows identification of a timing at which a data symbol length is changed, and a method of adding, to L1/L2 control information such as PDCCH, the information that allows identification of a timing at which a data symbol length is changed. In another method, the information that allows identification of a timing at which a data symbol length is changed is added to broadcast information.

Although the example in which a base station notifies a communication terminal of a change timing has been described above, conversely, the communication terminal may notify the base station of a change timing. In one example method, the information that allows identification of a timing at which a data symbol length is changed is added to L1/L2 control information such as PUCCH.

In the second method, a common timing at which a data symbol length can be changed is determined in advance as a system or between a base station and a communication terminal, and the data symbol length is changed in accordance with the timing. When receiving a notification indicating a change in a data symbol length from a base station or a communication terminal, it is recognized that the data symbol length is changed starting from a timing at which a data symbol length can be changed immediately thereafter. In this case, it is required to notify only the execution of a change in a data symbol length, resulting in an effect that the information size of signaling between the base station and the communication terminal can be reduced.

In the third method, a base station changes a data symbol length without notifying a communication terminal of a timing at which a data symbol length is changed. The communication terminal needs to blindly detect that the data symbol length has been changed. In an example method for the detection, the communication terminal detects a corresponding radio format from a position at which a training sequence signal is inserted or a period of a training sequence signal, and calculates a data symbol length. In another method, after changing a data symbol length at a base station, the base station adds the changed information to the L1/L2 control information of the PDCCH. In another method, a base station uses broadcast information to notify a data symbol length being used by the base station. In the third method, timings at which a data symbol length is changed do not need to be matched between a base station and a communication terminal, so that the process can be simplified.

Herein, the communication terminal refers to the UE 3203, and the base station is applicable to any of the configurations of the eNB 3202, the RRE 3302, and the small eNB 3402. An interface for notifying a change timing can be used for the data symbol length configuration information. The interface to be used may be the same or different between for the configuration information and the change timing. For example, the L1/L2 control information such as PDCCH is used for the configuration information, and broadcast information is used for the change timing. The notification timing may be the same or different between the configuration information and the change timing information. If the timing is different, the configuration information needs to be notified before a change timing.

The data symbol length does not need to be the same between uplink and downlink. The change in a CP length described above therefore may enable a change in a data symbol length for uplink alone or a data symbol length for downlink alone.

An in-cell data symbol length is made variable in subframe units, TTI units, or RB units, thus enabling control according to a unit of a modulation and demodulation process, which simplifies the modulation and demodulation process. The interference control time, whose minimum unit is a data symbol length, can be set to an integral submultiple (e.g., ½) of a subframe or an integral submultiple (e.g., ¼) of a TTI time. This enables interference control according to a control time of the modulation and demodulation process, resulting in an effect that a MAC scheduling process or the like can be simplified.

Fourth Embodiment

In a radio system assumed in, for example, a 5G system, radio formats in which at least one of an OFDM symbol length and a CP length differs conceivably coexist. It is also conceivable that an OFDM symbol length and a CP length will change dynamically. In the LTE system scheme, in terms of a time direction, two symbols for a cell-specific reference signal (CRS) are normally inserted for seven OFDM symbols, which are a zeroth symbol (head: first) and a fourth symbol (fifth).

Figure 27:
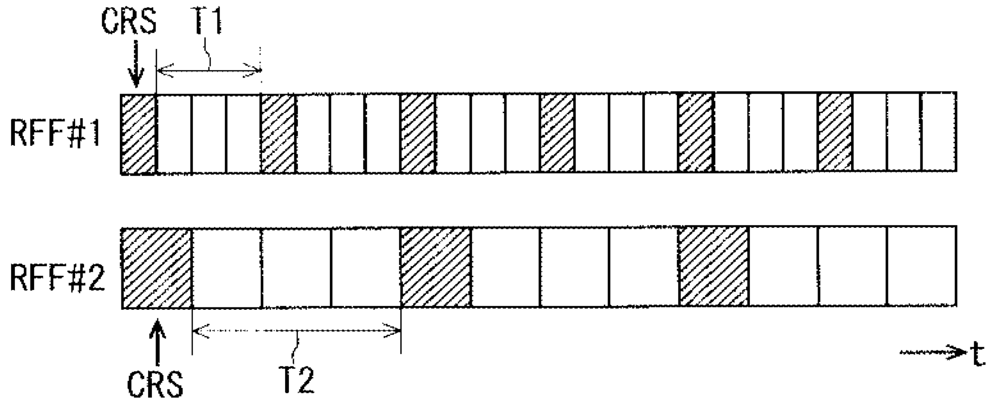
FIG. 27 shows an example of a cell-specific reference signal (CRS) insertion ratio.

When radio formats coexist, the position at which a cell-specific reference signal (CRS) is inserted is conceivably defined at a position optimum for each radio format. For example, for simplification of a modulation and demodulation process, the ratio at which a CRS is inserted to data is made constant. FIG. 27 shows an example of a cell-specific reference signal (CRS) insertion ratio. The horizontal axis of FIG. 27 represents a time t. T1 and T2 are symbols into which data is inserted. For example, as in FIG. 27, a CRS is inserted at a ratio of one symbol to fourth symbols. In that case, a CRS insertion interval is equal to the sum of a CRS length and a data length, which is a CRS length+T1 and a CRS length+T2.

Figure 28:
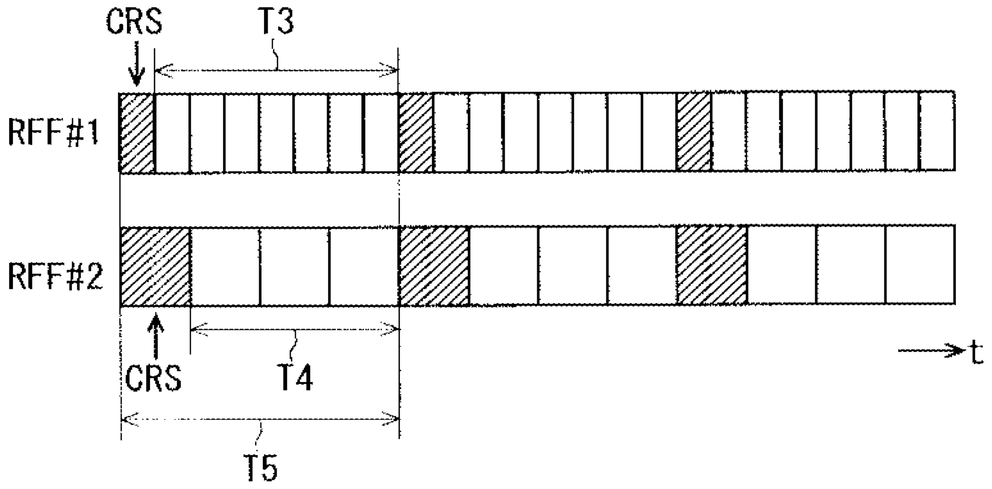
FIG. 28 shows an example of a cell-specific reference signal (CRS) insertion interval.

FIG. 28 shows an example of a cell-specific reference signal (CRS) insertion interval. The horizontal axis of FIG. 28 represents a time t. T3 and T4 are symbols into which data is inserted. T5 represents a CRS insertion interval. In contrast to the situation described above, even when radio formats coexist, the cell-specific reference signal (CRS) insertion interval T5 in the time direction is made the same in a plurality of radio formats. As a result, the timing at which CRS generation is controlled at a base station is made the same, thus simplifying the device. Also, the process can be simplified when one communication terminal performs communications simultaneously in a plurality of radio formats.

Compared with a case where CRSs are inserted into all the OFDM symbols at a constant ratio, by determining a CRS insertion interval in accordance with the characteristic of a communication terminal to be accommodated in the cell, an occupancy rate of CRSs to all the OFDM symbols can be reduced, which results in an increase in spectral efficiency. The characteristic of a communication terminal refers to, for example, an influence by the moving speed of a user equipment and a place at which a base station is installed.

In the case of moving speed, for a cell where the moving speed is slow and is less affected by the Doppler shift, a CRS insertion interval is increased to reduce a CRS occupancy rate. In one method, conversely, a CRS insertion interval is reduced to improve reception performance for a cell where the moving speed is fast and is greatly affected by the Doppler shift. When moving speed is increased, at the maximum, CRSs are inserted to all the OFDM symbols at a specific frequency.

At extremely slow moving speed, it is effective to increase not only a CRS insertion interval in the time direction but also a CRS insertion interval in the frequency direction. At extremely slow moving speed, not only the influence of the Doppler shift is small, but also a radio propagation environment changes less, so reception performance degrades less even when a CRS insertion ratio is reduced.

Therefore, reception performance does not degrade even when a CRS insertion interval in the frequency direction is increased, so that spectral efficiency can be increased. When a CRS insertion interval in the frequency direction is increased, reception performance may degrade at a specific frequency due to any frequency selectivity phasing that may occur. In that case, the degradation in reception performance can be alleviated by changing a CRS allocation frequency per CRS insertion time or causing a frequency hopping operation.

As to the place in which a base station is installed, the following method can be used in which a CRS insertion interval is reduced to increase reception performance in a poor line-of-sight place with many buildings and people, such as cities, because the radio propagation environment changes greatly due to, for example, an influence of frequency selectivity phasing.

Figure 29:
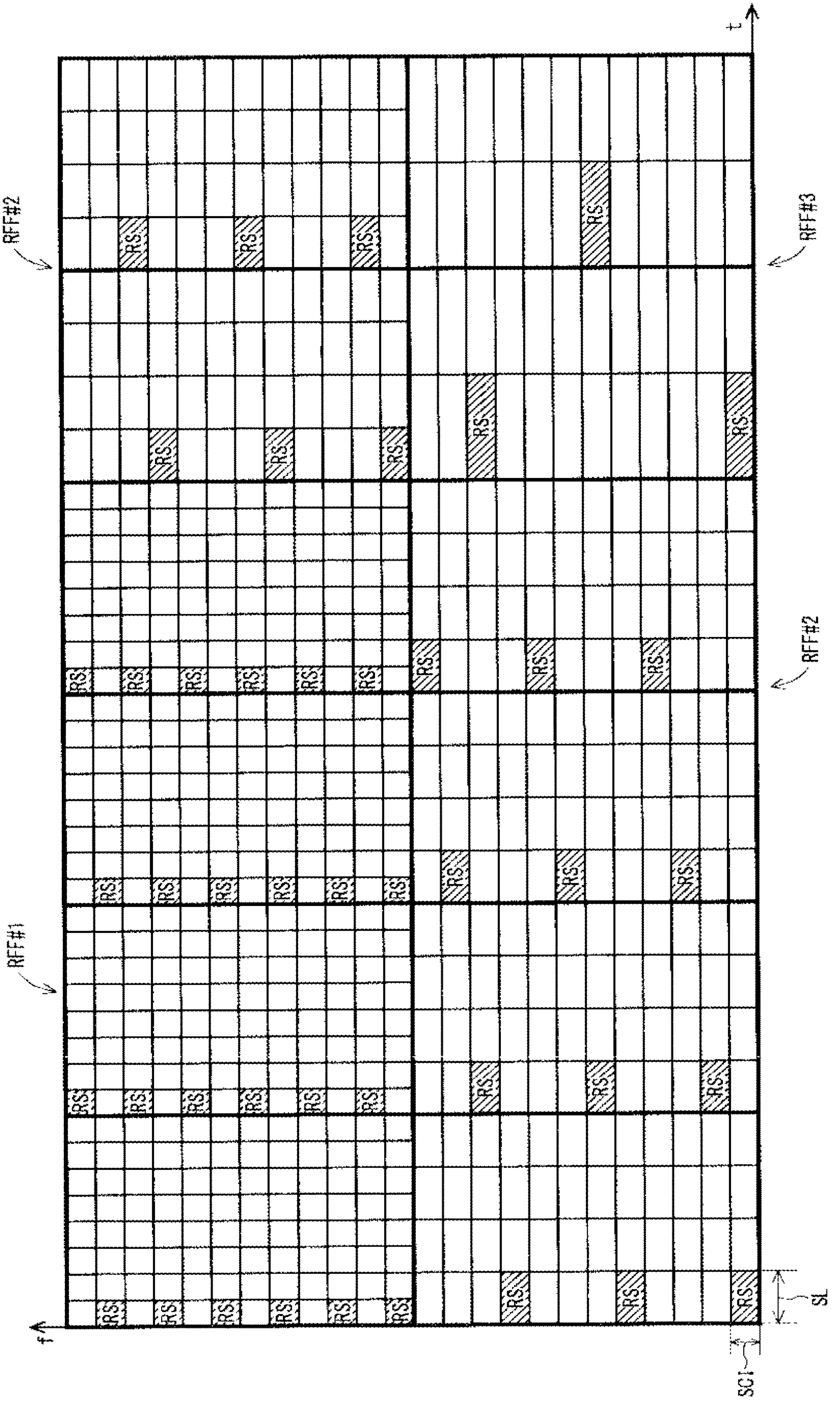
FIG. 29 shows an example of a CRS insertion interval and a CRS insertion ratio when an OFDM symbol length differs.

FIG. 29 shows an example of a CRS insertion interval and a CRS insertion ratio when an OFDM symbol length differs. The horizontal and vertical axes of FIG. 29 respectively represent a time t and a frequency f. FIG. 29 shows a state in which radio formats REF #1, REF #2, and RFE #3 having different OFDM symbol lengths SL and different OFDM subcarrier intervals SCI coexist. If an OFDM symbol length differs, providing the same CRS insertion interval in the time direction reduces CRS combining power in the radio format having a small OFDM symbol length. As a result, the reception performance such as a required signal noise ratio (SNR) may not be achieved in the reception of a CRS by a communication terminal. In consideration of the above, in one method, a CRS insertion ratio is increased (the number of CSR-inserted subcarriers is increased) in the frequency direction. In another method, the transmission power of a CRS-inserted symbol is increased more than that of any other OFDM symbol.

The CRS insertion ratio in the frequency direction may be determined per beam by a multi-element antenna. If a beam is formed by a multi-element antenna, the transmission power and the radiation angle of a beam can be changed depending on the number of elements forming a beam. For this reason, in one example method, a CRS insertion ratio in the frequency direction is reduced for a beam with a larger number of elements to increase resources to be used in data transmission with a required SNR satisfied, thereby increasing spectral efficiency.

Data demodulation reference signals (DM-RSs) that are UE-specific reference signals are made equal in different radio formats as in the CRS described above, thereby simplifying control of the base station and the communication terminal. The DM-RSs can be set per communication terminal, and accordingly, a DM-RS insertion interval may be determined per communication terminal in accordance with the reception performance of a communication terminal, reception quality information, an antenna configuration, an amount of transmission and reception data, a tolerable amount of latency, or the like.

A non-limiting example of the method of notifying a communication terminal of a CRS insertion interval and a CRS insertion ratio is a method of transmitting an insertion interval and an insertion ratio through broadcast information. Insertion into broadcast information enables all the communication terminals to be simultaneously notified, and changing system information (SI) provides support when the settings of a CRS insertion interval and a CRS insertion ratio are changed.

A DM-RS insertion interval and a DM-RS insertion ratio can be changed dynamically per communication terminal in accordance with, for example, reception quality. Two examples of the method of changing a DM-RS insertion interval and a DM-RS insertion ratio by a communication terminal are as follows.

In the first method, a base station during communication notifies a communication terminal of the details of the changes in setting of DM-RSs and a timing (e.g., subframe numbers), and both the base station and the communication terminal change the DM-RS configurations from the notified timing. In this case, an appropriate change timing can be designated, and information can be individually transmitted to and received from communication terminals to be configured, thus transmitting data symbol length change information at high speed, which enables rapid control according to a change in radio environment.

Examples of the method of notifying information between a base station and a communication terminal include a method of adding, to an RRC message, the information that allows identification of the details of the changes in the setting of DM-RSs and a change timing, and a method of adding, to L1/L2 control information such as PDCCH, the information that allows identification of the configuration of DM-RSs. In another method, the information that allows identification of details of changes in the setting of DM-RSs and a change timing is added to broadcast information.

Although described above is the example in which a base station notifies a communication terminal of details of changes in the configuration of DM-RSs and a change timing, conversely, the communication terminal may notify the base station. In one example method, the information that allows identification of details of changes in setting of DM-RSs and a change timing is added to L1/L2 control information such as PUCCH.

In the second method, a common timing at which a data symbol length can be changed is determined in advance as a system or between a base station and a communication terminal, and a data symbol length is changed in accordance with the timing. When receiving a notification indicating changes in the setting of DM-RSs from the base station or the communication terminal, it is recognized that a change is made starting from a timing at which the setting of DM-RSs can be changed immediately thereafter. In this case, it is required to notify only the execution of changes in the configuration of DM-RS s, resulting in an effect that the information size of signaling between the base station and the communication terminal can be reduced.

Fifth Embodiment

Various communication terminals are connected in a radio system assumed in the 5G system or the like. For example, devices used in factory automation (FA) are assumably connected to the same system as communication terminals. Real-time performance is emphasized in some FA devices, and old-time data may not be used as valid data.

A major factor responsible for the occurrence of a latency in a radio system is the occurrence of a retransmission in HARQ or a retransmission in RLC. For the FA devices as described above, the data retransmitted in HARQ or the like is conceivably handled as invalid data. HARQ is, however, an essential function in the LTE system scheme, and a radio resource for HARQ is ensured irrespective of the type of a communication terminal to be connected. For this reason, even in a communication terminal that requires no HARQ retransmission, a resource for returning HARQ ACK/NACK, an instruction for scheduling information associated with a retransmission, and the like are provided, and thus, a radio resource is unnecessarily used.

In the future, a 5G system will be required to connect communication terminals 100 times as many as those of the current radio system due to massive machine connection (MMC). It is therefore revealed that an occupancy rate of radio resources related to retransmission control of HARQ or the like will increase.

Figure 30:
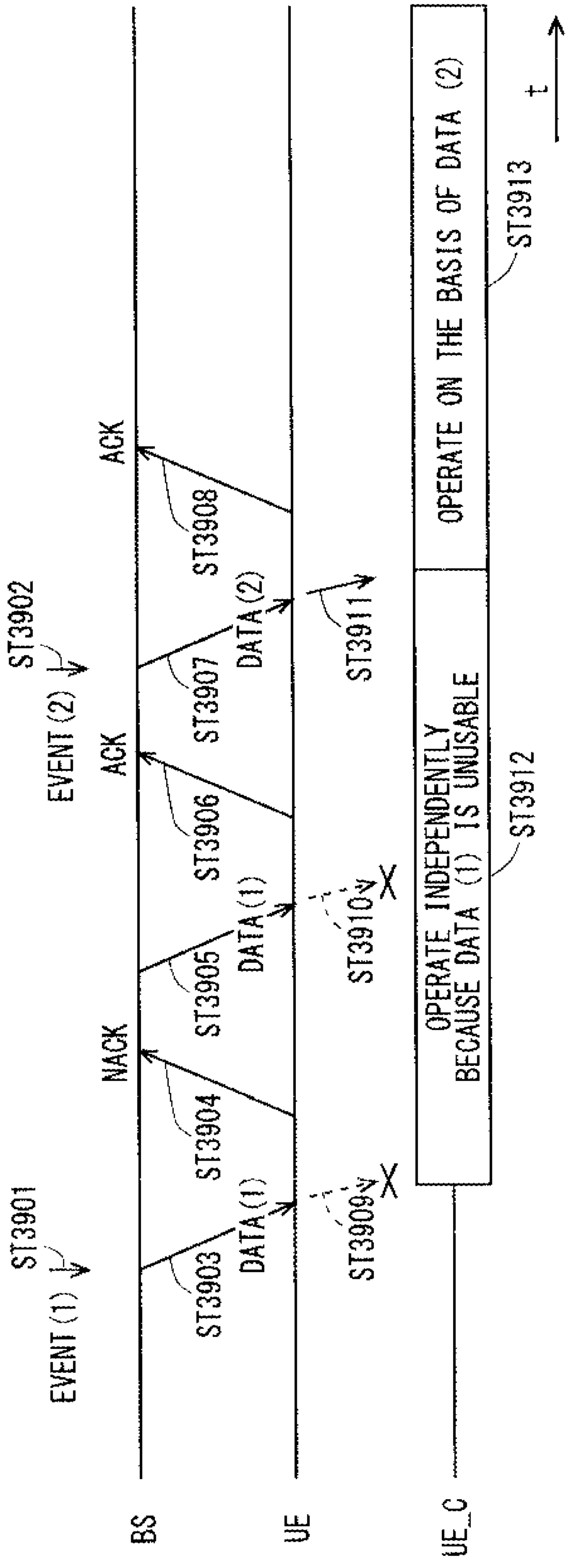
FIG. 30 shows an example of a control operation in a communication system of a fifth embodiment.

FIG. 30 shows an example of a control operation in a conventional communication system. The horizontal axis of FIG. 30 represents a time t. A base station BS and a device are connected, and the device includes a device control unit UE_C and a communication control unit UE that have functions of a UE. Illustrated here is an example in which a control operation is changed on the basis of event information from the base station BS.

An event occurs in step ST3901, and in step ST3903, the base station BS transmits event information as Data (1) to the device. The communication control unit UE of the device, which has demodulated the data, fails in the data demodulation, cannot reflect Data (1) in step ST3909, and then, returns NACK of HARQ to the base station BS in step ST3904.

The base station BS retransmits Data (1) in step ST3905. The communication control unit UE of the device has successfully demodulated the data normally, and returns ACK in step ST3906.

However, Data (1) is received late, that is, whose arrival time is late in terms of control of the device control unit UE_C, and is unusable data. The data is accordingly discarded in step ST3910. On that occasion, the device control unit UE_C operates independently in step ST3912.

A new event occurs in step ST3902, and the base station BS transmits Data (2) in step ST3907. The communication control unit UE of the device has successfully received Data (2), and accordingly, reflects Data (2) in the device control unit UE_C in step ST3911. The device control unit UE_C executes a control operation in step ST3913 on the basis of the information of Data (2). In step ST3908, the communication control unit UE returns ACK. In the example of FIG. 30, the operations of steps ST3904, ST3905, and ST3906 are not necessary.

To solve the problem described above, a mode in which HARQ control is not executed is added per communication terminal or radio bearer. Enabling modes in which HARQ is executed and is not executed to coexist in the same system reduces unnecessary HARQ processes. This allows the radio resources associated with the unnecessary HARQ to be used in, for example, data communications, thus improving spectral efficiency. According to the communication terminal in which no HARQ process are required, the processes are reduced, contributing to power saving.

Examples of the unit in which the presence or absence of the execution of a HARQ process is selected include (1) per communication terminal, (2) per radio bearer, (3) per certain period of time, (4) per transmission data (packet), (5) per logical channel group (LCG), (6) per CC in the case of a cell for carrier aggregation CA, (7) per MeNB or SeNB in dual connectivity DC configuration, (8) per type of communication terminal, (9) per QoS, and (10) a switch of the presence or absence of HARQ at a predetermined timing. Examples of the method of sharing the setting of the presence or absence of the execution of the HARQ process between a base station and a communication terminal include L1/L2 control information, MAC control information, and RRC control information.

In an example of the selection method per communication terminal of (1) above, the presence or absence of HARQ is determined in accordance with the processing capability and use environment of a communication terminal, and the communication terminal notifies a base station as UE capability or the like.

In an example of the selection method per radio bearer of (2) above, the absence of HARQ is determined for a bearer for video and audio, with emphasis on the real-time performance; the presence of HARQ is determined for a bearer for data packet transmission, with emphasis on reliability.

In an example of the selection method per certain period of time of (3) above, the presence of HARQ is determined for a control signal transmission time; the absence of HARQ is determined for a user data signal transmission time.

In an example of the selection method per transmission data (packet) of (4) above, communication quality is monitored, and for good communication status (e.g., high SNR), the absence of HARQ is determined to increase spectral efficiency; for poor communication status, the presence of HARQ is determined to increase communication quality by a HARQ operation.

In an example of the selection method per LCG of (5) above, for an LCG with higher priority, the presence of HARQ is determined to ensure communication quality; for an LCG with lower priority, the absence of HARQ is determined to reduce a band occupied by a radio resource.

In an example of the selection method per CC in the case of a cell for carrier aggregation CA of (6) above, the absence of HARQ is determined for CC with good communication quality; the absence of HARQ is determined to achieve a low delay for CC to which a communication terminal that needs a low delay, such as an FA device, is allocated.

In an example of the selection method per MeNB or SeNB in the configuration of DC of (7) above, the presence of HARQ is determined for a MeNB to ensure quality because the MeNB handles control information; the absence of HARQ is determined for a SeNB to achieve a low delay of user data.

In an example of the selection method per type of communication terminal of (8) above, the absence of HARQ is determined for a terminal that does not move because its communication environment does not change and there is accordingly no change in communication environment, thereby achieving a low delay; the presence of HARQ is determined for a moving terminal because its communication environment changes, thereby providing such a configuration as to maintain quality against a sudden change in communication environment.

In an example of the selection method per QoS of (9) above, the presence of HARQ is determined when high quality needs to be ensured; the absence of HARQ is determined when low quality is merely required, thereby improving spectral efficiency.

In an example of the method of switching the presence or absence of HARQ at a predetermined timing of (10) above, the presence of HARQ is determined for control information until the first communication is established; the absence of HARQ is determined for user data communication thereafter.

A non-limiting example of the L1/L2 control information is a physical downlink control channel (PDCCH) in the LTE system. Adding the information indicating the presence or absence of the execution of HARQ to the L1/L2 control information enables the selection of the presence or absence of the execution of HARQ per transmission data. For downlink transmission, the presence or absence of the execution of HARQ may be added to the downlink shared channel allocation information. For uplink transmission, the presence or absence of the execution of HARQ may be added to uplink scheduling grant information. An advantage that momentary support is enabled and a change is applicable to a corresponding PDSCH alone is a feature of notification over PDCCH.

In this case, any of changes is enabled (1) per communication terminal, (2) per radio bearer, (3) per certain period of time, (4) per transmission data (packet), (5) per logical channel group (LCG), (6) per CC in the case of a cell for carrier aggregation CA, (7) per MeNB or SeNB in dual connectivity DC configuration, (8) per type of communication terminal, (9) per QoS, and (10) a switch of the presence or absence of HARQ at a predetermined timing (e.g., the presence of HARQ is determined for control information in the execution of the first connection, and the absence of HARQ is determined thereafter). In this case, the base station notifies the communication terminal of the configuration.

As the MAC control information, HARQ configuration information is added to the information that executes initialization and reconfiguration at a Layer 2 level, for example, medium access control-control element (MAC-CE), thereby changing the presence or absence of HARQ at a configuration timing. Such information is equivalent to, for example, RRC control information of an RRC connection reconfiguration in the LTE system scheme.

In this case, a change is enabled (1) per communication terminal, (2) per radio bearer, (3) per certain period of time, (5) per logical channel group (LCG), (6) per CC in the case of a cell for carrier aggregation CA, (7) per MeNB or SeNB in dual connectivity DC configuration, (8) per type of communication terminal, (9) per QoS, and (10) a switch of the presence or absence of HARQ at predetermined timing (e.g., the presence of HARQ is determined for control information in the execution of the first connection, and the absence of HARQ is determined thereafter). In this case, the base station notifies the communication terminal of the configuration.

As RRC control information, the presence or absence of the execution of HARQ, which is added to UE capability information, is set at a time for the radio connection configuration of a communication terminal. In this case, the presence or absence of the execution of HARQ can be set (1) per communication terminal or (8) per type of communication terminal. In this case, the communication terminal notifies the base station of the configuration.

In the LTE system scheme, the quality of service (QoS) per radio bearer is defined by quality class identifiers (QCIs). In one configuration, the presence or absence of the execution of HARQ is added to a table of the QCIs to enable a configuration (2) per radio bearer.

Although the method of setting the presence or absence of HARQ has been described above, it is also effective to keep the set state until the next trigger when the presence or absence of HARQ has been set once. Although various types of L1/L2 control information are set per transmission of PDSCH in the LTE system scheme, when the setting is kept, setting does not need to be executed per transmission of PDSCH, reducing control information. Therefore, an overhead of control information can be alleviated to improve spectral efficiency.

Examples of the method for a trigger for stopping the continuing set state are as follows. (1) A HARQ setting continuation timer is provided, and the state is continued until the timer expires. A timer value shall be set in advance or may be determined in a fixed manner in specifications or in a configuration file per base station. (2) The state is continued until a communication terminal, a base station, or a device of higher level than that of the base station requests a configuration change. For example, the state without HARQ is stopped when reception performance degrades, and a change request to the state with HARQ is issued. Examples of the method of detecting degradation in reception performance include a method of obtaining an error rate from a CRC check of data and a method of measuring a signal noise ratio (SNR) from a training sequence signal.

It is also effective to determine a default value for the presence or absence of HARQ. When no setting is made for the presence or absence of HARQ in start of communication, for example, the presence of HARQ is determined. Setting a default value further reduces an overhead of control information. The default value may be determined in a fixed manner in specifications or in a configuration file per base station. Alternatively, a default value for the presence or absence of HARQ may be informed in broadcast information.

The presence or absence of the execution of HARQ descried above also contributes to power saving of communication terminals such as sensor devices. For example, HARQ is executed only for the required information such as control information, and HARQ is not executed otherwise, thus eliminating unnecessary transmission of HARQ-ACK/NACK. A non-limiting example of the method of reducing HARQ processes is a method of transmitting HARQ-ACK alone when data demodulation has succeeded and transmitting no HARQ-NACK when the data demodulation has failed. In that case, retransmission is repeated automatically until HARQ-ACK is received. In this case, examples of the method of stopping retransmission include a method of stopping retransmission through an RRC message and a method of stopping retransmission when a maximum retransmission number is reached.

Sixth Embodiment

It is conceivable that machine type communication (MTC) will become full-fledged in a 5G system. Communication terminals with a very few restrictions, for example, whose latency is regulated to 30 seconds or more, also coexist in MTC. In the LTE system specifications, a transmission time interval (TTI) is standardized at one subframe (1 ms) among all the communication terminals, and the operation in accordance with one subframe is also needed in MTC.

The TTI of the sixth embodiment is a unit time in which ACK/NACK of HARQ is determined. In other words, the TTI is a unit time in which channel-coded data is transmitted. CRC is added to data for one TTI, and HARQ is returned. Therefore, CRC shall not be added to data for two TTIs to execute HARQ ACK/NACK. Even in MTC with a lenient latency regulation, the operation on a one-subframe basis is needed, and a retransmission operation by HARQ is also needed to process in the same period as that of another communication terminal.

A retransmission cycle of HARQ is 8 subframes in uplink of LTE system specifications. Herein, TTI in the LTE system specifications is a period in which cyclic redundancy check (CRC) is made in the execution of HARQ, and the HARQ retransmission process is performed in unit of data allocated to one TTI.

For this reason, even a communication terminal in MTC needs an instantaneous high-speed process and needs to employ, for example, a high-performance device capable of such a process. The transmission timing of the retransmission data of HARQ is determined and is scheduled preferentially. Thus, even data with low priority, such as MTC, may instantaneously become higher in priority than any other piece of data, inhibiting transmission of any other piece of data with high priority.

Figure 31:
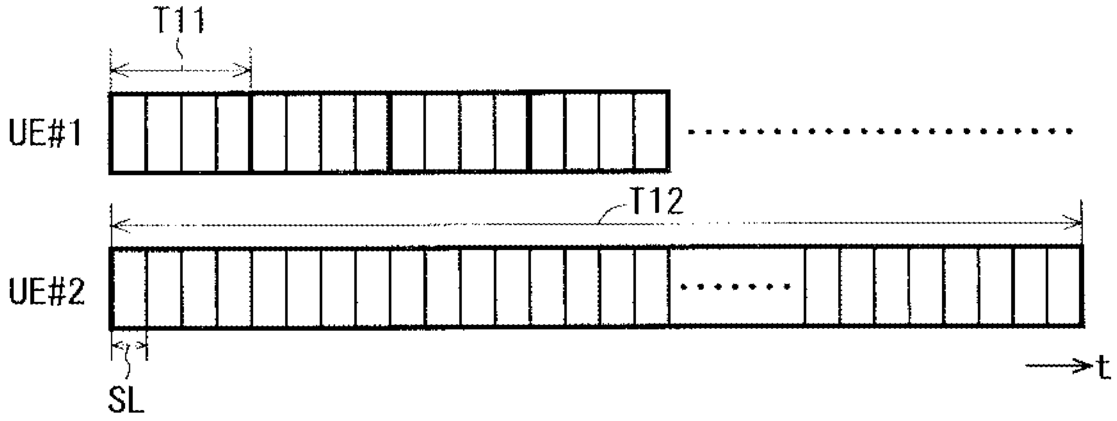
FIG. 31 shows an example of TTI periods of a UE #1 and a UE #2.

To overcome the problem described above, a configuration in which TTI periods can be set per user equipment or per radio bearer and they can coexist is provided. FIG. 31 shows an example of the TTI periods of a user equipment UE #1 and a user equipment UE #2. An OFDM symbol length is represented by SL. For example, such a system is provided as shown in FIG. 31 that allows a user equipment UE #1 to operate at one TTI that is T11, for example, 0.1 ms for operation with low latency, and allows the user equipment UE #2 as in MTC to operate at one TTI that is long, T12, for example, 1000 ms. All the coexisting TTI lengths are set to integral multiples of a reference TTI length, resulting in an effect that scheduling control of RB resource allocation is simplified when communication terminals having different TTI lengths coexist.

As a result, a user equipment as in MTC can also have an increased HARQ period, thus resolving an instantaneous load of a user equipment and an instantaneous shortage of radio resource.

Figure 32:
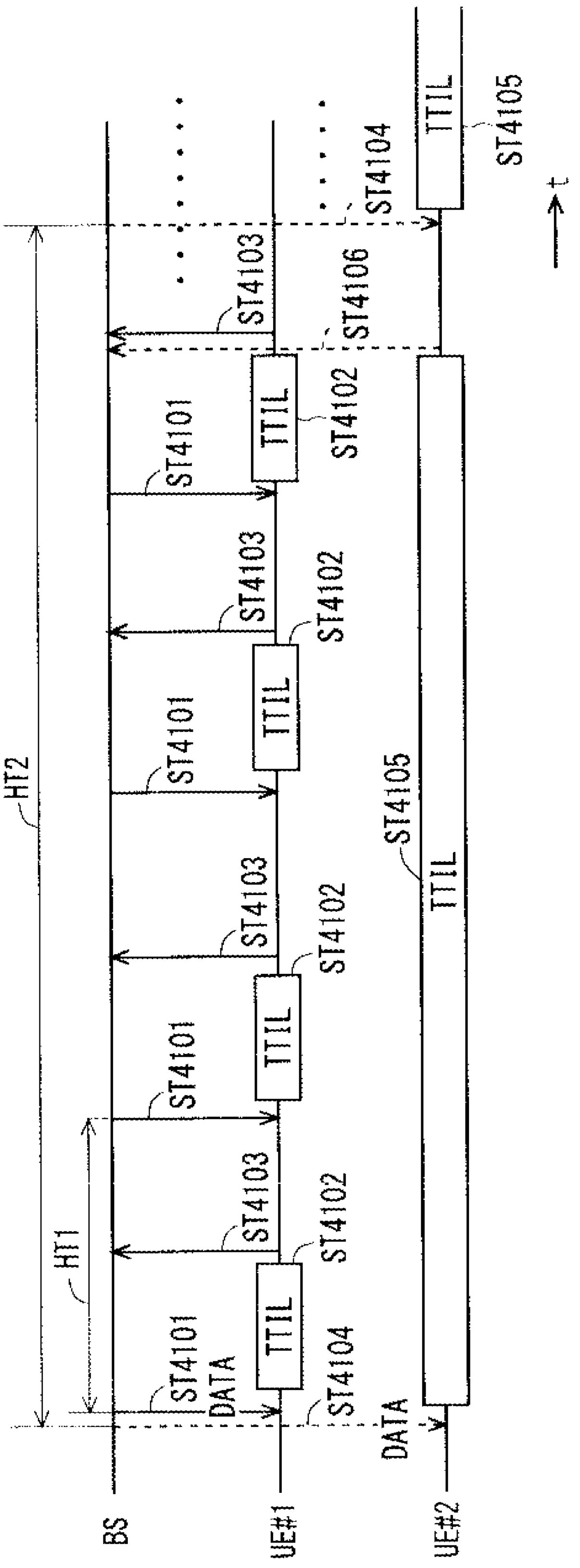
FIG. 32 shows an example of HARQ periods when different TTIs coexist.

FIG. 32 shows an example of a HARQ period when different TTIs coexist. The horizontal axis of FIG. 32 represents a time t. A short TTI is set for a user equipment UE #1, and a long TTI is set for a user equipment UE #2.

In step ST4101, a base station BS transmits data to the user equipment UE #1. Step ST4102 shows a TTI length (hereinafter also referred to as "TTIL") of the user equipment UE #1, which is a data length for executing a HARQ process. The user equipment UE #1 demodulates the data during a period of step ST4102 and, in step ST4103, returns HARQ ACK/NACK to the base station BS. The base station BS checks the result of step ST4103 and, if the result is NACK, retransmits the next data in step ST4101.

As in the example of the user equipment UE #1, the base station BS transmits data to the user equipment UE #2 in step ST4104, and the user equipment UE #2 receives the data in step ST4105 and returns the demodulation result to the base station BS in step ST4106.

As shown in FIG. 32, a HARQ period can be changed depending on the user equipment, and data with low priority needs not to be retransmitted at the same time interval as that of data with high priority, so that the data transmission by a user equipment with high priority, such as the user equipment UE #1, is less inhibited. The data to be transmitted during one TTI is configured to be appropriately subjected to RB resource allocation and have a controllable amount of data, enabling more flexible scheduling when a plurality of user equipments coexist, which facilitates priority control per user equipment.

A non-limiting example of the method of allowing TTI periods to coexist is a method of determining a reference TTI (TTI with a minimum time) to set a TTI that is an integral multiple of the reference TTI. In that case, the base station device operates in accordance with the reference TTI, thus facilitating scheduling.

Figure 33:
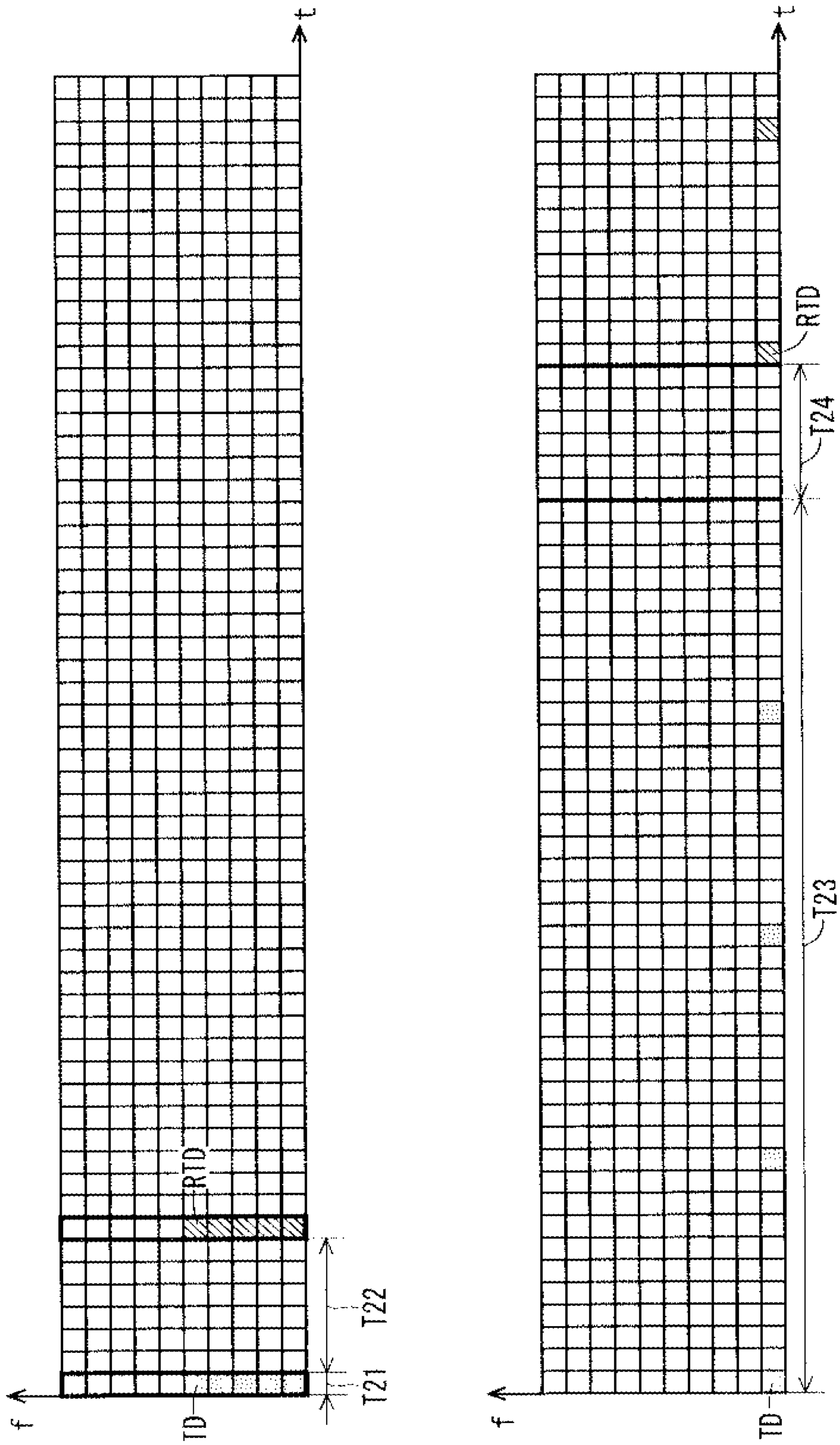
FIG. 33 shows an example of data allocation to OFDM symbols in TTI.

Data allocation to OFDM symbols in TTI does not need to be continuous as in downlink signals of an LTE system scheme, and reducing a load per unit time enables allocation that can be processed even by a low-speed device used in, for example, MTC. FIG. 33 shows an example of data allocation to OFDM symbols in TTI. FIG. 33 shows an example in which a load per unit time is reduced, specifically, which is an example in which data for four symbols is transmitted every 40 ms.

Part (a) of FIG. 33 shows an example of the case in which a TTI length T21 is 1 ms, and part (b) of FIG. 33 shows an example of the case in which a TTI length T23 is 40 ms. When the TTI length T21 is 1 ms, an amount of processing data per subframe is an amount of four symbols at the maximum. When HARQ has been retransmitted, a load concentrates in the first half of 40 ms. For example, when retransmitted data (RTD) is received after T22, for example, after a lapse of 7 ms, eight symbols are processed during 9 ms. When the TTI length T23 is set to 40 ms, an amount of processing data per subframe is an amount of one symbol at the maximum, and even when HARQ retransmission has occurred, retransmission is executed at a timing of over 40 ms. For example, part (b) of FIG. 33 shows an example in which retransmission at T24, for example, 7 ms is executed after TTI.

For further reducing the power consumption of a user equipment, it is effective in part (b) of FIG. 33 to cause a user equipment to be activated and perform a process only in symbols in which data is present, as in discontinuous reception (DRX) of the LTE scheme. In that case, the following methods are used to avoid decoding PDCCH (scheduling information): fixed scheduling is executed in one method, data allocation in one TTI is notified in advance through PDCCH (scheduling information) in another method, and RB allocation in the time direction is performed in constant periods in still another method.

Examples of the unit of TTI configuration include (1) per user equipment, (2) per radio bearer, (3) per certain period of time, and (4) per transmission data (packet). Examples of the method of sharing a TTI configuration between a base station and a user equipment include L1/L2 control information, MAC control information, and RRC control information.

A non-limiting example of the L1/L2 control information is a physical downlink control channel (PDCCH) in the LTE system. Adding the information indicating a TTI configuration to the L1/L2 control information enables the selection of a TTI configuration per transmission data. A TTI configuration may be added to the allocation information on downlink shared channels for downlink transmission, and a TTI configuration may be added to the information on uplink scheduling grants for uplink transmission. In this case, a change is enabled for any of (1) per user equipment, (2) per radio bearer, (3) per certain period of time, and (4) per transmission data (packet).

As the MAC control information, a TTI configuration is added to the information that executes initialization or reconfiguration at the Layer2 level, thus changing the TTI configuration at a configuration timing. In the LTE system scheme, this is equivalent to, for example, an RRC connection reconfiguration. In this case, a change is enabled (1) per user equipment, (2) per radio bearer, and (3) per certain period of time.

As RRC control information, the presence or absence of the execution of HARQ, which is added to the UE capability information, is set at the radio connection configuration of a user equipment. In this case, a configuration is enabled (1) per user equipment.

In the LTE system scheme, the quality of service (QoS) per radio bearer is defined by quality class identifiers (QCIs). In one configuration, a TTI configuration is added to a table of the QCIs to enable a configuration (2) per radio bearer.

It is also effective to change the configuration of TTI per beam in the system that forms a beam using a multi-element antenna. For example, when communication is performed with a user equipment moving at high speed and when a narrow beam is used, the user equipment moves beyond the beam irradiation range in a short period of time. Accordingly, it is required to reduce a TTI period to feed back the channel information in a radio transmission section to, for example, the intensity of the beam reception power by the user equipment and precoding of multiple input and multiple output (MIMO), thereby controlling a direction to which a beam is pointed. Conversely, when a wide beam is used, even if a TTI period is increased, a user equipment moves beyond the beam irradiation range less frequently than when a narrow beam is used. The beam width typically becomes narrower for a larger number of antenna elements and becomes wider for a smaller number of elements. For this reason, it is also effective to determine a TTI length depending on the number of antenna elements.

Examples of the method of notifying a user equipment of a TTI length include a method of notifying a TTI length using the L1/L2 control information such as PDCCH, a method of notifying a TTI length in the MAC scheduling information, and a method of notifying a TTI length in an RRC message.

Seventh Embodiment

Figure 34:
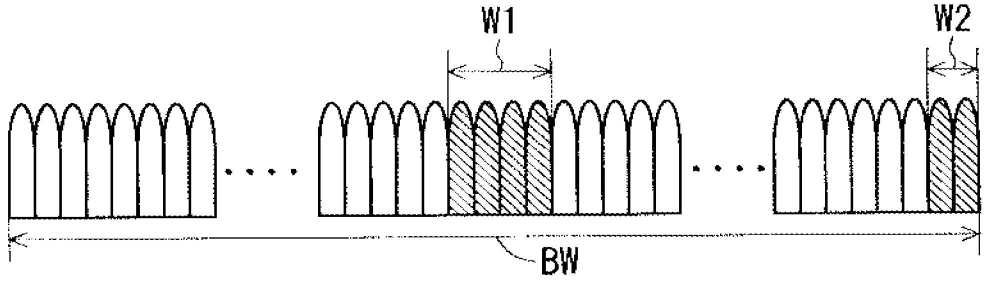
FIG. 34 shows an example of allocation of synchronization signals (SSs) and data.

In the LTE system scheme, downlink synchronization signals are allocated only to 72 subcarriers (for a band of 1.08 MHz) at the center of a transmission frequency. FIG. 34 shows an example of allocation of synchronization signals (SSs) and data. A wider frequency band BW (e.g., 500 MHz) is used in the 5G system, and thus, in allocation to the subcarriers at a center frequency W1, all user equipments need to be synchronized at the center frequency and then move to a frequency band W2 used in data transmission and reception.

In the system as described above, even a device that uses only a narrow frequency band needs to support two frequency bands, and thus, the device thus uses an RF device supporting a wide frequency band or mounts therein a circuit for switching a frequency between two frequencies, leading to a cost increase.

All low-speed communication devices need to be allocated to the frequencies adjacent to the center frequency when there are a large number of user equipments that support only one frequency band of a narrow frequency, and thus, on the condition that a large number of user equipments are connected, such as in massive machine connection (MMC), resources may be insufficient.

One conceivable solution to the above is carrier aggregation (CA) in the LTE-A system scheme. In the CA scheme, up to five component carriers (CCs) of a 20-MHz band are provided to achieve a wider band of, for example, 100 MHz. In that case, a center frequency can be allocated every 20 MHz, so that synchronization signals (SSs) can be arranged every 20 MHz. The user equipment capable of high-speed transmission, however, needs to execute the process such as FFT every 20 MHz, leading to a complex process. A band exceeding 500 MHz is used in the 5G system, and accordingly, the process such as FFT will be conceivably processed in larger units for simplification of the process. In such a case, the problem above such as a shortage of resources supporting MMC occurs.

To solve the problem above, synchronization signals (SSs) are arranged not only at the center frequency but also at the entire band or frequency bands used by user equipments supporting a narrow frequency band, such as sensors, at constant frequency intervals (e.g., 20-MHz-intervals). As a result, a user equipment can be synchronized at a synchronization signal (SS) close to the frequency to be used in data communication and does not need to support two frequency bands. Also in a system in which a large number of user equipments are connected as in MMC, resources can be distributed freely.

Figure 35:
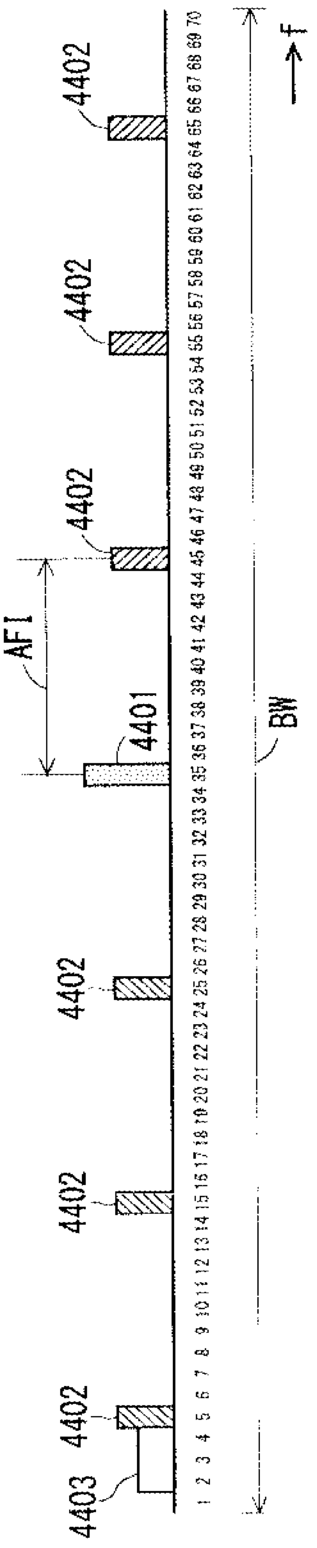
FIG. 35 shows an example arrangement of synchronization signals (SSs) in a frequency band.

FIG. 35 shows an example of an arrangement of synchronization signals (SSs) in a frequency band. The horizontal axis of FIG. 35 represents a frequency f. FIG. 35 shows an example in which synchronization signals (SSs) are allocated to the entire frequency band BW. A synchronization signal (SS) at the center frequency is represented by 4401, and synchronization signals (SSs) arranged additionally at frequency intervals AFI are represented by 4402. Represented by 4403 is data with a frequency used by a user equipment. The user equipment that demodulates the data 4403 does not need to be synchronized by the synchronization signal (SS) 4401 at the center frequency and can be synchronized by the additional synchronization signal (SS) 4402 adjacent to the data and can perform communication by only supporting a narrow-band frequency.

In a method of arranging synchronization signals (SSs), the position of the synchronization signal (SS) can be changed freely in a configuration file. For example, for a base station that does not need to accommodate a large number of user equipments supporting only a narrow frequency band as in the MMC environment, the synchronization signal (SS) is arranged only at the center frequency; for a base station that needs to accommodate a large number of user equipments supporting a narrow frequency band as in the MMC environment, synchronization signals (SSs) are arranged in the entire band or a wide band.

The configuration file is possessed by each base station, for example, in an example of the configuration file, the information about a frequency of a subcarrier for allocation of synchronization signals (SSs) and about a frequency allocation period (e.g., 20-MHz period) of synchronization signals (SSs) is described as the information on the frequency direction to which synchronization signals (SSs) are allocated, and the information about time positions (e.g., subframe positions) of allocation of synchronization signals (SSs) and about an allocation period (e.g., 10-ms-period) in the time direction of synchronization signals (SSs) is described as the information in the time direction. Each base station reads the above information from the file in its activation, and applies to the allocation setting of synchronization signals and notification information of broadcast information.

In place of the configuration file, the MME/S-GW that is a device of higher-layer than that of a base station may set the information. In that case, also the synchronization signal allocation information of a neighbor cell can be set by the MME/S-GW in an assisted configuration such as carrier aggregation (CA) or dual connectivity (DC), thus eliminating the need for notification between base stations, which simplifies a control interface.

Figure 36:
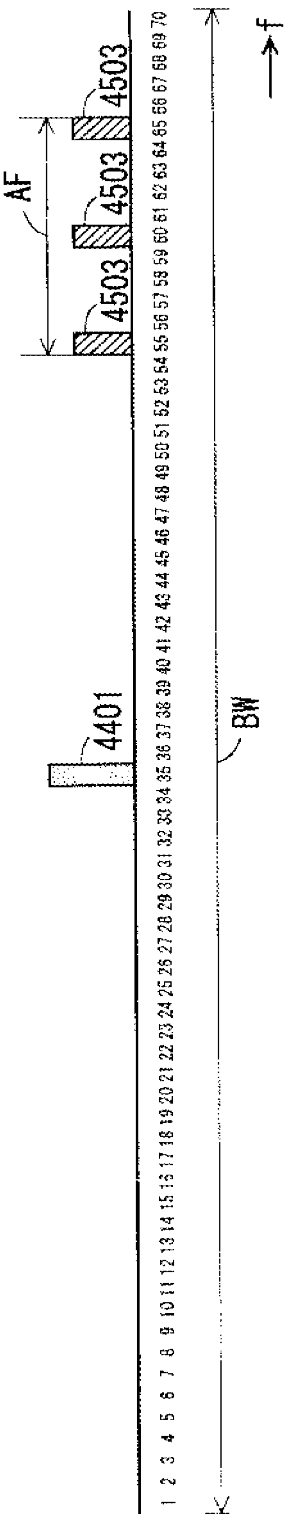
FIG. 36 shows another example arrangement of synchronization signals (SSs) in a frequency band.

FIG. 36 shows another example of the arrangement of synchronization signals (SSs) in a frequency band. The horizontal axis of FIG. 36 represents a frequency f. FIG. 36 shows an example in which synchronization signals (SSs) are arranged only in an allocation frequency band for MMC. In this example, additional synchronization signals (SSs) are not added to the entire frequency band BW, but additional synchronization signals (SSs) 4503 are arranged only in the frequency band used in MMC as an SS arrangement frequency AF for MMC.

Consequently, no synchronization signal (SS) is arranged in a frequency area used by a user equipment capable of normal transmission and reception of wide-band data, thus eliminating the need for arranging an unnecessary synchronization signal (SS).

There are two methods as the method of synchronizing a user equipment with a base station. One method is blind detection. In the other method, when being connected to a SCell and a secondary eNB (SeNB) in an assisted configuration such as carrier aggregation (CA) or dual connectivity (DC), a user equipment obtains, from a PCell and a master eNB (MeNB), the information, which includes information about a frequency of a subcarrier for allocation of synchronization signals (SSs) and about a frequency allocation period (e.g., 20-MHz period) of synchronization signals (SSs) as the information about the frequency direction to which synchronization signals (SS) are allocated, and the information about time positions (e.g., subframe positions) of allocation of synchronization signals (SSs) and about an allocation period (e.g., 10-ms-period) in the time direction of synchronization signals (SSs) as the information about the time direction.

The synchronization signal allocation information of the SCell and SeNB may be included in broadcast information as neighbor cell information of the PCell and MeNB. The SIB information of the SCell and SeNB may be notified in the broadcast information of the PCell and MeNB. As a result, the user equipment does not need to perform a process of obtaining the SIB information of the SCell and SeNB after being synchronized with the SCell and SeNB in communications therewith, and is required to perform a process only corresponding to the frequency band used in data communication. This simplifies a device and reduces a cost. The process of obtaining an SIB by the SCell and SeNB is not required, resulting in an effect that data communication can be started immediately.

In the blind detection, a synchronization signal (SS) of a frequency band to be used in data communication is searched first and, if the synchronization signal (SS) is acquired, the synchronization signal (SS) is used for frame synchronization, thus advancing communication control. If the synchronization signal (SS) at the frequency band cannot be acquired, a synchronization signal (SS) at the center frequency is used for synchronization with the base station.

In the assisted configuration, a user equipment obtains the information (frequency, time) about a position at which a synchronization signal (SS) is inserted for a cell and CC to be added, from a master base station. For example, the information is notified as a neighboring cell list of RRC information. Then, the user equipment executes a process of searching for a synchronization signal (SS) at a corresponding frequency and at a corresponding time of the cell and CC to be added.

Figure 37:
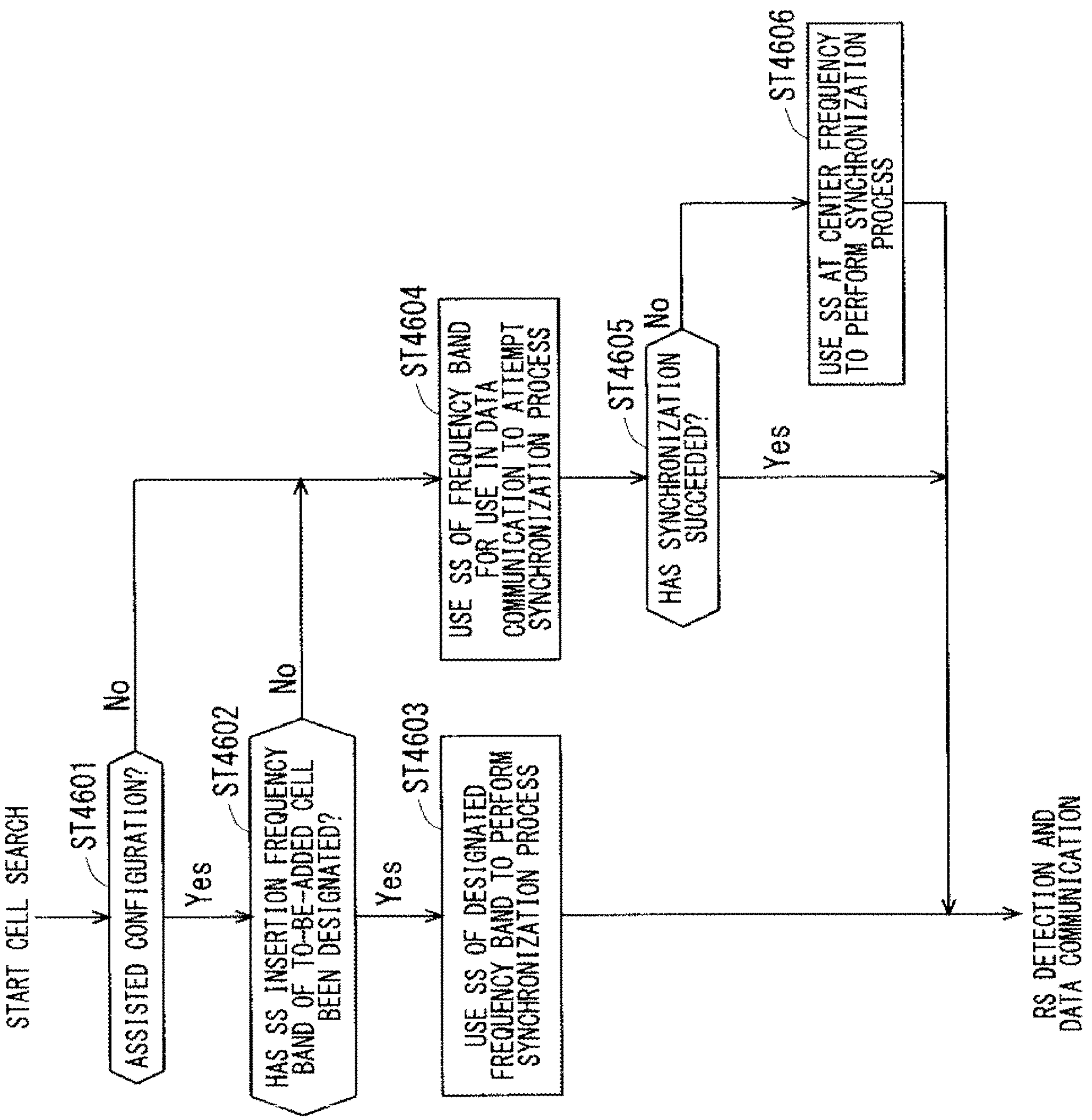
FIG. 37 is a flowchart showing a procedure by a communication terminal regarding a synchronization signal detection process.

FIG. 37 is a flowchart showing a procedure by a communication terminal regarding a synchronization signal detection process. Each process of the flowchart shown in FIG. 37 is executed by a communication terminal. When the communication terminal starts cell search, the process of the flowchart shown in FIG. 37 starts and moves to step ST4601.

In step ST4601, the communication terminal determines whether the configuration is an assisted configuration. The communication terminal moves to step ST4602 if determining that the configuration is the assisted configuration or moves to step ST4604 if the configuration is not the assisted configuration.

In step ST4602, the communication terminal confirms whether a frequency band at which a synchronization signal (SS) of a cell to be added (hereinafter also referred to as a "to-be-added cell") is inserted (hereinafter also referred to as a "synchronization signal (SS) insertion frequency band") is designated by a master base station. Specifically, the communication terminal determines whether it can obtain synchronization signal insertion frequency band information indicating a synchronization signal (SS) insertion frequency band to determine whether the synchronization signal (SS) insertion frequency band has been designated.

The communication terminal moves to step ST4603 if determining that the synchronization signal (SS) insertion frequency band has been designated or moves to step ST4604 if determining that the synchronization signal (SS) insertion frequency band has not been designated.

In step ST4603, the communication terminal uses the synchronization signal (SS) of the designated frequency band to perform a synchronization process.

If it determines that the configuration is not the assisted configuration in step ST4601 and if it cannot obtain the synchronization signal (SS) insertion frequency band information on a to-be-added cell and determines that the synchronization signal (SS) insertion frequency band has not been designated, the communication terminal performs blind detection in steps ST4604 to ST4606.

In step ST4604, the communication terminal first uses a synchronization signal (SS) of a frequency band to be used in data communication to attempt a synchronization process. In step ST4605, the communication terminal determines whether synchronization has succeeded. If determining that synchronization has succeeded, the communication terminal ends the synchronization process using the synchronization signal (SS) and moves to RS detection and data communication. If determining that synchronization has failed, the communication terminal uses a synchronization signal (SS) at a center frequency of a frequency band to be used in data communication, to thereby perform a synchronization process. The communication terminal then ends the synchronization process using synchronization signal (SS) and moves to RS detection and data communication.

The synchronization signal (SS) at the center frequency is inserted in minimum time units (e.g., in 1-ms periods) because it is used commonly, and as the method of inserting synchronization signals (SSs) except at the center frequency, the synchronization signals can be subjected to thinning transmission (e.g., at one-second period) in accordance with a user equipment to be accommodated. For example, it may take time for synchronization acquisition by a user equipment using the synchronization signals (SSs) except at the center frequency as in MTC, and accordingly, a long-period synchronization signal (SS) can be used. In that case, the transmission of synchronization signals (SSs) except at the center frequency in a long period reduces resources for the synchronization signals (SSs), resulting in an effect that radio resources that can be allocated to data transmission can be increased.

Figure 38:
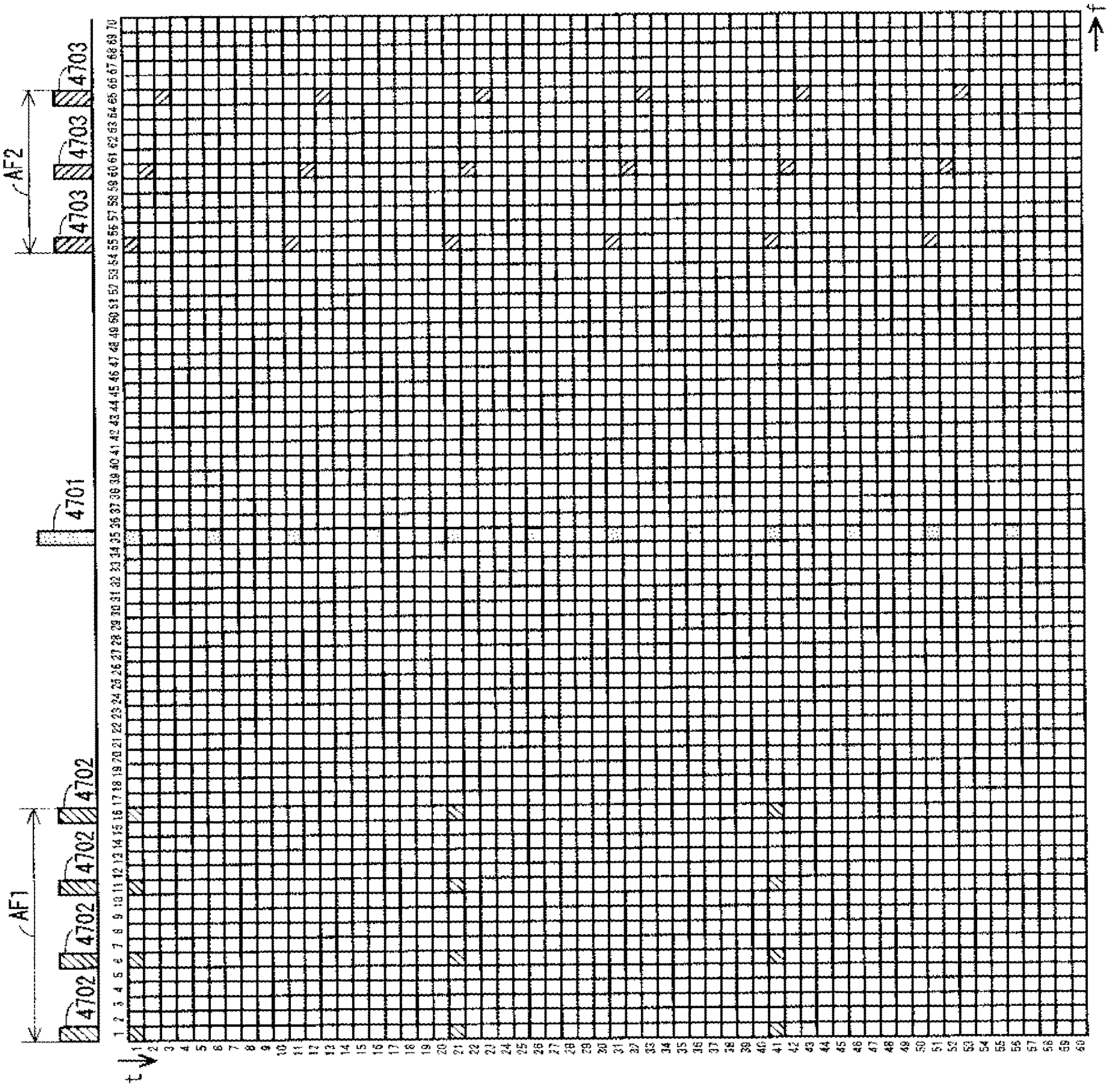
FIG. 38 shows an example of a method of arranging synchronization signals (SSs) in a frequency direction.

FIG. 38 shows an example of a method of arranging synchronization signals (SSs) in the frequency direction. The horizontal and vertical axes of FIG. 38 respectively represent a frequency f and a time t. A synchronization signal (SS) 4701 at the center frequency is transmitted, for example, every 10 ms. Synchronization signals (SSs) 4702 for MMC-1 are arranged by designating an SS arrangement frequency AF1 for MMC-1 in the frequency band for accommodating user equipments operating in a relatively low period. For example, synchronization signals (SSs) are arranged in 40-ms periods.

Synchronization signals (SSs) 4703 for MMC-2 are arranged by designating an SS arrangement frequency AF2 for MMC-2 in the frequency band for accommodating user equipments operating in a relatively high period. For example, allocation is performed in 20-ms periods. A synchronization signal (SS) 4702 and a synchronization signal (SS) 4703 to be additionally arranged may be transmitted at the same timing as that of the center frequency. An example of such an arrangement is the arrangement of the synchronization signals (SSs) 4702. In that case, the master base station achieves synchronization at the center frequency in the assisted configuration, and a cell to be added performs a process of detecting a synchronization signal (SS) only at the timing at which synchronization with the center frequency has been achieved, thus reducing power consumption.

As in the synchronization signals (SSs) 4703, synchronization signals may be shifted in the time direction. In this case, reducing an allocation occupancy rate of synchronization signals (SSs) per time can promptly allocate a resource to a user equipment that performs high-speed transmission. This is because when data is transmitted at high speed at a time occupied by a synchronization signal (SS), data cannot be allocated and may be reserved for the next slot.

In a system in which a beam is formed with a multi-element antenna, it is also effective to change, per beam, the arrangement of a synchronization signal (SS) to be added. For example, in communication with a user equipment moving at high speed and when a narrow beam is used, the ratio of synchronization signals (SSs) to be additionally arranged in the time direction can be increased or the period in which a synchronization signal (SS) is inserted in the frequency direction can be reduced to allow a user equipment to easily achieve synchronization.

The configuration disclosed in the present embodiment may be used as a synchronization signal (SS) for network listening, in which a base station detects a base station for a neighbor cell.

When a base station transmits a measurement configuration (RRC) and a user equipment transmits a measurement report (RRC) in accordance with the configuration, the configuration disclosed in the present embodiment is used, and only an SS arrangement frequency band is to be measured, thereby reducing the load of the user equipment.

Eighth Embodiment

Although a large number of base stations capable of high-capacity communications are required outdoors in the fifth generation, wired lines, particularly, optical communication lines are mainly laid indoors or underground, so a device that requires an interface in optical communication may be difficult to be mounted on a building wall or a pole. Also, when a large number of base stations are installed, a simple repeater is not adaptable to a change in radio environment, and accordingly, interference cannot be reduced sufficiently.

Figure 39:
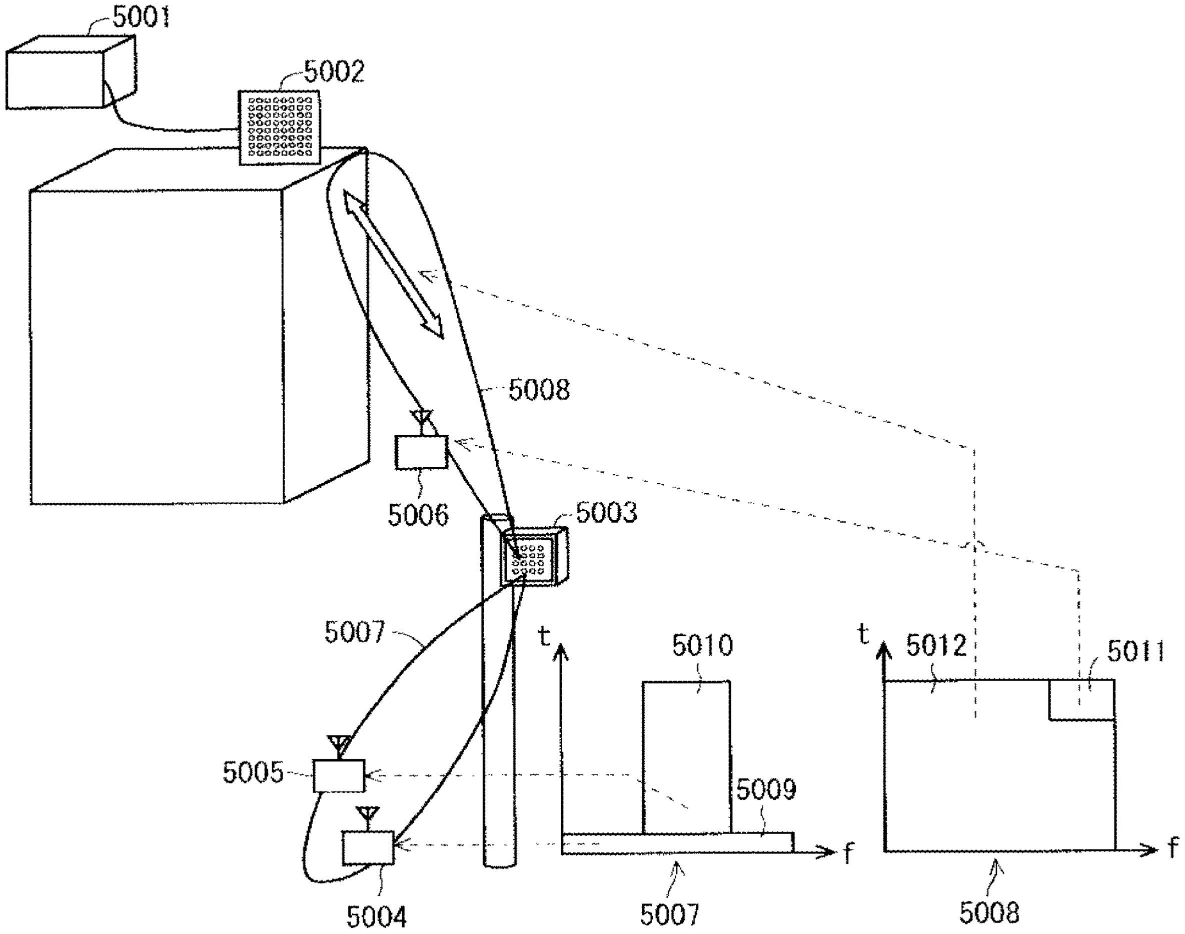
FIG. 39 shows a configuration of a communication system of an eighth embodiment of the present invention.

FIG. 39 shows a configuration of a communication system of an eighth embodiment of the present invention. An example in which a base station is installed on a pole on which an optical communication device cannot be mounted will be described with reference to FIG. 39.

An SGW and MME (hereinafter referred to as "SGW/MME") 5001 is connected to a base station (hereinafter also referred to as "BS") 5002 and a BS 5003 to exchange data with and manage control of each BS. The BS 5002 communicates with a user equipment (UE) within its own area and also communicates with the BS 5003. An antenna of the BS 5003 forms directional beams 5007 and 5008.

The BS 5002 originally transmits and receives all the information required for the BS 5003 via radio. A radio interface described below is used, and a directional beam, time, and space resource are used so as not to cause interference, whereby a base station that requires installation of no optical communication device can be installed.

Figure 40:
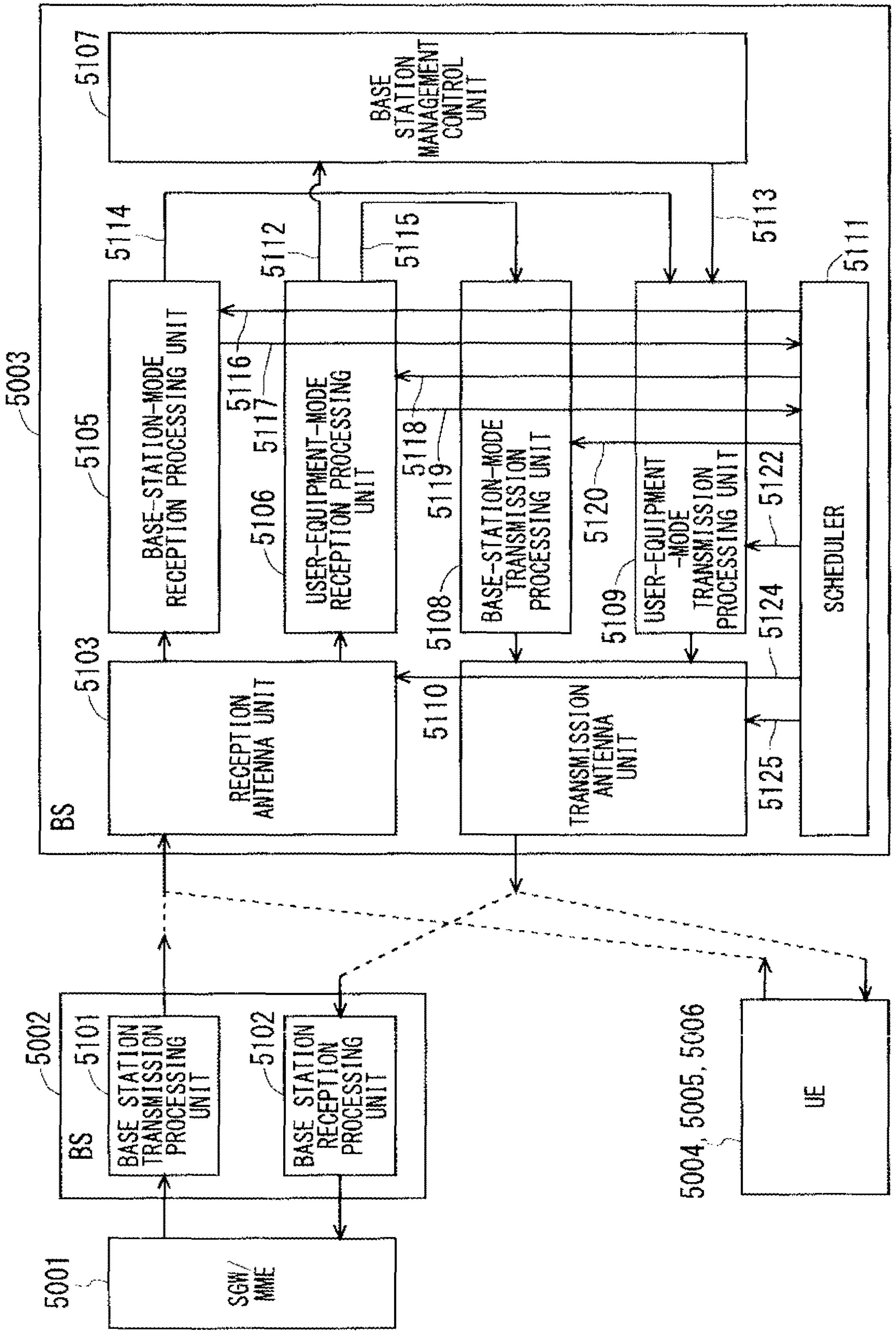
FIG. 40 is a block diagram showing the configuration of the communication system of the eighth embodiment of the present invention.

FIG. 40 is a block diagram showing a configuration of the communication system of the eighth embodiment of the present invention. A method of connecting base stations via radio will be described with reference to FIG. 40. The communication system of the present embodiment includes the SGW/MME 5001, the BS 5002, the BS 5003, and UEs 5004, 5005, and 5006. The BS 5002 includes a base station transmission processing unit 5101 and a base station reception processing unit 5102. The BS 5003 includes a reception antenna unit 5103, a base-station-mode reception processing unit 5105, a user-equipment-mode reception processing unit 5106, a base station management control unit 5107, a base-station-mode transmission processing unit 5108, a user-equipment-mode transmission processing unit 5109, a transmission antenna unit 5110, and a scheduler 5111.

The SGW/MME 5001 and the BS 5002 are connected by an S1 interface in LTE/LTE-A. A signal input from the SGW/MME 5001 is subjected to a transmission process as data (DSCH) of a user plane (U-plane) by the base station transmission processing unit 5101 of the base station 5002.

In the base station 5003, the reception antenna unit 5103 desirably performs beam control with its directivity pointed to the base station 5002, in response to an instruction 5124 from the scheduler 5111. A signal that is determined as data transmitted from the base station 5002 is provided to the user-equipment-mode reception processing unit 5106 in response to an instruction 5118 from the scheduler 5111.

The user-equipment-mode reception processing unit 5106 performs the same signal process as the downlink signal reception process performed by the UEs 5004, 5005, and 5006, for example, a decoding process. The user-equipment-mode reception processing unit 5106 measures reception quality or receives feedback information 5119 on the reception quality in the base station 5002, and then provides it to the scheduler 5111.

A signal 5115 subjected to the signal process by the user-equipment-mode reception processing unit 5106 is provided to the base-station-mode transmission processing unit 5108. The base-station-mode transmission processing unit 5108 performs the same signal process as that of the base station transmission processing unit 5101 of the BS 5002, for example, a coding process. The base-station-mode transmission processing unit 5108 maps resources in accordance with an instruction 5120 from the scheduler 5111 and transmits them to the UEs 5004, 5005, and 5006 via the transmission antenna unit 5110.

At this time, the transmission antenna unit 5110 desirably performs beam control with its directivity pointed to the UEs 5004, 5005, and 5006 in response to an instruction 5125 from the scheduler 5111. A signal 5112 determined as a control signal such as maintenance and management data of a base station, S1 application protocol (S1AP), or X2 application protocol (X2AP) by the user-equipment-mode reception processing unit 5106 is provided to the base station management control unit 5107.

The signals transmitted from the UEs 5004, 5005, and 5006 are received by the reception antenna unit 5103 of the BS 5003 with a beam whose directivity is pointed to each UE, in response to an instruction 5124 from the scheduler 5111.

In response to an instruction 5116 from the scheduler 5111, the signals determined as the data transmitted from the UEs 5004, 5005, and 5006 are provided to the base-station-mode reception processing unit 5105.

The base-station-mode reception processing unit 5105 performs the same signal process as the uplink signal reception process performed by the base station, for example, a decoding process. The base-station-mode reception processing unit 5105 measures reception quality or receives feedback information 5117 on the reception quality in the UEs 5004, 5005, and 5006 and then provides them to the scheduler 5111.

A signal 5114 subjected to the signal process in the base-station-mode reception processing unit 5105 is provided to the user-equipment-mode transmission processing unit 5109. The user-equipment-mode transmission processing unit 5109 performs the same signal process as that of the UE, for example, a coding process as well as a control signal 5113 such as the maintenance and management data of a base station, S1AP, or X2AP. The user-equipment-mode transmission processing unit 5109 maps resources in accordance with an instruction 5122 from the scheduler 5111 and then provides them to the BS 5002 via the transmission antenna unit 5110.

At this time, the transmission antenna unit 5110 desirably performs beam control with its directivity pointed to the BS 5002, in response to an instruction 5125 from the scheduler 5111.

As described above, with the communication system of the present embodiment, a base station can be additionally installed easily even when a large number of base stations are installed.

The methods using an interface between the BS 5002 and the BS 5003 via radio are classified into the following three types: a scheme for transmitting backhaul signals (hereinafter also referred to as a "backhaul signal transmission scheme"), a scheme for transmitting MeNB-SeNB signals between MeNB and SeNB transmitted through dual connectivity (hereinafter also referred to as a "dual connectivity signal transmission scheme"), and a scheme for transmitting fronthaul signals (hereinafter also referred to as a "fronthaul signal transmission scheme"). The differences among the functional block diagram of the three signal transmission schemes are shown in FIGS. 41 to 54.

Figure 41:
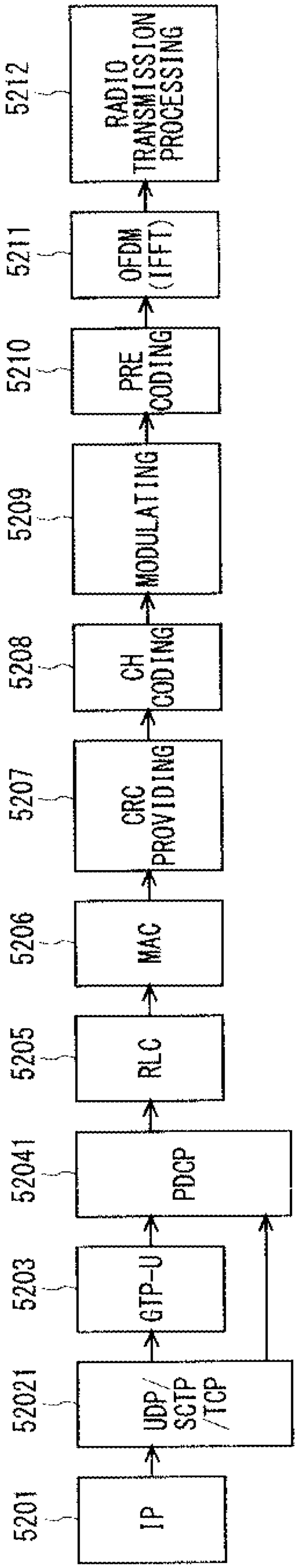
FIG. 41 is a block diagram showing a configuration of a base station transmission processing unit 5101 when a backhaul signal transmission scheme is used.

FIG. 41 is a block diagram showing a configuration of the base station transmission processing unit 5101 when the backhaul signal transmission scheme is used. When the backhaul signal transmission scheme is used, the base station transmission processing unit 5101 includes an IP unit 5201, a user datagram protocol (UDP)/stream control transmission protocol (SCTP)/transmission control protocol (TCP) unit 52021, a general packet radio service tunneling protocol for user plane (GTP-U) unit 5203, a packet data convergence protocol (PDCP) unit 52041, a radio link control (RLC) unit 5205, a medium access control (MAC) unit 5206, a CRC providing unit 5207, a channel coding (Ch coding) unit 5208, a modulating unit 5209, a precoding unit 5210, an orthogonal frequency division multiplexing (OFDM) unit 5211, and a radio transmission processing unit 5212.

Figure 42:
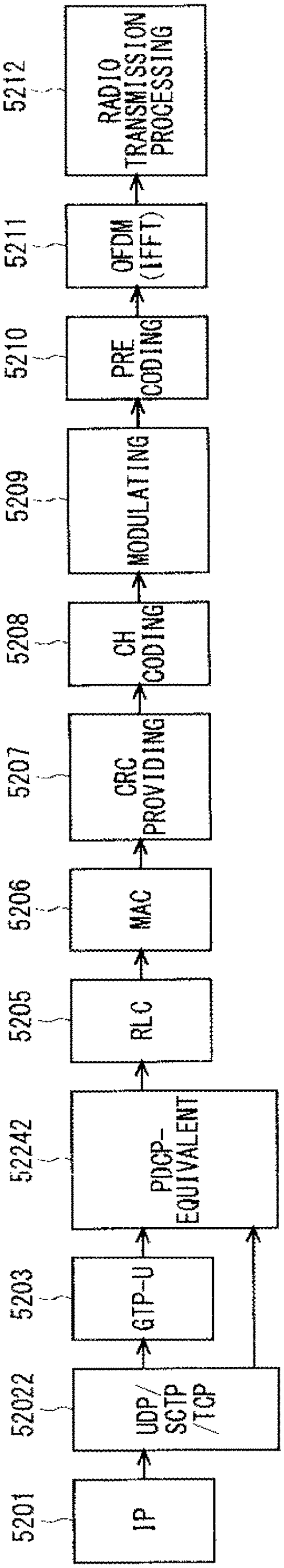
FIG. 42 is a block diagram showing a configuration of the base station transmission processing unit 5101 when a dual connectivity signal transmission scheme is used.

FIG. 42 is a block diagram showing a configuration of the base station transmission processing unit 5101 when the dual connectivity signal transmission scheme is used. The unit 5101 includes the IP unit 5201, a UDP/SCTP/TCP unit 52022, the GTP-U unit 5203, a PDCP-equivalent unit 52242, the RLC unit 5205, the MAC unit 5206, the CRC providing unit 5207, the channel coding (Ch coding) unit 5208, the modulating unit 5209, the precoding unit 5210, the OFDM unit 5211, and the radio transmission processing unit 5212. The PDCP-equivalent unit 52242 has a function equivalent to the PDCP unit.

Figure 43:
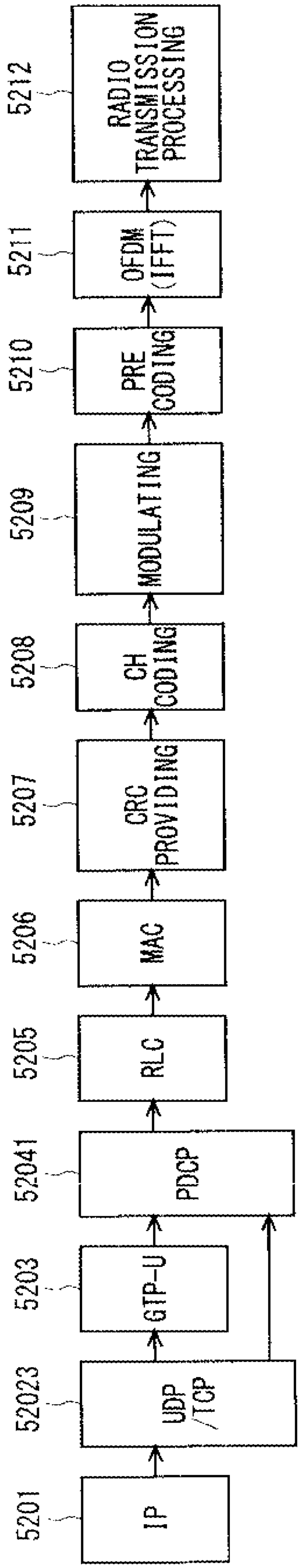
FIG. 43 is a block diagram showing a configuration of the base station transmission processing unit 5101 when a fronthaul signal transmission scheme is used.

FIG. 43 is a block diagram showing a configuration of the base station transmission processing unit 5101 when the fronthaul signal transmission scheme is used. The unit 5101 includes the IP unit 5201, a UDP/TCP unit 52023, the GTP-U unit 5203, a PDCP unit 52041, the RLC unit 5205, the MAC unit 5206, the CRC providing unit 5207, the channel coding (Ch coding) unit 5208, the modulating unit 5209, the precoding unit 5210, the OFDM unit 5211, and the radio transmission processing unit 5212.

Figure 44:
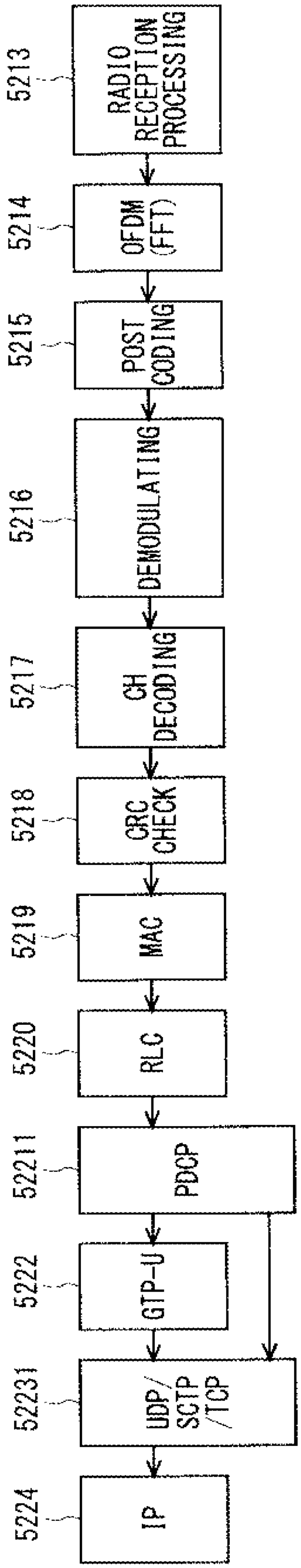
FIG. 44 is a block diagram showing a configuration of a base station reception processing unit 5102 when the backhaul signal transmission scheme is used.

FIG. 44 is a block diagram showing a configuration of the base station reception processing unit 5102 when the backhaul signal transmission scheme is used. The unit 5102 includes a radio reception processing unit 5213, an OFDM unit 5214, a postcoding unit 5215, a demodulating unit 5216, a channel decoding (Ch decoding) unit 5217, a CRC check unit 5218, a MAC unit 5219, an RLC unit 5220, a PDCP unit 52211, a GTP-U unit 5222, a UDP/SCTP/TCP unit 52231, and an IP unit 5224.

Figure 45:
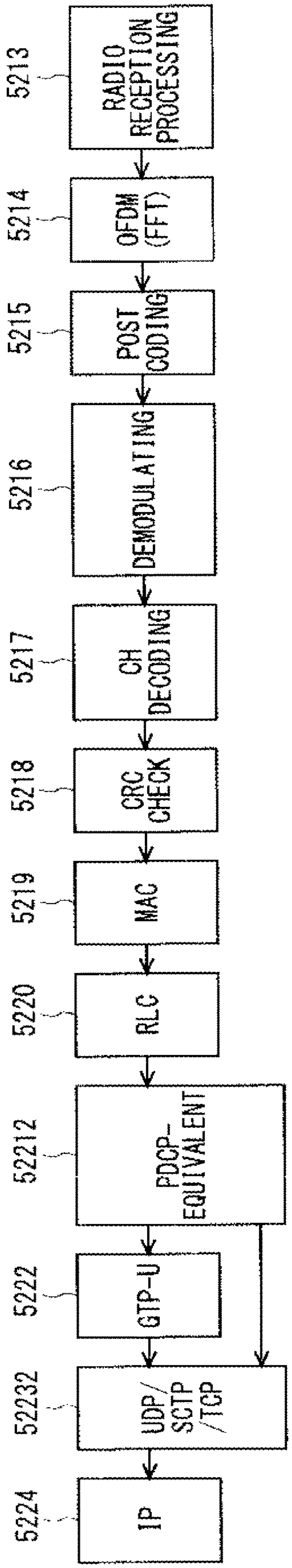
FIG. 45 is a block diagram showing a configuration of the base station reception processing unit 5102 when the dual connectivity signal transmission scheme is used.

FIG. 45 is a block diagram showing a configuration of the base station reception processing unit 5102 when the dual connectivity signal transmission scheme is used. The unit 5102 includes the radio reception processing unit 5213, the OFDM unit 5214, the postcoding unit 5215, the demodulating unit 5216, the channel decoding (Ch decoding) unit 5217, the CRC check unit 5218, the MAC unit 5219, the RLC unit 5220, a PDCP-equivalent unit 52212, the GTP-U unit 5222, a UDP/SCTP/TCP unit 52232, and the IP unit 5224.

Figure 46:
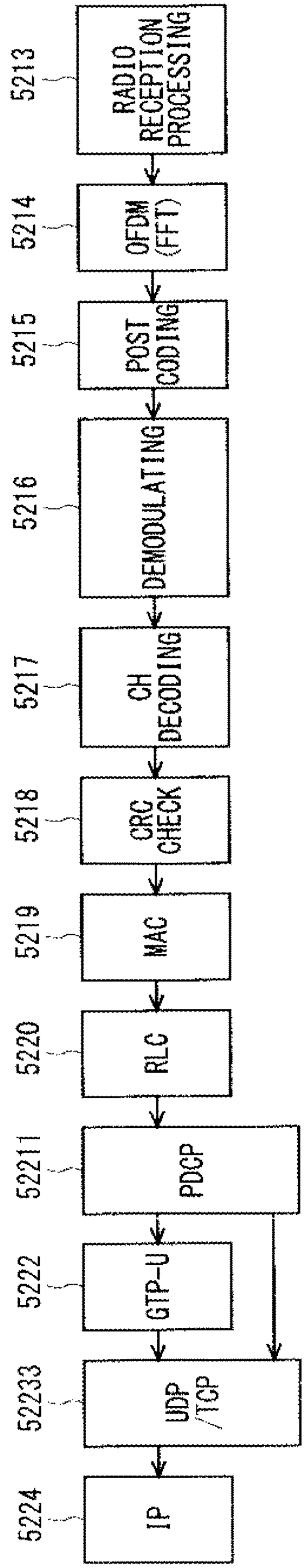
FIG. 46 is a block diagram showing a configuration of the base station reception processing unit 5102 when the fronthaul signal transmission scheme is used.

FIG. 46 is a block diagram showing a configuration of the base station reception processing unit 5102 when the fronthaul signal transmission scheme is used. The unit 5102 includes the radio reception processing unit 5213, the OFDM unit 5214, the postcoding unit 5215, the demodulating unit 5216, the channel decoding (Ch decoding) unit 5217, the CRC check unit 5218, the MAC unit 5219, the RLC unit 5220, a PDCP unit 52211, the GTP-U unit 5222, a UDP/TCP unit 52233, and the IP unit 5224.

Figure 47:
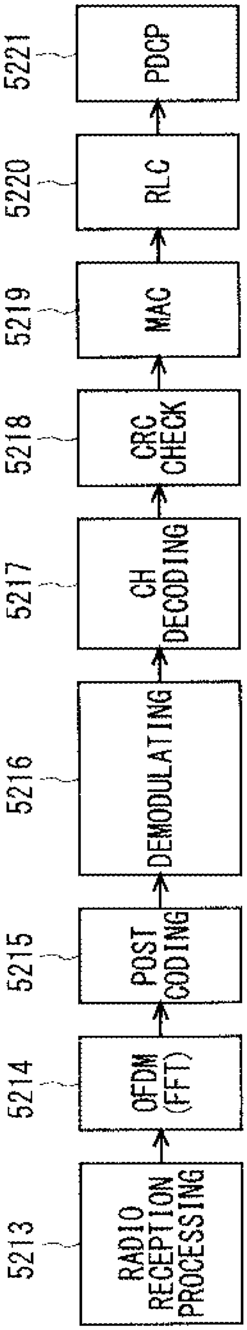
FIG. 47 is a block diagram showing a configuration of a base-station-mode reception processing unit 5105.

FIG. 47 is a block diagram showing a configuration of the base-station-mode reception processing unit 5105. The base-station-mode reception processing unit 5105 includes the radio reception processing unit 5213, the OFDM unit 5214, the postcoding unit 5215, the demodulating unit 5216, the channel decoding (Ch decoding) unit 5217, the CRC check unit 5218, the MAC unit 5219, the RLC unit 5220, and the PDCP unit 5221.

Figure 48:
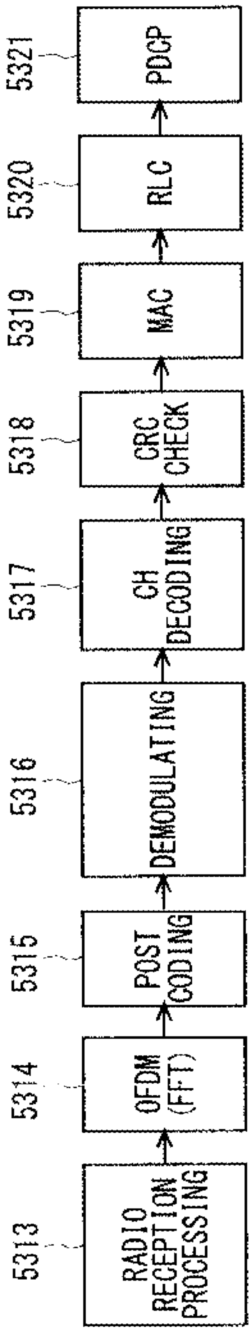
FIG. 48 is a block diagram showing a configuration of a user-equipment-mode reception processing unit 5106 when the backhaul signal transmission scheme is used.

FIG. 48 is a block diagram showing a configuration of the user-equipment-mode reception processing unit 5106 when the backhaul signal transmission scheme is used. The unit 5106 includes a radio reception processing unit 5313, an OFDM unit 5314, a postcoding unit 5315, a demodulating unit 5316, a channel decoding (Ch decoding) unit 5317, a CRC check unit 5318, a MAC unit 5319, an RLC unit 5320, and a PDCP unit 5321.

Figure 49:
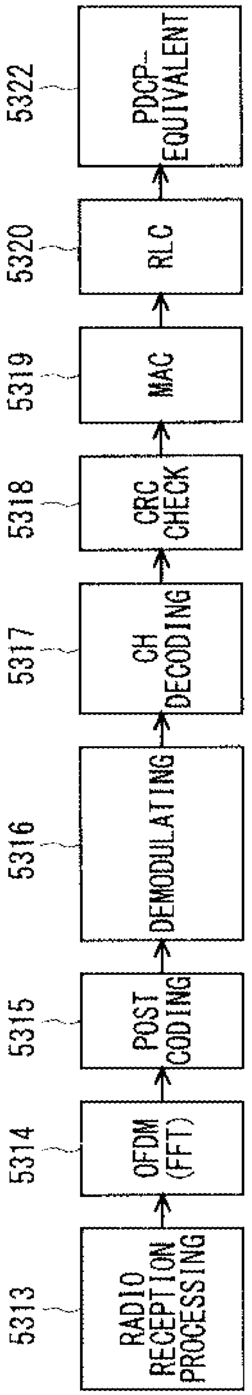
FIG. 49 is a block diagram showing a configuration of the user-equipment-mode reception processing unit 5106 when the dual connectivity signal transmission scheme is used.

FIG. 49 is a block diagram showing a configuration of the user-equipment-mode reception processing unit 5106 when the dual connectivity signal transmission scheme is used. The unit 5106 includes the radio reception processing unit 5313, the OFDM unit 5314, the postcoding unit 5315, the demodulating unit 5316, the channel decoding (Ch decoding) unit 5317, the CRC check unit 5318, the MAC unit 5319, the RLC unit 5320, and a PDCP-equivalent unit 5322.

Figure 50:
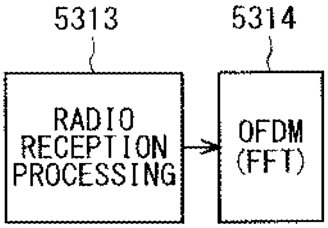
FIG. 50 is a block diagram showing a configuration of the user-equipment-mode reception processing unit 5106 when the fronthaul signal transmission scheme is used.

FIG. 50 is a block diagram showing a configuration of the user-equipment-mode reception processing unit 5106 when the fronthaul signal transmission scheme is used. The unit 5106 includes the radio reception processing unit 5313 and the OFDM unit 5314.

Figure 51:
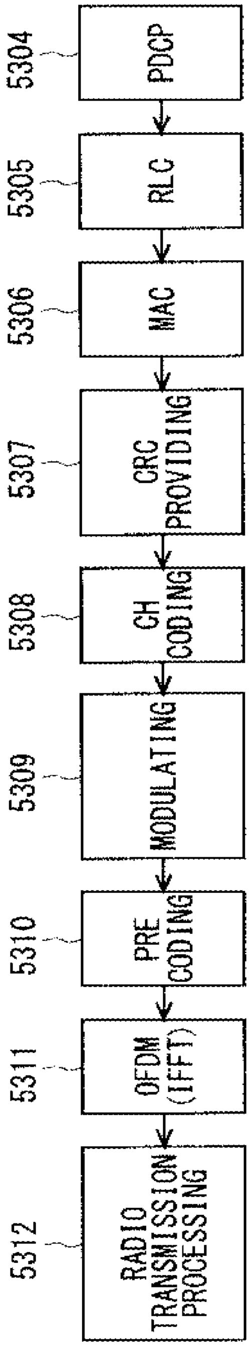
FIG. 51 is a block diagram showing a configuration of a base-station-mode transmission processing unit 5108 when the backhaul signal transmission scheme is used.

FIG. 51 is a block diagram showing a configuration of the base-station-mode transmission processing unit 5108 when the backhaul signal transmission scheme is used. The unit 5108 includes a PDCP unit 5304, an RLC unit 5305, a MAC unit 5306, a CRC providing unit 5307, a channel coding (Ch coding) unit 5308, a modulating unit 5309, a precoding unit 5310, an OFDM unit 5311, and a radio transmission processing unit 5312.

Figure 52:
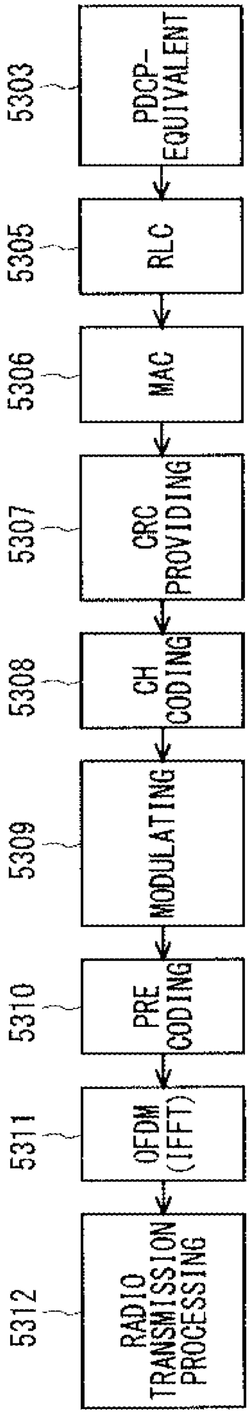
FIG. 52 is a block diagram showing a configuration of the base-station-mode transmission processing unit 5108 when the dual connectivity signal transmission scheme is used.

FIG. 52 is a block diagram showing a configuration of the base-station-mode transmission processing unit 5108 when the dual connectivity signal transmission scheme is used. The unit 5108 includes a PDCP-equivalent unit 5303, the RLC unit 5305, the MAC unit 5306, the CRC providing unit 5307, the channel coding (Ch coding) unit 5308, the modulating unit 5309, the precoding unit 5310, the OFDM unit 5311, and the radio transmission processing unit 5312.

Figure 53:
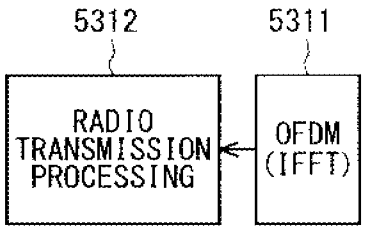
FIG. 53 is a block diagram showing a configuration of the base-station-mode transmission processing unit 5108 when the fronthaul signal transmission scheme is used.

FIG. 53 is a block diagram showing a configuration of the base-station-mode transmission processing unit 5108 when the fronthaul signal transmission scheme is used. The unit 5108 includes the OFDM unit 5311 and the radio transmission processing unit 5312.

Figure 54:
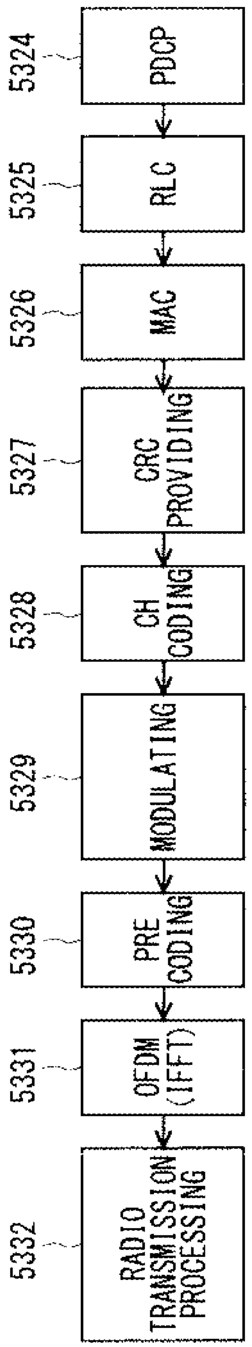
FIG. 54 is a block diagram showing a configuration of a user-equipment-mode transmission processing unit 5109.

FIG. 54 is a block diagram showing a configuration of the user-equipment-mode transmission processing unit 5109. The user-equipment-mode transmission processing unit 5109 includes a PDCP unit 5324, an RLC unit 5325, a MAC unit 5326, a CRC providing unit 5327, a channel coding (Ch coding) unit 5328, a modulating unit 5329, a precoding unit 5330, an OFDM unit 5331, and a radio transmission processing unit 5332.

First, the difference in the base station transmission processing unit 5101 of the BS 5002 will be described with reference to FIGS. 41 to 46.

In the backhaul signal transmission scheme, when the BS 5003 is connected to the SGW/MME 5001 through an optical communication line, signals that allow the operation as a base station, specifically, an S1AP signal, S1-U signal, X2AP signal, X2-U signal, and signal between maintenance devices are subjected to a radio signaling process and are transmitted from the BS 5002 via radio. For example, if the UDP/SCTP/TCP unit 52021 of FIG. 41 is a user datagram protocol (UDP), it determines that a signal is an S1-U signal or X2-U signal and separates users depending on port numbers. For example, the unit 52021 establishes association with radio resource IDs such as user IDs. These are subjected to a general packet radio service (GPRS) tunneling protocol for user plane (GTP-U) process by the GTP-U unit 5203.

Next, if the UDP/SCTP/TCP unit 52021 is an SCTP, it establishes association with an S1AP signal or X2AP signal per session. The unit 52021 regards these pieces of data as users of one type and generates all the parameters required for PDCP to L1, and also, the PDCP unit 52041 performs a PDCP process.

Similarly, if the UDP/SCTP/TCP unit 52021 is a TCP, it determines that a signal is for maintenance, regards it as a user of one type, and generates all the parameters required for PDCP to L1, and also, the PDCP unit 52041 performs a PDCP process.

The Internet protocol (IP) unit 5201 and the radio link control (RLC) unit 5205 to the radio transmission processing unit 5212 are identical in all the schemes.

Similarly, the base station reception processing unit 5102 of the BS 5002 differs from one scheme to another in that the inverse of the process above is performed. After the PDCP 52211 of FIG. 44 performs the PDCP process, a reverse lookup on the association with a radio resource is performed, and then, a result is returned to the UDP/SCTP/TCP unit 52231. The IP unit 5224 and the radio reception signal processing 5213 to the RCL unit 5220 are identical in all the schemes.

In the dual connectivity signal transmission scheme, all the signals that transmit signals between the MeNB and SeNB, specifically, XnAP signal, Xn-U signal [equivalent to PDCP], signals between maintenance devices are subjected to a radio signaling process and are transmitted from the BS 5002 via radio. Signals to be supported differ, and accordingly, the UDP/SCTP/TCP unit 52022 of FIG. 42 performs a process different from that in the backhaul signal transmission scheme.

The dual connectivity signal transmission scheme differs from the backhaul signal transmission scheme not in PDCP but in functions equal to those of PDCP, for example, new control plane (C-Plane) control, uplink order control, and the like, due to a device split.

Similarly, the base station reception processing unit 5102 of the base station 5002 differs from one scheme to another in that the inverse of the process above is performed. After the PDCP-equivalent unit 52212 of FIG. 45 performs a PDCP-equivalent process, a reverse lookup on the association with a radio resource is performed, and then, a result is returned to the UDP/SCTP/TCP unit 52232. The IP unit 5224 and the radio reception signal processing 5213 to the RCL unit 5220 are identical in all the schemes.

In the fronthaul signal transmission scheme, L1 signals and signals between maintenance devices are subjected to a radio signaling process and are transmitted from the BS 5002 via radio. The L1 signals are, for example, a downlink DA input signal and an uplink AD output signal, or a downlink after-precoding signal and an uplink before-postcoding signal, or signals between L1 and MAC. Signals to be supported differ, and accordingly, the UDP/TCP unit 52023 of FIG. 43 performs a process different from that in the backhaul signal transmission scheme.

Similarly, the base station reception processing unit 5102 of the BS 5002 differs from one scheme to another in that the inverse of the process above is performed. After the PDCP 52211 of FIG. 46 performs a PDCP process, a reverse lookup on the association with a radio resource is performed, and then, a result is returned to the UDP/TCP unit 52233. The IP unit 5224 and the radio reception processing unit 5213 to the RCL 5220 are identical in all the schemes.

FIGS. 47 to 53 show the base-station-mode reception processing unit 5105, the user-equipment-mode reception processing unit 5106, the base-station-mode transmission processing unit 5108, and the user-equipment-mode transmission processing unit 5109 of the BS 5003. For the fronthaul signal transmission scheme, examples of functional blocks in which a downlink after-precoding signal and an uplink before-postcoding signal are subjected to radio signaling are shown.

As described above in detail, a resource management function unit in each scheme can multiplex a signal between the BS 5002 and the BS 5003 and a signal between BS and UE within the same radio frequency band in time, frequency, and space.

For example, although the UE 5006 is identical to the BS 5002 in direction and cannot be spatially separated, it can provide a stable communication with the use of a resource area 5011 in which times and frequencies are split.

When a frequency cannot be used between the BS 5002 and the BS 5003 due to high radio interference therearound but can be used with low radio interference in the vicinity of the BS 5003, unlike a repeater, radio resources are allocated flexibly to achieve a stable communication with the user equipment.

To achieve the backhaul signal transmission scheme, the following methods are effective.

In the first method, some or all of the five types of signals (S1AP signal, S1-U signal, X2AP signal, X2-U signal, signal between maintenance devices) input to the base station 5003 are subjected to radio transmission as one user equipment. Radio encryption processes can also be integrated to one process. For example, it is revealed that the number of communication parties is one also in antenna directivity control, thus eliminating a need for processing per signal.

In the second method, the five types of signals input to the base station 5003 are subjected to radio transmission as individual user equipments. In this method, IDs equivalent to the individual user equipments are provided, different radio encryption is performed, and transmission and reception according to radio transmission procedures (PDCP, RLC, MAC) having different parameters are performed. The function of merging signals whose connection destinations differ by the base station is not required, and thus, these signals may be only added or deleted in accordance with, for example, an increase or decrease in the number of neighbor base stations to be connected (the number of X2's to be connected).

Also for the dual connectivity signal transmission scheme, the method of subjecting some or all of three types of signals (XnAP signal, Xn-U signal [equivalent to PDCP], signal between maintenance devices) to radio transmission as one user equipment and the method of subjecting these signals to radio transmission as individual user equipments are effective as in the backhaul signal transmission scheme.

Also for the fronthaul signal transmission scheme, the method of subjecting two types of signals (L1 signal, signal between maintenance devices) to radio transmission as one user equipment and the method of subjecting these signals to radio transmission as individual user equipments are effective as in the backhaul signal transmission scheme.

First Modification of Eighth Embodiment

Disclosed below is a method of making a base station usable even when a wired line is severed due to a disaster or the like and the base station cannot be used.

The BS 5003 in the eighth embodiment may be provided with a function of searching for the same neighbor cell as that for a user equipment when a base station whose wired line has been severed or which has been normally operated without a wired line detects that connection with the base station normally connected thereto has been severed, in addition to the function of requiring no wired line in the eighth embodiment. Whether a wired-line has been severed may be determined based on that a signal for confirming that a line is normal, such as heartbeat in TCP and SCTP, has been lost, or may be determined with a loss of frame (LOF) in the Ethernet (registered trademark) level.

The BS 5003 may be further provided with a function of increasing the number of elements by a multi-element antenna to increase equivalent isotropic radiated power (EIRP) in search.

The BS 5003 may be further provided with a function of self-diagnosing whether a wired line is usable in recovery. A function of receiving back transmission data for test may be effective as an alternative. The BS 5003 may be provided with a function of periodically transmitting a signal indicating the good result if the result of the self-diagnosis is good. It is effective to make this signal different from P-SS or S-SS. On this occasion, a signal may be transmitted while changing directivity with a multi-element antenna.

The BS 5003 may be provided with a function of executing a connection sequence of Plug and Play when a backhaul, an interface in dual connectivity, or a fronthaul that enables radio connection is found.

At the start of communication with a neighbor cell, communication is made mainly by voice in a disaster, and accordingly, it is effective to provide the BS 5002 with a function of increasing a required block error rate (BLER) that serves as a reference in the modulation and channel coding scheme (MCS) and transmission power control. The required BLER is, for example, $10^{-6}$, and is set high up to, for example, $10^{-2}$ by the function of increasing a required BLER.

The BS 5002 in the eighth embodiment may be provided with a function of searching for a cell whose wired line has been severed therearound, in addition to the function of causing the BS 5003 to require no wired line. The BS 5002 may receive a signal while changing directivity using a time and frequency in which communication is not used.

If the BS 5002 has successfully detected a cell whose wired line has been severed but has failed to recover the wired line, it may be provided with a function of enlarging its service area to allocate a beam for the neighbor cell whose wired line has been severed.

Even when the base station 5002 is a so-called capacity cell and transmits no common channel such as a broadcast channel in normal operation, it may be provided with a function of transmitting a common channel to a beam.

The embodiments and the modifications thereof are merely an illustration of the present invention and can be freely combined within the scope of the invention. Also, the elements of the embodiments and the modifications thereof can be appropriately modified or omitted.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

3201 MME/S-GW unit, 3202 eNB, 3203 UE, 3204 cell, 3301 ICBS, 3302 RRE, 3303 cell of RRE, 3401 macro eNB, 3402 small eNB, 3403 macro cell, 3404 small cell.

The invention claimed is:

1. A radio communication system to perform radio communication between a communication terminal and a base station using a plurality of subcarriers, wherein the communication terminal receives, from the base station, a measurement configuration causing the communication terminal to transmit a measurement report, the communication terminal transmits, to the base station, the measurement report including information about a location of the communication terminal and information about a moving speed of the communication terminal according to the measurement configuration, and the base station notifies the communication terminal of a size of internal interval of each of the subcarriers.

2. The radio communication system according to claim 1, wherein the base station notifies the communication terminal of the internal interval between the subcarriers per time domain.

3. The radio communication system according to claim 1, wherein the base station notifies the communication terminal of the internal interval between the subcarriers per frequency domain.

4. The radio communication system according to claim 1, wherein the base station notifies the communication terminal of the internal interval between the subcarriers per time and frequency domain.

5. The radio communication system according to claim 1, wherein the base station is a first base station as a moving source of handover or a second base station as a moving destination of handover, and the first base station notifies the second base station of the internal interval between the subcarriers.

6. A base station to perform radio communication with a communication terminal using a plurality of subcarriers, wherein the base station transmits, to the communication terminal, a measurement configuration causing the communication terminal to transmit a measurement report, the base station receives, from the communication terminal, the measurement report including information about a location of the communication terminal and information about a moving speed of the communication terminal according to the measurement configuration, and the base station notifies the communication terminal of a size of internal interval of each of the subcarriers.

7. A communication terminal to perform radio communication with a base station using a plurality of subcarriers, wherein the communication terminal receives, from the base station, a measurement configuration causing the communication terminal to transmit a measurement report, the communication terminal transmits, to the base station, the measurement report including information about a location of the communication terminal and information about a moving speed of the communication terminal according to the measurement configuration, and the communication terminal receives notification of a size of internal interval of each of the subcarriers from the base station.

8. The radio communication system according to claim 1, wherein the base station, which is a moving source of handover, via an X2 interface transmits a handover request to another base station, which is a moving destination of the handover.

9. The radio communication system according to claim 1, wherein the internal interval of each of the subcarriers is set based on the moving speed of the communication terminal.

* * * * *